(12) United States Patent
Ikefuji

(10) Patent No.: US 10,700,554 B2
(45) Date of Patent: Jun. 30, 2020

(54) POWER RECEPTION DEVICE AND NON-CONTACT POWER FEEDING SYSTEM

(71) Applicant: ROHM CO., LTD., Kyoto-Shi, Kyoto (JP)

(72) Inventor: Yoshihiro Ikefuji, Kyoto (JP)

(73) Assignee: ROHM CO., LTD., Tokyo (JP)

( * ) Notice: Subject to any disclaimer, the term of this patent is extended or adjusted under 35 U.S.C. 154(b) by 81 days.

(21) Appl. No.: 15/775,643

(22) PCT Filed: Oct. 12, 2016

(86) PCT No.: PCT/JP2016/080248
§ 371 (c)(1),
(2) Date: May 11, 2018

(87) PCT Pub. No.: WO2017/081975
PCT Pub. Date: May 18, 2017

(65) Prior Publication Data
US 2018/0331575 A1 Nov. 15, 2018

(30) Foreign Application Priority Data
Nov. 13, 2015 (JP) ................... 2015-223256

(51) Int. Cl.
*H02J 50/12* (2016.01)
*H02J 50/80* (2016.01)
(Continued)

(52) U.S. Cl.
CPC ............. *H02J 50/12* (2016.02); *H01F 38/14* (2013.01); *H02J 7/00* (2013.01); *H02J 50/60* (2016.02); *H02J 50/80* (2016.02); *H04B 5/0037* (2013.01)

(58) Field of Classification Search
CPC .. H02J 50/12; H02J 50/80; H02J 50/60; H02J 7/00; H01F 38/14; H04B 5/0037
(Continued)

(56) References Cited

U.S. PATENT DOCUMENTS

2012/0056485 A1 3/2012 Haruyama
2013/0264887 A1* 10/2013 Arisawa ............... G01D 5/2006
307/104
(Continued)

FOREIGN PATENT DOCUMENTS

JP 2012060721 A 3/2012
JP 2013118737 A 6/2013
(Continued)

OTHER PUBLICATIONS

International Search Report corresponding to Application No. PCT/JP2016/080248; dated Dec. 6, 2016.

*Primary Examiner* — Rexford N Barnie
*Assistant Examiner* — Swarna N Chowdhuri
(74) *Attorney, Agent, or Firm* — Cantor Colburn LLP

(57) ABSTRACT

A power reception device includes a power reception-side resonant circuit which includes a power reception-side coil and a metal plate in which an opening portion is provided in a position opposite the arrangement position of the power reception-side coil, and can receive, by a magnetic field resonance method, power from a power transmission device which includes a power transmission-side resonant circuit including a power transmission-side coil. A cancellation coil is arranged between the power reception-side coil and the opening portion, and a cancellation resonant circuit including a cancellation coil is provided separately in the power reception device. When an alternating magnetic field interlinks the cancellation coil, a current which cancels out variations in the resonant frequencies of the power reception-side resonant circuit and the power transmission-side resonant circuit caused by the presence of the metal plate flows through the cancellation coil.

9 Claims, 25 Drawing Sheets

(51) Int. Cl.
*H02J 50/60* (2016.01)
*H02J 7/00* (2006.01)
*H01F 38/14* (2006.01)
*H04B 5/00* (2006.01)

(58) Field of Classification Search
USPC .......................................................... 307/104
See application file for complete search history.

(56) References Cited

U.S. PATENT DOCUMENTS

| | | | |
|---|---|---|---|
| 2014/0035521 A1 | 2/2014 | Endo | |
| 2014/0339906 A1* | 11/2014 | Miyamoto | H01F 38/14 307/104 |
| 2014/0339908 A1* | 11/2014 | Omae | H01F 38/14 307/104 |
| 2015/0280453 A1 | 10/2015 | Ikefuji | |
| 2016/0013683 A1 | 1/2016 | Endo | |
| 2016/0020634 A1* | 1/2016 | Kanno | H02J 7/04 320/108 |
| 2016/0144727 A1* | 5/2016 | Tokura | H01F 38/14 307/104 |

FOREIGN PATENT DOCUMENTS

| | | |
|---|---|---|
| JP | 2014033504 A | 2/2014 |
| JP | 2014110726 A | 6/2014 |
| JP | 2015109762 A | 6/2015 |
| JP | 2015202025 A | 11/2015 |

\* cited by examiner

SEPARATE STATE
REFERENCE ARRANGEMENT STATE
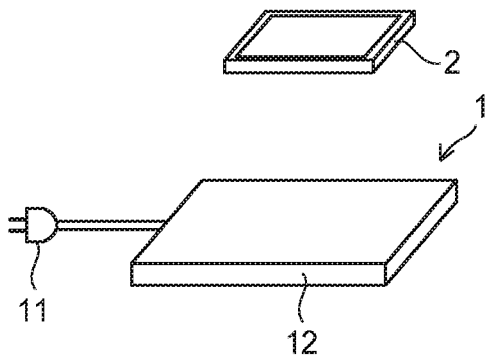
FIG.1A
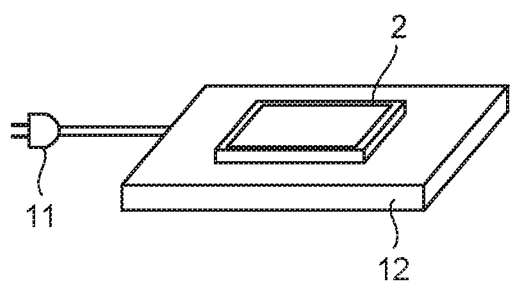
FIG.1B
FIG.2
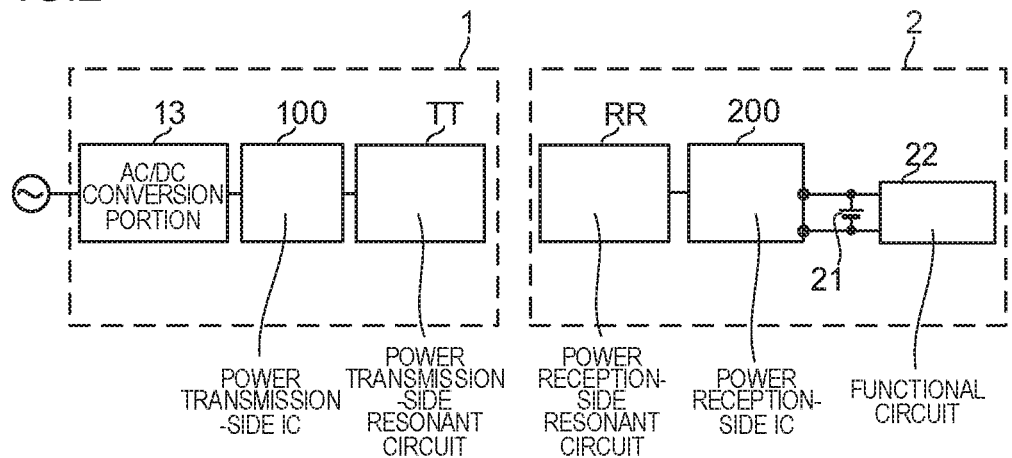
FIG.3
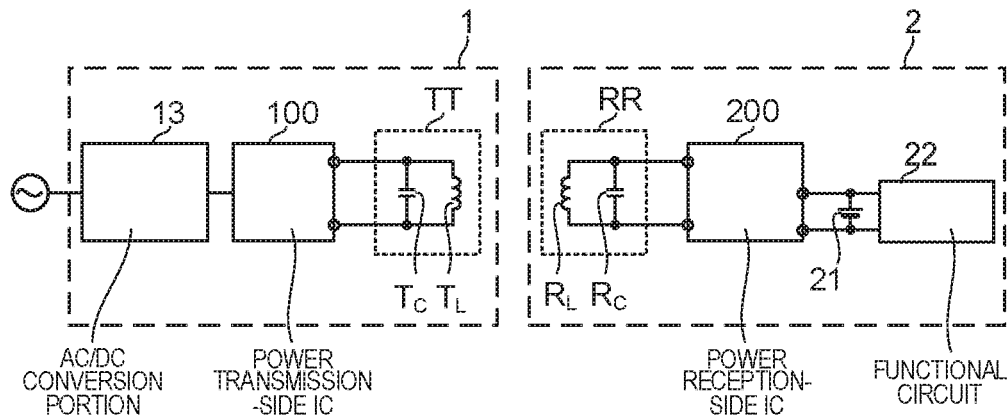

VOLTAGE DROP OF SENSE RESISTOR

REFERENCE ARRANGEMENT STATE | SEPARATE STATE | REFERENCE ARRANGEMENT STATE

FIG.9
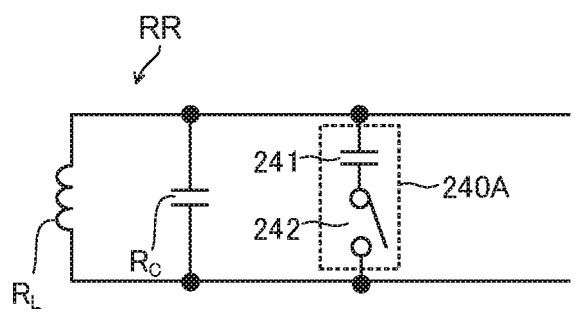
FIG.10
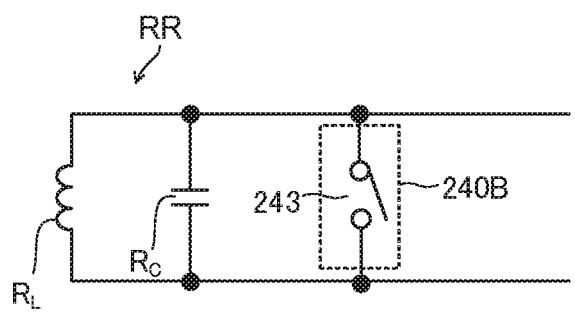
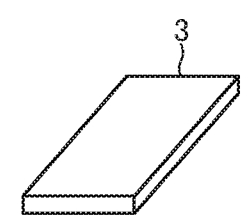
FIG.11A
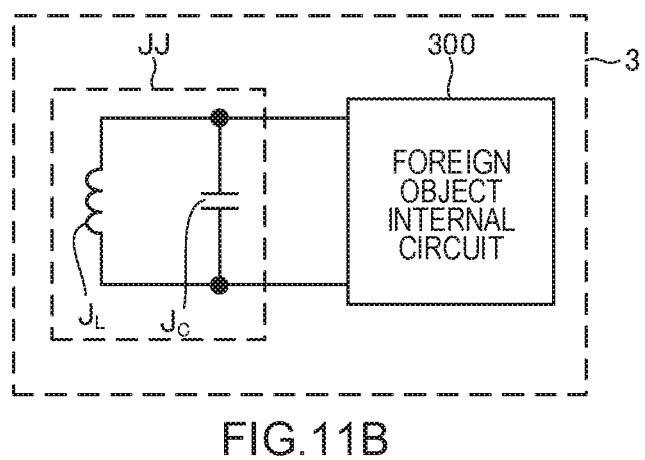
FIG.11B

INITIAL SETTING PROCESSING
(IN INITIAL SETTING ENVIRONMENT)

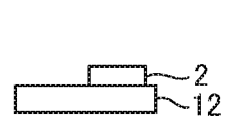 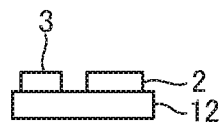 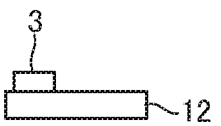 
FIG.14A   FIG.14B   FIG.14C   FIG.14D
FIG.15
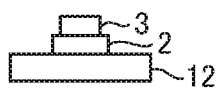
FIG.16
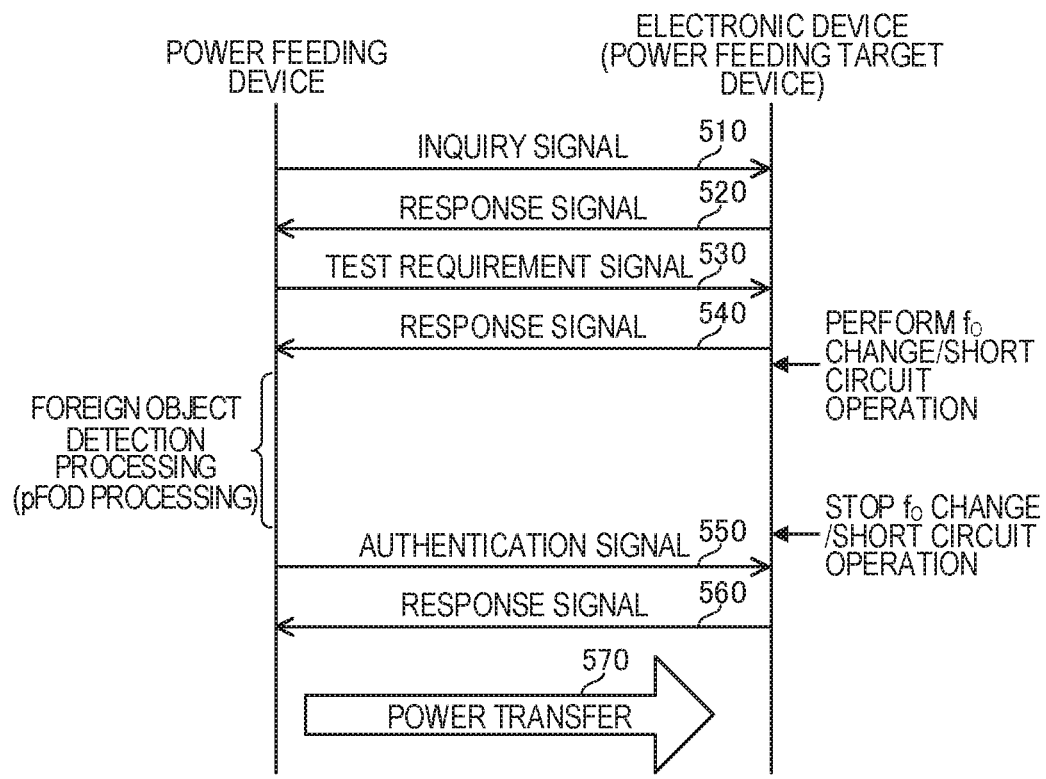

INTERMEDIATE ARRANGEMENT METHOD

BACK ARRANGEMENT METHOD

FIG.31A
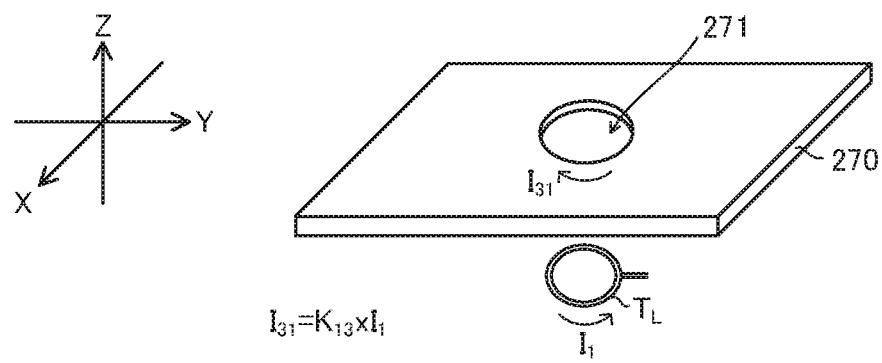
FIG.31B
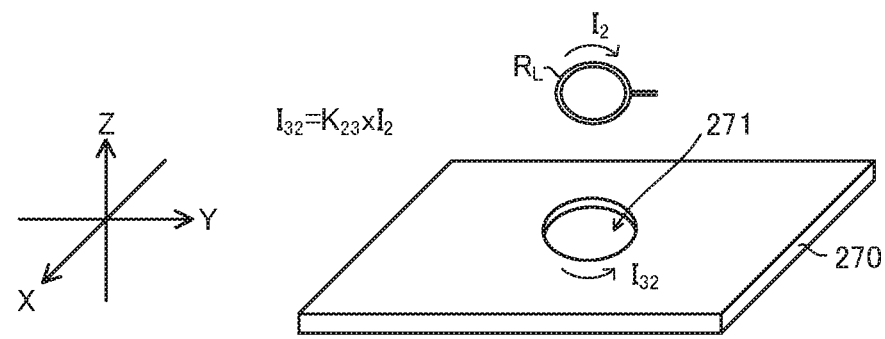
FIG.31C
$I_{32}=K_{23}\times I_2$
$I_{31}=K_{13}\times I_1$  $I_1$
$I_2=jQK_{12}\times I_1$ FIG.32
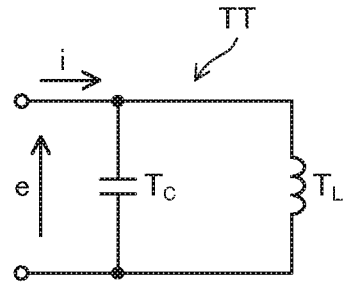
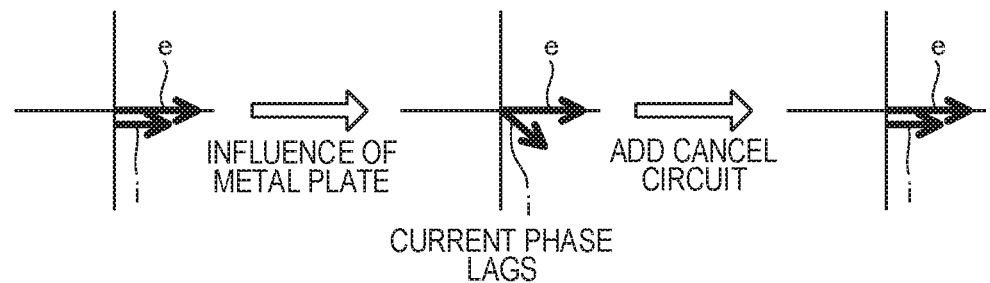
FIG.33
|  | METAL PLATE | CANCELLATION COIL |
|---|---|---|
| POWER TRANSMISSION -SIDE COIL $I_1$ | $I_{31}$ | $I_{G1}$ |
| POWER RECEPTION -SIDE COIL $I_2$ | $I_{32}$ | $I_{G2}$ |
INCREASE RESONANT FREQUENCY    REDUCE RESONANT FREQUENCY
FIG.34
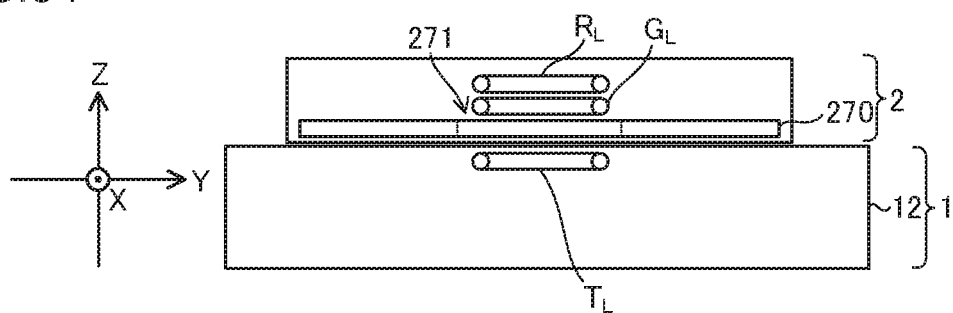

FIG.35
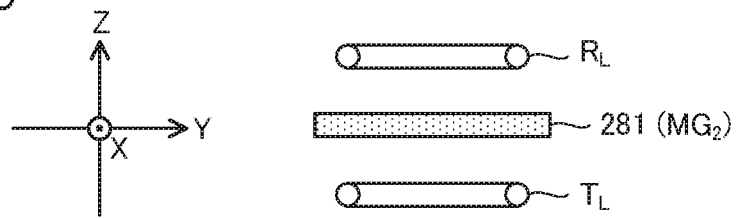
FIG.36A
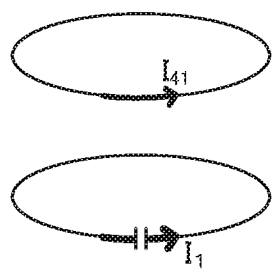
FIG.36B
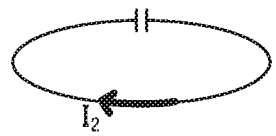
FIG.37
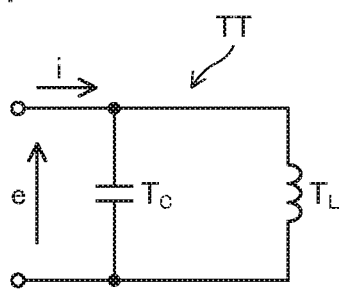
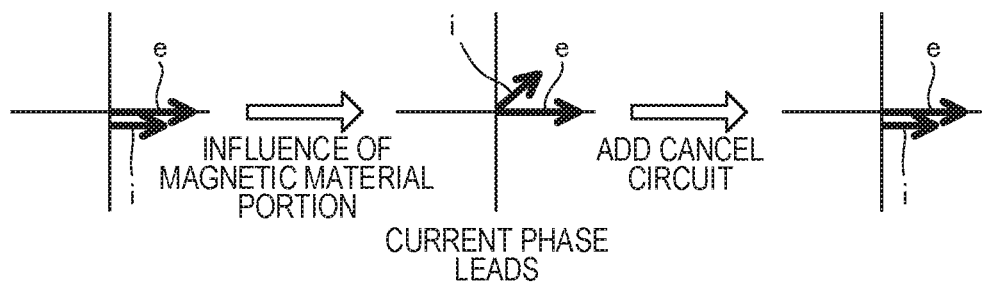
INFLUENCE OF MAGNETIC MATERIAL PORTION
CURRENT PHASE LEADS
ADD CANCEL CIRCUIT

* GENERATE TEST MAGNETIC FIELD

* PERFORM $f_0$ CHANGE/SHORT CIRCUIT OPERATION
* GENERATE TEST MAGNETIC FIELD

POWER RECEPTION DEVICE AND NON-CONTACT POWER FEEDING SYSTEM

CROSS REFERENCE TO RELATED APPLICATIONS

This is the U.S. national stage of application No. PCT/JP2016/080248, filed on Oct. 12, 2016. Priority under 35 U.S.C. § 119(a) and 35 U.S.C. § 365(b) is claimed from Japanese Application No. 2015-223256, filed on Nov. 13, 2015, the disclosure of which is also incorporated herein by reference.

TECHNICAL FIELD

The present invention relates to a power reception device and a non-contact power feeding system.

BACKGROUND ART

As one type of proximity wireless communication, there is wireless communication which is performed by NFC (Near field communication) that uses 13.56 MHz as a carrier frequency. On the other hand, a technology is also proposed which utilizes a coil used for NFC communication so as to perform non-contact power feeding by a magnetic field resonance method.

In the non-contact power feeding utilizing magnetic field resonance, a power transmission-side resonant circuit including a power transmission-side coil is arranged in a power transmission device, a power reception-side resonant circuit including a power reception-side coil is arranged in a power reception device and the resonant frequencies of the resonant circuits are set to a common reference frequency. An alternating current is then passed through the power transmission-side coil, and thus an alternating magnetic field at the reference frequency is generated in the power transmission-side coil. Then, the alternating magnetic field is transmitted to the power reception-side resonant circuit which resonates at the reference frequency, and thus an alternating current flows through the power reception-side coil. In other words, power is transmitted from the power transmission-side resonant circuit including the power transmission-side coil to the power reception-side resonant circuit including the power reception-side coil.

RELATED ART DOCUMENT

Patent Document

Patent document 1: Japanese Unexamined Patent Application Publication No. 2014-33504

DISCLOSURE OF THE INVENTION

Problems to be Solved by the Invention

In a power reception device, a member which affects the properties and the operation of a power reception-side resonant circuit may be arranged. For example, a metal plate which is used for the enclosure of an electronic device and which is formed of aluminum or the like may be provided or a magnetic material sheet which is used for the unnecessary magnetic field shielding of an electronic circuit and which is formed of ferrite or the like may be provided, and these members can affect the properties and the operation of the power reception-side resonant circuit through magnetic coupling to a power reception-side coil. Furthermore, when a power transmission device is close to the power reception device, the members described above may also be magnetically coupled to a power transmission-side coil so as to affect the properties and the operation of a power transmission-side resonant circuit. These influences are not desirable for realizing the proper operations (including a power reception operation and a power transmission/reception operation) of the power reception device and a non-contact power feeding system.

When the operation of part of a circuit within the power reception device is not ideal, this may adversely affect the realization of a desired operation which is achieved in the non-contact power feeding system.

Hence, an object of the present invention is to provide a power reception device and a non-contact power feeding system which contribute to the realization of proper operations.

Means for Solving the Problem

A power reception device according to the present invention which can receive, from a power transmission device that includes a power transmission-side resonant circuit including a power transmission-side coil for transmitting power, the power by a magnetic field resonance method, includes: a power reception-side resonant circuit which includes a power reception-side coil for receiving the power; and an auxiliary resonant circuit which includes an auxiliary coil different from the power reception-side coil, where in a position in which a current flows through the auxiliary coil based on a magnetic field generated in the power transmission-side coil or the power reception-side coil, the auxiliary coil is arranged.

Specifically, for example, preferably, the power reception device further includes: a metal plate which is provided in such a position as to affect a resonant frequency of the power reception-side resonant circuit, where when an alternating magnetic field interlinks the auxiliary coil, a current which cancels out a variation in the resonant frequency of the power reception-side resonant circuit caused by the metal plate flows through the auxiliary resonant circuit.

For example, preferably, the metal plate is formed of aluminum or an aluminum alloy.

Specifically, for example, preferably, the power reception device further includes: a magnetic material portion which is provided in such a position as to affect a resonant frequency of the power reception-side resonant circuit, where when an alternating magnetic field interlinks the auxiliary coil, a current which cancels out a variation in the resonant frequency of the power reception-side resonant circuit caused by the magnetic material portion flows through the auxiliary resonant circuit.

For example, preferably, the magnetic material portion is formed of ferrite.

Specifically, for example, preferably, the auxiliary resonant circuit is a resonant circuit that is formed so as to include the auxiliary coil and an auxiliary capacitor whose capacitance can be changed.

Specifically, for example, preferably, the auxiliary resonant circuit further includes an auxiliary resistor, and the auxiliary resistor is connected in parallel to a parallel circuit of the auxiliary coil and the auxiliary capacitor or the auxiliary resistor is inserted in series with a series circuit of the auxiliary coil and the auxiliary capacitor.

A non-contact power feeding system according to the present invention includes: the power reception device; and the power transmission device which includes the power transmission-side resonant circuit including the power transmission-side coil for transmitting the power, where the non-contact power feeding system can transmit and receive the power by the magnetic field resonance method.

Specifically, for example, preferably, in the non-contact power feeding system, the power transmission device includes: a power transmission circuit which can supply an alternating current voltage to the power transmission-side resonant circuit; a detection circuit which detects an amplitude of a current flowing through the power transmission-side coil; and a power transmission-side control portion which performs power transmission control on the power by controlling the power transmission circuit based on an amplitude detection value of the detection circuit.

For example, preferably, in the non-contact power feeding system, the power reception device includes a change/short circuit which changes the resonant frequency of the power reception-side resonant circuit from a resonant frequency at a time of the power reception or short-circuits the power reception-side coil before the reception of the power from the power transmission device, the power transmission-side control portion includes: a first processing portion which controls the power transmission circuit such that in a state where in the power reception device, the resonant frequency of the power reception-side resonant circuit is changed or the power reception-side coil is short-circuited according to a signal by communication from the power transmission device, before the power transmission, a predetermined test magnetic field is generated in the power transmission-side coil; a second processing portion which determines, based on the amplitude detection value by the detection circuit when the test magnetic field is generated, whether or not the power transmission can be performed; and a third processing portion which realizes the power transmission by controlling the power transmission circuit such that after it is determined that the power transmission can be performed, a magnetic field for the power transmission larger than the test magnetic field is generated in the power transmission-side coil, and in the state, a current which cancels out an influence exerted by the power reception-side resonant circuit on the amplitude of the current flowing through the power transmission-side coil flows through the auxiliary resonant circuit.

For example, preferably, in the non-contact power feeding system, the power reception device further includes a power reception-side control portion which can stop a resonant operation of the auxiliary resonant circuit caused as a result of the alternating magnetic field interlinking the auxiliary coil, and the power reception-side control portion stops the resonant operation of the auxiliary resonant circuit when the power is transmitted and received.

For example, preferably, in the non-contact power feeding system, when the power transmission device and the power reception device are in a predetermined positional relationship for transmitting and receiving the power, the auxiliary coil is arranged between the power transmission-side coil and the power reception-side coil or is arranged in a position on a side opposite to an arrangement position of the power transmission-side coil when seen from the power reception-side coil.

Advantages of the Invention

According to the present invention, it is possible to provide a power reception device and a non-contact power feeding system which contribute to the realization of proper operations.

BRIEF DESCRIPTION OF DRAWINGS

FIG. 1A and FIG. 1B are schematic external views of a power feeding device and an electronic device according to a first embodiment of the present invention;

FIG. 2 is a schematic internal configuration diagram of the power feeding device and the electronic device according to the first embodiment of the present invention;

FIG. 3 is a schematic internal configuration diagram of the power feeding device and the electronic device according to the first embodiment of the present invention;

FIG. 9 is a circuit diagram showing an example of a resonant state change circuit in the first embodiment of the present invention;

FIG. 10 is a circuit diagram showing another example of the resonant state change circuit in the first embodiment of the present invention;

FIG. 11A and FIG. 11B are respectively a schematic outline view and a schematic internal configuration diagram of a foreign object in the first embodiment of the present invention;

FIG. 14A to FIG. 14D are diagrams illustrating arrangement relationships between a power feeding stage, the electronic device and the foreign object;

FIG. 15 is a diagram showing an arrangement relationship between the power feeding stage, the electronic device and the foreign object;

FIG. 16 is a diagram illustrating the exchange of signals between the power feeding device and the electronic device in the first embodiment of the present invention;

FIG. 31A to FIG. 31C are diagrams showing a relationship of currents flowing through the metal plate, the power transmission-side coil and the power reception-side coil in the second embodiment of the present invention;

FIG. 32 is a diagram for illustrating a phase relationship between a voltage and a current in a power transmission-side resonant circuit in an example (EX2_1B) of the second embodiment of the present invention;

FIG. 33 is a diagram showing a relationship and actions of a plurality of currents in the example (EX2_1B) of the second embodiment of the present invention;

FIG. 34 is a transparent view of some components of a power feeding device and an electronic device in the example (EX2_1B) of the second embodiment of the present invention;

FIG. 35 is a positional relationship diagram of a power transmission-side coil, a power reception-side coil and a magnetic material plate which are assumed in an example (EX2_2A) of the second embodiment of the present invention;

FIG. 36A and FIG. 36B are diagrams showing a relationship of currents flowing through the power transmission-side coil, the power reception-side coil and the magnetic material plate in the example (EX2_2A) of the second embodiment of the present invention;

FIG. 37 is a diagram for illustrating a phase relationship between a voltage and a current in a power transmission-side resonant circuit in an example (EX2_2B) of the second embodiment of the present invention;

DESCRIPTION OF EMBODIMENTS

Figure 4:
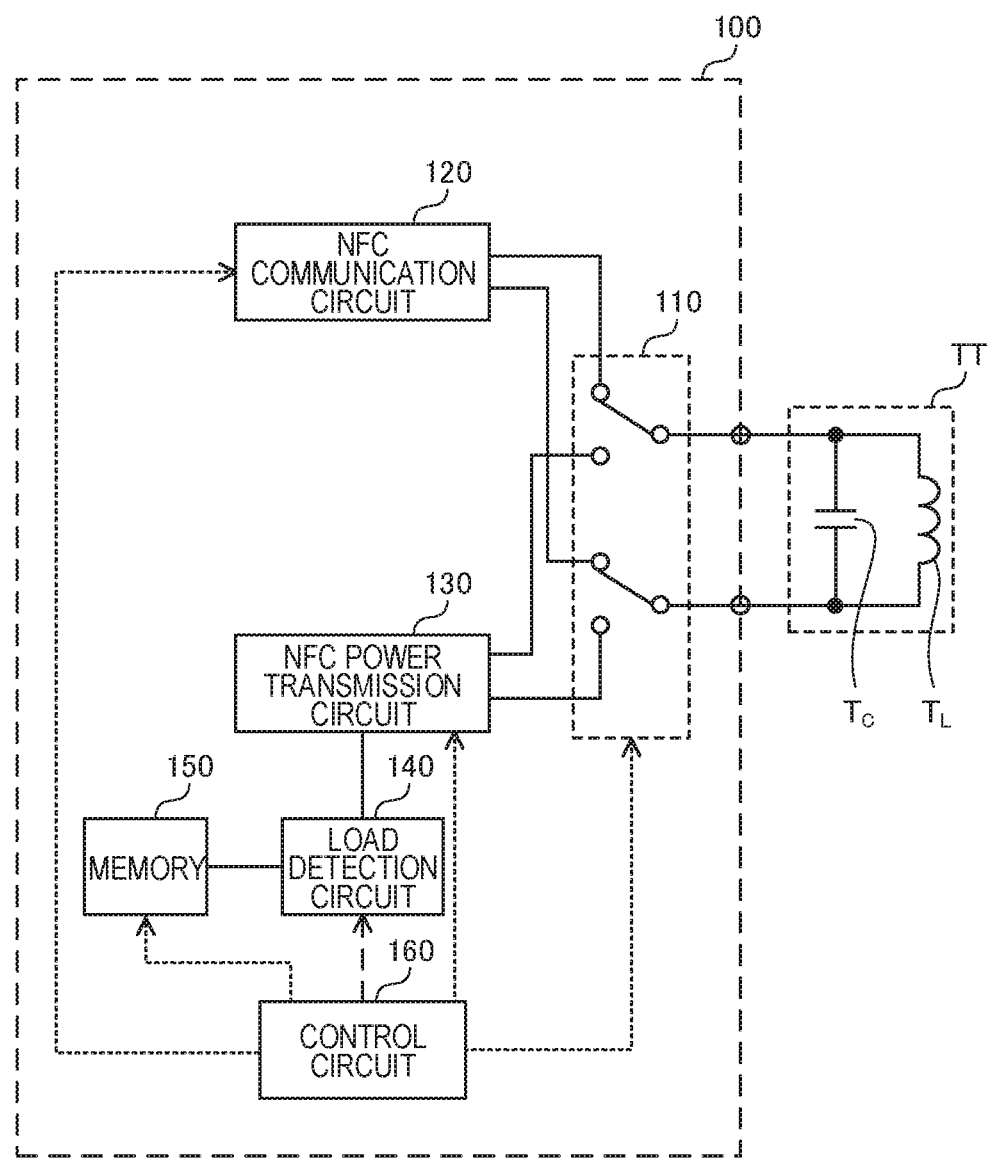
FIG. 4 is a partial configuration diagram of the power feeding device including an internal block diagram of an IC within the power feeding device in the first embodiment of the present invention.

Examples of the embodiment of the present invention will be specifically described below with reference to drawings.

In the drawings referenced, the same portions are identified with the same symbols, and the repeated description of the same portions will be omitted in principle. In the present specification, for simplification of description, signs or symbols which refer to information, signals, physical amounts, state amounts, members and the like are provided, and thus the names of the information, the signals, the physical amounts, the state amounts, the members and the like corresponding to the signs or symbols may be omitted or described in short. In an arbitrary flowchart which will be described later, a plurality of types of processing in an arbitrary plurality of steps can be arbitrarily changed in the order in which they are performed or can be performed at the same time unless otherwise a contradiction arises in the details of the processing.

First Embodiment

A first embodiment of the present invention will be described. FIG. 1A and FIG. 1B are schematic external views of a power feeding device 1 and an electronic device 2 according to the first embodiment of the present invention. Specifically, FIG. 1A is an external view of the power feeding device 1 and the electronic device 2 when they are in a separate state, and FIG. 1B is an external view of the power feeding device 1 and the electronic device 2 when they are in a reference arrangement state. The significance of the separate state and the reference arrangement state will be described in detail later. The power feeding device 1 and the electronic device 2 form a non-contact power feeding system. The power feeding device 1 includes a power supply plug 11 which receives commercial alternating current power and a power feeding stage 12 which is formed of a resin material.

FIG. 2 shows a schematic internal configuration diagram of the power feeding device 1 and the electronic device 2. The power feeding device 1 includes: an AC/DC conversion portion 13 which generates a direct current voltage having a predetermined voltage value from a commercial alternating current voltage input through the power supply plug 11 and which outputs the direct current voltage; a power transmission-side IC 100 (hereinafter also referred to as an IC 100) which is an integrated circuit that is driven by use of the output voltage of the AC/DC conversion portion 13; and a power transmission-side resonant circuit TT (hereinafter also referred to as a resonant circuit TT) which is connected to the IC 100. The AC/DC conversion portion 13, the power transmission-side IC 100 and the resonant circuit TT can be arranged within the power feeding stage 12. A circuit other than IC 100 which is driven by use of the output voltage of the AC/DC conversion portion 13 can be provided in the power feeding device 1.

The electronic device 2 includes: a power reception-side IC 200 (hereinafter also referred to as an IC 200) which is an integrated circuit; a power reception-side resonant circuit RR (hereinafter also referred to as a resonant circuit RR) which is connected to the IC 200; a battery 21 which is a secondary battery; and a functional circuit 22 which is driven based on the output voltage of the battery 21. The IC 200 can supply charging power to the battery 21 though the details thereof will be described later. The IC 200 may be driven by the output voltage of the battery 21 or may be driven based on a voltage from a voltage source other than the battery 21. A direct current voltage which is obtained by rectifying a signal for NFC communication (which will be described in detail later) received from the power feeding device 1 may serve as a drive voltage for the IC 200. In this case, even when the battery 21 does not have the remaining capacity, the IC 200 can be driven.

The electronic device 2 may be an arbitrary electronic device, and is, for example, a mobile phone (including a mobile phone classified as a smart phone), a portable information terminal, a tablet-type personal computer, a digital camera, an MP3 player, a pedometer or a Bluetooth (registered trademark) headset. The functional circuit 22 realizes an arbitrary function which needs to be realized by the electronic device 2. Hence, for example, when the electronic device 2 is a smart phone, the functional circuit 22 includes a call processing portion for realizing a call with the device of a party on the other end, a communication processing portion for transmitting and receiving information to and from other devices through a network and the like. For example, when the electronic device 2 is a digital camera, the functional circuit 22 includes a drive circuit which drives an image sensing element, an image processing circuit which generates image data from the output signal of the image sensing element and the like. It may be considered that the functional circuit 22 is a circuit which is provided in a device outside the electronic device 2.

As shown in FIG. 3, the resonant circuit TT includes a coil $T_L$ which is a power transmission-side coil and a capacitor $T_C$ which is a power transmission-side capacitor, and the resonant circuit RR includes a coil $R_L$ which is a power reception-side coil and a capacitor $R_C$ which is a power reception-side capacitor. In the following description, it is assumed that in order to give a concrete form to the description, unless otherwise described, the power transmission-side coil $T_L$ and the power transmission-side capacitor $T_C$ are connected in parallel to each other so as to form the resonant circuit TT as a parallel resonant circuit, and that the power reception-side coil $R_L$ and the power reception-side capacitor $R_C$ are connected in parallel to each other so as to form the resonant circuit RR as a parallel resonant circuit. However, the power transmission-side coil $T_L$ and the power transmission-side capacitor $T_C$ may be connected in series with each other so as to form the resonant circuit TT as a series resonant circuit, and the power reception-side coil $R_L$ and the power reception-side capacitor $R_C$ may be connected in series with each other so as to form the resonant circuit RR as a series resonant circuit.

As shown in FIG. 1B, when the electronic device 2 is placed within a predetermined region on the power feeding stage 12, by a magnetic field resonance method (that is, by the utilization of magnetic field resonance), it is possible to perform communication, power transmission and power reception between the devices 1 and 2. The magnetic field resonance is also referred to as magnetic field sympathetic oscillation or the like.

The communication between the devices 1 and 2 is wireless communication (hereinafter referred to as NFC communication) performed by NFC (Near field communication), and the frequency of a carrier for the communication is 13.56 MHz (megahertz). In the following description, 13.56 MHz is referred to as a reference frequency. Since the NFC communication between the devices 1 and 2 is performed by the magnetic field resonance method utilizing the resonant circuits TT and RR, the resonant frequencies of the resonant circuits TT and RR each are set to the reference frequency. In other words, the resonant frequency of the resonant circuit TT determined by the inductance value of the power transmission-side coil $T_L$ and the capacitance value of the power transmission-side capacitor $T_C$ and the resonant frequency of the resonant circuit RR determined by the inductance value of the power reception-side coil $R_L$ and the capacitance value of the power reception-side capacitor $R_C$ coincide with the reference frequency. However, the resonant frequency of the resonant circuit RR can be temporarily changed from the reference frequency as will be described later.

The power transmission and the power reception between the devices 1 and 2 are the power transmission performed by the NFC from the power feeding device 1 to the electronic device 2 and the power reception performed by the NFC in the electronic device 2. The power transmission and the power reception are collectively referred to as NFC power transfer or simply referred to as power transfer. Power is transmitted by the magnetic field resonance method from the coil $T_L$ to the coil $R_L$, and thus the power transfer is realized in a non-contact manner.

In the power transfer utilizing the magnetic field resonance, an alternating current is passed through the power transmission-side coil $T_L$, and thus an alternating magnetic field at the reference frequency is generated in the power transmission-side coil $T_L$. Then, the alternating magnetic field is transmitted to the resonant circuit RR which resonates at the reference frequency (that is, which performs sympathetic oscillation) such that an alternating current flows through the power reception-side coil $R_L$. In other words, power is transmitted from the resonant circuit TT including the power transmission-side coil $T_L$ to the resonant circuit RR including the power reception-side coil $R_L$. In the following description, the magnetic field which is generated by the coil $T_L$ or the coil $R_L$ in the NFC communication or the power transfer is the alternating magnetic field which oscillates at the reference frequency unless otherwise described though the description thereof may be omitted.

A state where the electronic device 2 is placed within a predetermined power transmission region on the power feeding stage 12 (the power feeding device 1 and the electronic device 2 are in a predetermined positional relationship) such that it is possible to realize the NFC communication and the power transfer described above is referred to as the reference arrangement state (see FIG. 1B). On the other hand, a state where the electronic device 2 is located sufficiently away from the power feeding stage 12 such that it is impossible to realize the NFC communication and the power transfer described above is referred to as the separate state (see FIG. 1A). Although in the power feeding stage 12 shown in FIG. 1A, the front surface is flat, a recess or the like which corresponds to the shape of the electronic device 2 to be placed thereon may be formed in the power feeding stage 12. The reference arrangement state may be interpreted so as to belong to a state where the electronic device 2 is present in the predetermined power transmission region (that is, the region for performing the power transmission and the power reception) in which it is possible to perform the transmission and reception of power between the power feeding device 1 and the electronic device 2, and the separate state may be interpreted so as to belong to a state where the electronic device 2 is not present in the power transmission region.

Figure 5:
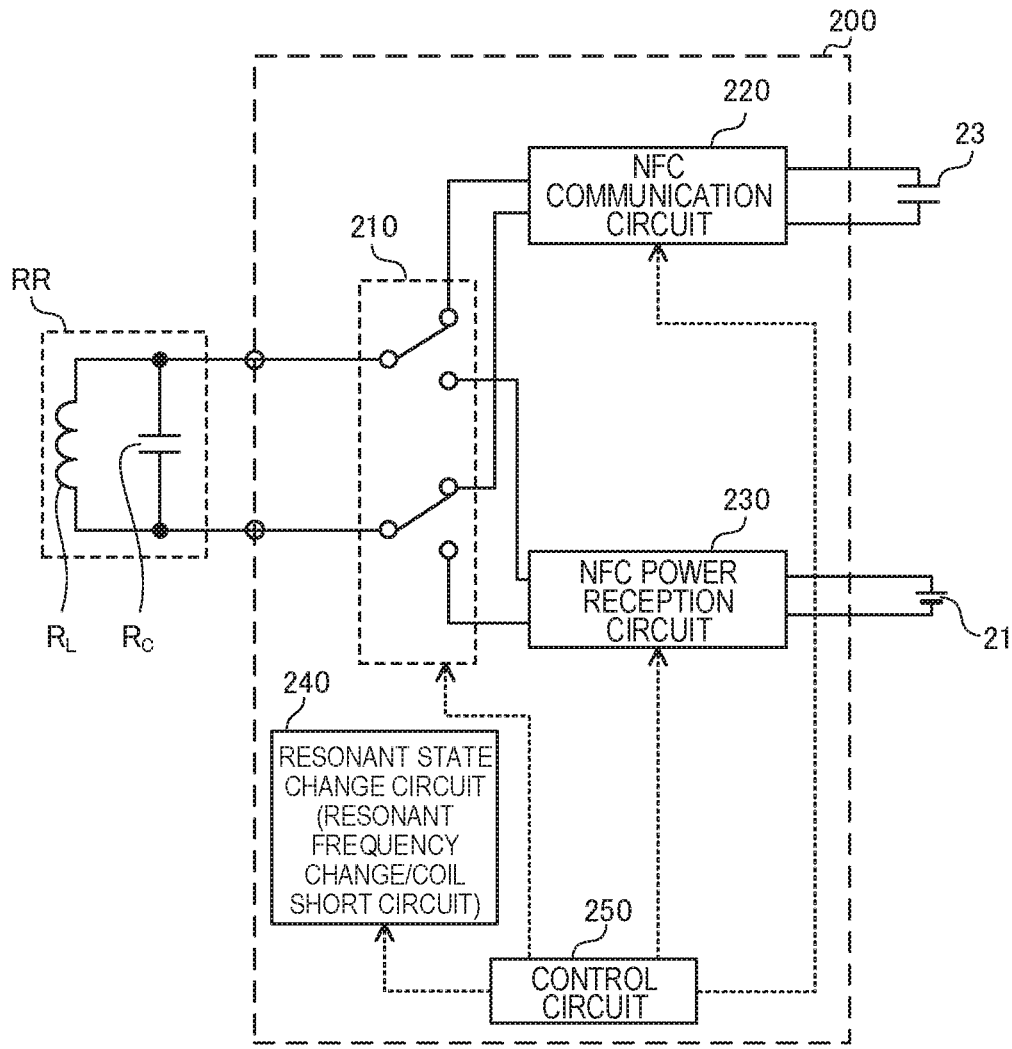
FIG. 5 is a partial configuration diagram of the electronic device including an internal block diagram of an IC within the electronic device in the first embodiment of the present invention.

FIG. 4 shows a partial configuration diagram of the power feeding device 1 including an internal block diagram of the IC 100. In the IC 100, individual portions are provided which are represented by symbols 110, 120, 130, 140, 150 and 160. FIG. 5 shows a partial configuration diagram of the electronic device 2 including an internal block diagram of the IC 200. In the IC 200, individual portions are provided which are represented by symbols 210, 220, 230, 240 and 250. A capacitor 23 which outputs the drive voltage for the IC 200 may be connected to the IC 200. The capacitor 23 can output the direct current voltage obtained by rectifying the signal for the NFC communication received from the power feeding device 1.

The switching circuit 110 connects, under control of the control circuit 160, either of the NFC communication circuit 120 and the NFC power transmission circuit 130 to the resonant circuit TT. The switching circuit 110 can be formed with a plurality of switches which are interposed between the resonant circuit TT and the circuits 120 and 130. An arbitrary switch which is described in the present specification may be formed with a semiconductor switching element such as a field effect transistor.

The switching circuit 210 connects, under control of the control circuit 250, the resonant circuit RR to either of the NFC communication circuit 220 and the NFC power reception circuit 230. The switching circuit 210 can be formed with a plurality of switches which are interposed between the resonant circuit RR and the circuits 220 and 230.

A state where the resonant circuit TT is connected through the switching circuit 110 to the NFC communication circuit 120 and where the resonant circuit RR is connected through the switching circuit 210 to the NFC communication circuit 220 is referred to as a communication connection state. In the communication connection state, the NFC communication can be performed. In the communication connection state, the NFC communication circuit 120 can supply an alternating current signal (an alternating current voltage) at the reference frequency to the resonant circuit TT. The NFC communication between the devices 1 and 2 is performed by a half-duplex method.

When in the communication connection state, the power feeding device 1 is a transmission side, an arbitrary information signal is superimposed on the alternating current signal supplied by the NFC communication circuit 120 to the resonant circuit TT, and thus the information signal is transmitted from the coil $T_L$ serving as a power feeding device-side antenna coil and is received by the coil $R_L$ serving as an electronic device-side antenna coil. The information signal received in the coil $R_L$ is extracted in the NFC communication circuit 220. When in the communication connection state, the electronic device 2 is the transmission side, the NFC communication circuit 220 can transmit an arbitrary information signal (response signal) from the coil $R_L$ in the resonant circuit RR to the coil $T_L$ in the resonant circuit TT. As is known, this transmission is realized by a load modulation method in which based on an ISO standard (for example, ISO14443 standard), the impedance of the coil $R_L$ (the electronic device-side antenna coil) seen from the coil $T_L$ (the power feeding device-side antenna coil) is changed. The information signal transmitted from the electronic device 2 is extracted in the NFC communication circuit 120.

A state where the resonant circuit TT is connected through the switching circuit 110 to the NFC power transmission circuit 130 and where the resonant circuit RR is connected through the switching circuit 210 to the NFC power reception circuit 230 is referred to as a power feeding connection state.

In the power feeding connection state, the NFC power transmission circuit 130 can perform a power transmission operation, and the NFC power reception circuit 230 can perform a power reception operation. The power transfer is realized by the power transmission operation and the power reception operation. In the power transmission operation, the power transmission circuit 130 supplies, to the resonant circuit TT, a power transmission alternating current signal (power transmission alternating current voltage) at the reference frequency so as to generate a power transmission magnetic field (power transmission alternating magnetic field) at the reference frequency in the power transmission-side coil $T_L$, and thus power is transmitted by the magnetic field resonance method from the resonant circuit TT (the power transmission-side coil $T_L$) to the resonant circuit RR. The power received in the power reception-side coil $R_L$ based on the power transmission operation is fed to the power reception circuit 230, and in the power reception operation, the power reception circuit 230 generates arbitrary direct current power from the received power and outputs it. With the output power of the power reception circuit 230, it is possible to charge the battery 21.

Figure 6:
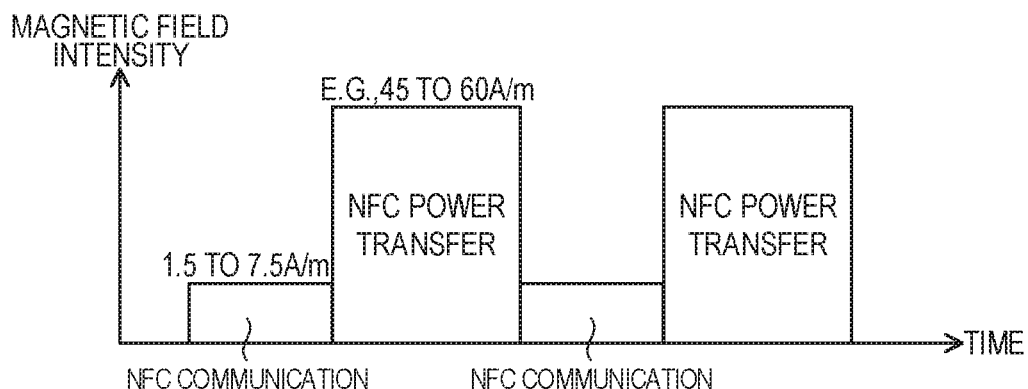
FIG. 6 is a diagram showing a change in a magnetic field intensity when NFC communication and power transfer are alternately performed.

Although a magnetic field is also generated in the coil $T_L$ or $R_L$ when the NFC communication is performed in the communication connection state, a magnetic field intensity in the NFC communication falls within a predetermined range. The lower limit value and the upper limit value in the range are defined in the standard of the NFC so as to be 1.5 A/m and 7.5 A/m, respectively. By contract, in the power transfer (that is, the power transmission operation), the intensity of a magnetic field (the magnetic field intensity of the power transmission magnetic field) generated in the power transmission-side coil $T_L$ is more than the upper limit value described above so as to be, for example, about 45 to 60 A/m. In the non-contact power feeding system including the devices 1 and 2, it is possible to alternately perform the NFC communication and the power transfer (NFC power transfer), and the state of a magnetic field intensity at that time is shown in FIG. 6.

Figure 7:
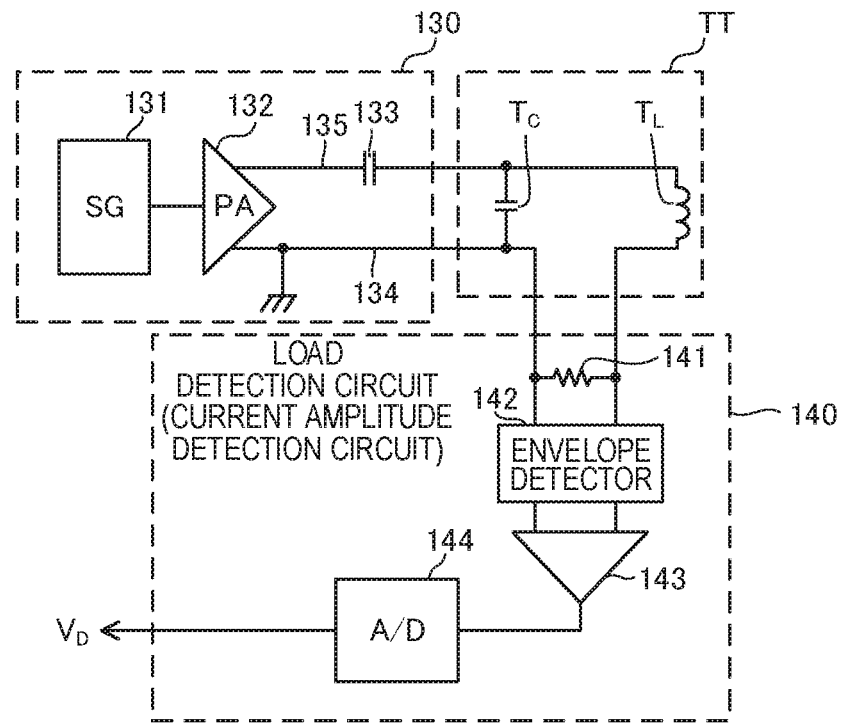
FIG. 7 is a diagram showing a relationship between a power transmission circuit, a load detection circuit and a resonant circuit within the power feeding device.

The load detection circuit 140 detects the magnitude of a load for the power transmission-side coil $T_L$, that is, the magnitude of a load for the power transmission-side coil $T_L$ when the alternating current signal is supplied from the power transmission circuit 130 to the power transmission-side coil $T_L$. FIG. 7 shows a relationship between the power transmission circuit 130, the load detection circuit 140 and the resonant circuit TT in the power feeding connection state. In FIG. 7, the switching circuit 110 is omitted.

The power transmission circuit 130 includes: a signal generator 131 which generates a sinusoidal signal at the reference frequency; an amplifier (power amplifier) 132 which amplifies the sinusoidal signal generated in the signal generator 131 so as to output the amplified sinusoidal signal between lines 134 and 135 with reference to the potential of the line 134; and a capacitor 133. On the other hand, the load detection circuit 140 includes a sense resistor 141, an envelope detector 142, an amplifier 143 and an A/D converter 144. Although the intensity of the sinusoidal signal generated by the signal generator 131 is fixed to a constant value, the amplification factor of the amplifier 132 is variably set by the control circuit 160.

One end of the capacitor 133 is connected to the line 135. In the power feeding connection state, the other end of the capacitor 133 is connected in common to one ends of the capacitor $T_C$ and the coil $T_L$, and the other end of the coil $T_L$ is connected in common to the line 134 and the other end of the capacitor $T_C$ through the sense resistor 141.

Figure 8:
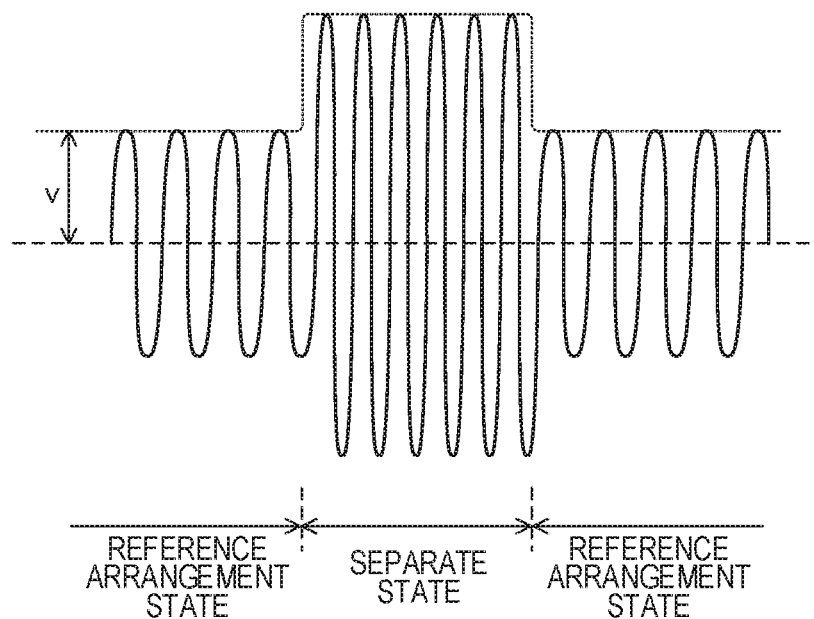
FIG. 8 is a waveform diagram of a voltage drop in a sense resistor within the load detection circuit of FIG. 7.

The power transmission operation is realized by supplying the alternating current signal (power transmission alternating current voltage) from the amplifier 132 through the capacitor 133 to the resonant circuit TT. In the power feeding connection state, the alternating current signal from the amplifier 132 is supplied to the resonant circuit TT, and thus an alternating current at the reference frequency flows through the power transmission-side coil $T_L$, with the result that an alternating current voltage drop is produced in the sense resistor 141. The solid line waveform of FIG. 8 is a voltage waveform of the voltage drop in the sense resistor 141. When on the resonant circuit TT, under the conditions in which the intensity of the magnetic field generated in the power transmission-side $T_L$ is constant, the electronic device 2 is brought close to the power feeding stage 12, a current based on the magnetic field generated in the power transmission-side coil $T_L$ flows through the power reception-side coil $R_L$ whereas a counter electromotive force based on the current flowing through the power reception-side coil $R_L$ is generated in the power transmission-side coil $T_L$, and the counter electromotive force acts so as to reduce the current flowing through the power transmission-side coil $T_L$. Hence, as shown in FIG. 8, the amplitude of the voltage drop of the sense resistor 141 in the reference arrangement state is smaller than that in the separate state.

The envelope detector 142 detects the envelope of a signal of the voltage drop in the sense resistor 141 so as to output an analogue voltage signal proportional to the voltage v of FIG. 8. The amplifier 143 amplifies the output signal of the envelope detector 142 and outputs it. The A/D converter 144 converts the output voltage signal of the amplifier 143 into a digital signal so as to output a digital voltage value $V_D$. As is understood from the above description, the voltage value $V_D$ has a value proportional to the amplitude of the current flowing through the sense resistor 141 (hence, the amplitude of the current flowing through the power transmission-side coil $T_L$) (as the amplitude is increased, the voltage value $V_D$ is also increased). Hence, the load detection circuit 140 can be said to be a current amplitude detection circuit which detects the amplitude of the current flowing through the power transmission-side coil $T_L$, and the amplitude detection value thereof can be considered to be the voltage value $V_D$. The envelope detector 142 may be provided in a stage subsequent to the amplifier 143. However, as shown in FIG. 7, when the envelope detector 142 is provided in a stage preceding the amplifier 143, it is advantageously possible to adopt, as the amplifier 143, an amplifier whose response performance for high-frequency waves is lower.

For the power transmission-side coil $T_L$ which generates a magnetic field, a coil such as the power reception-side coil $R_L$ which is magnetically coupled to the power transmission-side coil $T_L$ can be considered to be a load, and depending on the magnitude of the load, the voltage value $V_D$ which is the detection value of the load detection circuit 140 is changed. Hence, it can also be considered that the load detection circuit 140 detects the magnitude of the load by the output of the voltage value $V_D$. The magnitude of the load here can be said to be the magnitude of the load for the power transmission-side coil $T_L$ in the power transmission or can be said to be the magnitude of the load of the electronic device 2 in the power transmission which is seen from the power feeding device 1. The sense resistor 141 may be provided within the IC 100 or may be provided outside the IC 100.

The memory 150 (see FIG. 4) is formed with a nonvolatile memory, and stores arbitrary information in a nonvolatile manner. The control circuit 160 comprehensively controls the operations of the individual portions within the IC 100. The control performed by the control circuit 160 includes, for example, control on the switching operation of the switching circuit 110, control on the details of the communication operation and the power transmission operation of the communication circuit 120 and the power transmission circuit 130 and control on whether or not the operations are performed, control on the operation of the load detection circuit 140 and control on the storage of the memory 150 and control on the reading thereof. The control circuit 160 incorporates a timer (unillustrated), and thereby can measure the length of a time between arbitrary timings.

The resonant state change circuit 240 (see FIG. 5) in the electronic device 2 is a resonant frequency change circuit which can change the resonant frequency of the resonant circuit RR from the reference frequency to another predetermined frequency $f_M$ or a coil short circuit which can short-circuit the power reception-side coil $R_L$ in the resonant circuit RR.

A resonant frequency change circuit 240A in FIG. 9 is an example of the resonant frequency change circuit serving as the resonant state change circuit 240. The resonant frequency change circuit 240A is formed with a series circuit of a capacitor 241 and a switch 242, one end of the series circuit is connected in common to one ends of the capacitor $R_C$ and the coil $R_L$ and the other end of the series circuit is connected in common to the other ends of the capacitor $R_C$ and the coil $R_L$. The switch 242 is turned on or off under control of the control circuit 250. When the switch 242 is turned off, the capacitor 241 is separated from the capacitor $R_C$ and the coil $R_L$, and thus when a parasitic inductance and a parasitic capacitance are ignored, the resonant circuit RR is formed with only the coil $R_L$ and the capacitor $R_C$, and the resonant frequency of the resonant circuit RR coincides with the reference frequency. In other words, when the switch 242 is turned off, a power reception-side capacitance for determining the resonant frequency of the resonant circuit RR is the capacitor $R_C$ itself. When the switch 242 is turned on, since the capacitor 241 is connected in parallel to the capacitor $R_C$, the resonant circuit RR is formed with the coil $R_L$ and the combined capacitance of the capacitors $R_C$ and 241, with the result that the resonant frequency of the resonant circuit RR is the frequency $f_M$ which is lower than the reference frequency. In other words, when the switch 242 is turned on, the power reception-side capacitance for determining the resonant frequency of the resonant circuit RR is the combined capacitance described above. Here, it is assumed that when the switch 242 is turned on, the frequency $f_M$ is separated from the reference frequency such that the resonant circuit RR does not function as the load for the power transmission-side coil $T_L$ (that is, such that magnetic field resonance is not sufficiently produced between the resonant circuits TT and RR). For example, the resonant frequency (that is, the frequency $f_M$) of the resonant circuit RR when the switch 242 is turned on is set to several hundred kHz to 1 MHz.

As long as the resonant frequency of the resonant circuit RR can be changed to the frequency $f_M$, the resonant frequency change circuit serving as the change circuit 240 is not limited to the resonant frequency change circuit 240A, and the frequency $f_M$ may be higher than the reference frequency. For example, the resonant frequency change circuit may be a circuit which switches connection and non-connection between the coil $R_L$ and the capacitor $R_C$ by turning on and off a switch that is inserted in series on a current loop for connecting the coil $R_L$ and the capacitor $R_C$ (when the state is switched to the non-connection, the resonant frequency (>>the reference frequency) of the resonant circuit RR is determined by the coil $R_L$ and the parasitic capacitance of the wiring). In other words, with consideration given to the fact that the power reception-side resonant circuit RR can be a series resonant circuit, the following can be said. The power reception-side resonant circuit RR includes the parallel circuit or the series circuit of the power reception-side coil ($R_L$) and the power reception-side capacitance, and the power reception-side capacitance coincides with a predetermined reference capacitance, the resonant frequency $f_O$ of the power reception-side resonant circuit RR coincides with the reference frequency. The resonant frequency change circuit increases or decreases the power reception-side capacitance from the reference capacitance with necessary timing. In this way, in the power reception-side resonant circuit RR, the parallel circuit or the series circuit is formed with the power reception-side coil ($R_L$) and the power reception-side capacitance which is higher or lower than the reference capacitance, with the result that the resonant frequency $f_O$ of the power reception-side resonant circuit RR is changed from the reference frequency.

A coil short circuit 240B in FIG. 10 is an example of the coil short circuit serving as the resonant state change circuit 240. The coil short circuit 240B is formed with a switch 243 that is connected (inserted) between a node to which the one end of the capacitor $R_C$ and one end of the coil $R_L$ in the resonant circuit RR are connected in common and a node to which the other end of the capacitor $R_C$ and the other end of the coil $R_L$ in the resonant circuit RR are connected in common. The switch 243 is turned on or off under control of the control circuit 250. When the switch 243 is turned on, the coil $R_L$ in the resonant circuit RR is short-circuited (more specifically, both ends of the coil $R_L$ are short-circuited). In a state where the power reception-side coil $R_L$ is short-circuited, the power reception-side resonant circuit RR is not present (a state equivalent to the state where the power reception-side resonant circuit RR is not present is entered). Hence, while the power reception-side coil $R_L$ is being short-circuited, the load for the power transmission-side coil $T_L$ is sufficiently reduced (that is, a state as if the electronic device 2 were not present on the power feeding stage 12 is entered). As long as the power reception-side coil $R_L$ can be short-circuited, the coil short circuit serving as the change circuit 240 is not limited to the coil short circuit 240B.

In the following description, an operation of changing the resonant frequency $f_O$ of the power reception-side resonant circuit RR from the reference frequency to the predetermined frequency $f_M$ is referred to as a resonant frequency change operation, and an operation of short-circuiting the power reception-side coil $R_L$ with the coil short circuit is referred to as a coil short circuit operation. For simplification of description, the resonant frequency change operation or the coil short circuit operation is also referred to as an $f_O$ change/short circuit operation.

The control circuit 250 (see FIG. 5) comprehensively controls the operations of the individual portions within the IC 200. The control performed by the control circuit 250 includes, for example, control on the switching operation of the switching circuit 210, control on the details of the communication operation and the power reception operation of the communication circuit 220 and the power reception circuit 230 and control on whether or not the operations are performed and control on the operation of the change circuit 240. The control circuit 250 incorporates a timer (unillustrated), and thereby can measure the length of a time between arbitrary timings. For example, the timer in the control circuit 250 can measure a time during which the changing of the resonant frequency $f_O$ to the predetermined frequency $f_M$ or the short-circuiting of the power reception-side coil $R_L$ by the $f_O$ change/short circuit operation is maintained (that is, the measurement of a time $T_M$ which will be described later; see step S207 in FIG. 19).

Incidentally, the control circuit 160 of the power feeding device 1 determines whether or not a foreign object is present on the power feeding stage 12, and can control the power transmission circuit 130 such that only when the foreign object is not present, the power transmission operation is performed. The foreign object in the present embodiment differs from the electronic device 2 and the constituent elements of the electronic device 2 (such as the power reception-side coil $R_L$), and includes an object which can generate a current (current within the foreign object) based on the magnetic field generated in the power transmission-side coil $T_L$ when the object is brought close to the power feeding device 1. In the present embodiment, the presence of the foreign object may be interpreted so as to mean that the foreign object is present in such a position that an unignorable current based on the magnetic field generated in the power transmission-side coil $T_L$ flows within the foreign object. The current flowing within the foreign object based on the magnetic field generated in the power transmission-side coil $T_L$ generates an electromotive force (or a counter electromotive force) in the coil ($T_L$ or $R_L$) which is opposite the foreign object and is coupled thereto, with the result that the current can exert an unignorable influence on the properties of the circuit including the coil.

FIG. 11A shows a schematic outline view of a foreign object 3 which is one type of foreign object, and FIG. 11B shows a schematic internal configuration diagram of the foreign object 3. The foreign object 3 includes a resonant circuit JJ which is formed with a parallel circuit of a coil $J_L$ and a capacitor $J_C$ and a foreign object internal circuit 300 which is connected to the resonant circuit JJ. The resonant frequency of the resonant circuit JJ is set to the reference frequency. Unlike the electronic device 2, the foreign object 3 is a device which does not correspond to the power feeding device 1. For example, the foreign object 3 is an object (such as a non-contact IC card) which includes a wireless IC tag having an antenna coil (the coil $J_L$) of 13.56 MHz that does not respond to the NFC communication. For example, the foreign object 3 is also an electronic device which has an NFC communication function itself but in which the function is disabled. For example, a smart phone which has the NFC communication function but in which the function is turned off by a software setting can be the foreign object 3. A smart phone in which the NFC communication function is enabled but which does not have a power reception function is also classified as the foreign object 3.

If in a state where the foreign object 3 described above is arranged on the power feeding stage 12, the power feeding device 1 performs the power transmission operation, the foreign object 3 may be destroyed by a strong magnetic field (for example, a magnetic field having a magnetic field intensity of 12 A/m or more) generated in the power transmission-side coil $T_L$. For example, the strong magnetic field at the time of the power transmission operation may increase the terminal voltage of the coil $J_L$ in the foreign object 3 on the power feeding stage 12 to 100 to 200V, and unless a foreign object 3 which can withstand such a high voltage is formed, the foreign object 3 is destroyed.

[pFOD Processing (pFOD Processing Before Power Transfer)]

Figure 12:
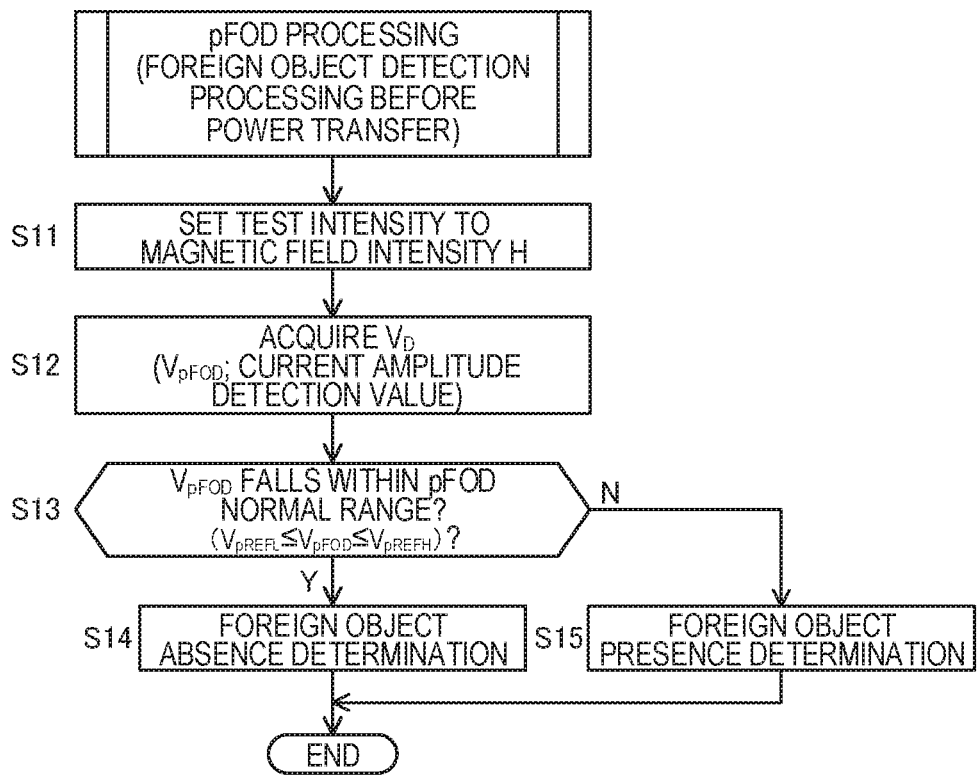
FIG. 12 is an operational flowchart of pFOD processing which is performed in the power feeding device.

Foreign object detection processing for detecting whether or not the foreign object is present will be described with reference to FIG. 12. FIG. 12 is a flowchart of the foreign object detection processing (hereinafter referred to as pFOD processing) which is performed by the power feeding device 1 before the power transfer.

When the pFOD processing is performed, the power transmission circuit 130 is connected to the resonant circuit TT. In the pFOD processing, the control circuit 160 first sets, in step S11, the magnetic field intensity H of the power transmission-side coil $T_L$ to a predetermined test intensity. The magnetic field intensity H is the intensity of a magnetic field generated in the power transmission-side coil $T_L$, and more specifically, the magnetic field intensity H indicates the magnetic field intensity of an alternating magnetic field which is generated in the power transmission-side coil $T_L$ and which oscillates at the reference frequency. The setting of the magnetic field intensity H to the test intensity means the controlling of the power transmission circuit 130 such that a predetermined test alternating current signal (test alternating current voltage) is supplied to the resonant circuit TT, and indicates that a test magnetic field of the alternating magnetic field which has the test intensity and which oscillates at the reference frequency is generated in the power transmission-side coil $T_L$. The test intensity which is the magnetic field intensity of the test magnetic field is significantly lower than the intensity of the magnetic field (that is, the magnetic field intensity of the power transmission magnetic field; for example, 45 to 60 A/m) generated in the power transmission-side coil $T_L$ in the power transfer (that is, the power transmission operation), and falls within a range from a lower limit value of "1.5 A/m" to an upper limit value of "7.5 A/m" in a communication magnetic field intensity. Hence, the foreign object 3 is prevented from being subjected to destruction or the like by the test magnetic field or is unlikely to be subjected thereto. The control circuit 160 controls the amplification factor of the amplifier 132 (see FIG. 7) and thereby can variably set the magnetic field intensity H. The amplification factor of the amplifier 132 is preferably controlled such that when the test magnetic field is generated, the predetermined test alternating current voltage is supplied and applied to the resonant circuit TT and that when the power transmission magnetic field is generated, a predetermined power transmission alternating current voltage which has a larger amplitude than the test alternating current voltage is supplied and applied to the resonant circuit TT.

In step S12 subsequent to step S11, the control circuit 160 uses the load detection circuit 140 so as to acquire, as a current amplitude detection value $V_{pFOD}$, the voltage value $V_D$ when the test magnetic field is generated. The current amplitude detection value $V_{pFOD}$ has a value corresponding to the amplitude of the current flowing through the power transmission-side coil $T_L$ when the test magnetic field is generated in the power transmission-side coil $T_L$. During a period in which the pFOD processing is performed, according to an instruction from the power feeding device 1 through the NFC communication, in the electronic device 2, the $f_O$ change/short circuit operation (the resonant frequency change operation or the coil short circuit operation) is performed. Hence, the resonant circuit RR (the power reception-side coil $R_L$) does not substantially function as a load for the power transmission-side coil $T_L$, and thus the current amplitude detection value $V_{pFOD}$ is prevented from being reduced or is hardly reduced.

In step S13 subsequent to step S12, the control circuit 160 determines whether or not the current amplitude detection value $V_{pFOD}$ falls within a predetermined pFOD normal range. Then, when the current amplitude detection value $V_{pFOD}$ falls within the pFOD normal range, the control circuit 160 determines that the foreign object 3 is not present on the power feeding stage 12 (step S14). This determination is referred to as a foreign object absence determination. On the other hand, when the current amplitude detection value $V_{pFOD}$ falls outside the pFOD normal range, the control circuit 160 determines that the foreign object 3 is present on the power feeding stage 12 (step S15). This determination is referred to as a foreign object presence determination. When the foreign object absence determination is made, the control circuit 160 determines that the power transmission operation can be performed by the power transmission circuit 130 so as to allow the performance of the power transmission operation (the power transmission using the resonant circuit TT) whereas when the foreign object presence determination is made, the control circuit 160 determines that the power transmission operation cannot be performed by the power transmission circuit 130 so as to prohibit the performance of the power transmission operation. When the control circuit 160 determines that the power transmission operation can be performed, in the power transmission operation, the control circuit 160 can control the power transmission circuit 130 such that a predetermined power transmission magnetic field is generated in the power transmission-side coil $T_L$.

The pFOD normal range is a range which is equal to or more than a predetermined lower limit value $V_{pREFL}$ but equal to or less than a predetermined upper limit value $V_{pREFH}$ ($0<V_{pREFL}<V_{pREFH}$). Hence, when a determination inequality "$V_{pREFL} \leq V_{pFOD} \leq V_{pREFH}$" is satisfied, the foreign object absence determination is made whereas when the determination inequality is not satisfied, the foreign object presence determination is made.

In a case where the foreign object 3 is present on the power feeding stage 12 when the pFOD processing is performed, the resonant circuit JJ (the coil $J_L$) of the foreign object 3 functions as a load for the power transmission-side coil $T_L$, with the result that as compared with a case where the foreign object 3 is not present on the power feeding stage 12, the current amplitude detection value $V_{pFOD}$ is reduced.

As the foreign object, a foreign object 3a (unillustrated) which is different from the foreign object 3 can also be considered. The foreign object 3a is, for example, a metal object (an aluminum foil or an aluminum plate) which is formed so as to contain aluminum or a metal object which is formed so as to contain copper. In a case where the foreign object 3a is present on the power feeding stage 12 when the pFOD processing is performed, as compared with a case where the foreign object 3a is not present on the power feeding stage 12, the current amplitude detection value $V_{pFOD}$ is increased by electrical and magnetic action.

Before the power transfer is performed, the lower limit value $V_{pREFL}$ and the upper limit value $V_{pREFH}$ are previously set and stored in the memory 150 through experiments such that when the foreign object 3 is present on the power feeding stage 12, the current amplitude detection value $V_{pFOD}$ falls below the lower limit value $V_{pREFL}$, that when the foreign object 3a is present on the power feeding stage 12, the current amplitude detection value $V_{pFOD}$ exceeds the upper limit value $V_{pREFH}$ and that when the foreign object (3 or 3a) is not present on the power feeding stage 12, the current amplitude detection value $V_{pFOD}$ falls within the pFOD normal range.

When the power transmission magnetic field is generated in a state where the foreign object 3a is present on the power feeding stage 12, power may be absorbed by the foreign object 3a, and thus the foreign object 3a may generate heat. In the present embodiment, since it is assumed that the reference frequency serving as a carrier frequency in the power transfer is 13.56 MHz, it can be said that it is highly unlikely that the foreign object 3a generates heat. Hence, a configuration may be adopted in which without any consideration being given to the presence of the foreign object 3a, only when the current amplitude detection value $V_{pFOD}$ falls below the lower limit value $V_{pREFL}$, the foreign object presence determination is made, and in which when the current amplitude detection value $V_{pFOD}$ is equal to or more than the lower limit value $V_{pREFL}$, the foreign object absence determination is constantly made (in other words, the upper limit value $V_{pREFH}$ may be abolished). However, in the invention according to the present embodiment, the reference frequency is not limited to 13.56 MHz, and when the reference frequency is set to, for example, several hundred kHz, it is highly likely that the foreign object 3a generates heat, with the result that it is preferable to adopt the above method in which not only the lower limit value $V_{pREFL}$ but also the upper limit value $V_{pREFH}$ is determined to be within the pFOD normal range.

Figure 13:
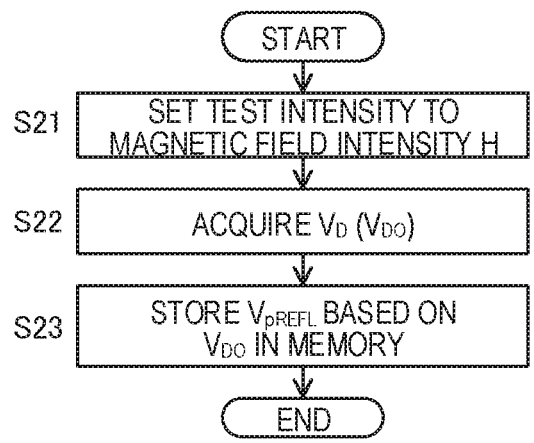
FIG. 13 is an operational flowchart of initial setting processing which is performed in the power feeding device.

An additional description will be given of the method of determining the lower limit value $V_{pREFL}$. The lower limit value $V_{pREFL}$ is determined in initial setting processing. FIG. 13 is an operational flowchart of the initial setting processing. The initial setting processing is performed by the IC 100 under an initial setting environment below. In the initial setting environment, a load for the power transmission-side coil $T_L$ is not present at all or is small enough to be ignored, and an object (including a coil which is magnetically coupled to the power transmission-side coil $T_L$) which can produce a current by the magnetic field generated in the power transmission-side coil $T_L$ is not present except the constituent components of the power feeding device 1. The separate state of FIG. 1A may be considered to satisfy the initial setting environment. In order to ensure the acquisition of the initial setting environment, for example, the initial setting processing may be performed such as when the power feeding device 1 is manufactured or shipped. However, as long the initial setting environment can be acquired, the initial setting processing can be performed with arbitrary timing.

When the initial setting processing is performed, the power transmission circuit 130 is connected to the resonant circuit TT. Then, in step S21, the magnetic field intensity H of the power transmission-side coil $T_L$ is set to the predetermined test intensity, and in step S22 subsequent thereto, in the set state, the voltage value $V_D$ acquired from the A/D converter 144 is obtained as a voltage value $V_{DO}$. Thereafter, in step S23, the lower limit value $V_{pREFL}$ based on the voltage value $V_{DO}$ is stored in the memory 150. The lower limit value $V_{pREFL}$ is set lower than the voltage value $V_{DO}$ such that only under the presence of the foreign object 3, the foreign object presence determination is made in the pFOD processing. For example, it is preferable to make a setting such that "$V_{pREFL}=V_{DO}-\Delta V$" or "$V_{pREFL}=V_{DO} \times k$". Here, $\Delta V$ is a predetermined positive minute value (however, it is possible to make a setting such that $\Delta V=0$). Here, k is a coefficient which has a positive predetermined value less than 1. The voltage value $V_D$ which can be obtained when under the initial setting environment, the magnetic field intensity H is set to the predetermined test intensity can be estimated in a design stage. Based on the value derived by this estimation, without the initial setting processing being performed, the lower limit value $V_{pREFL}$ may be determined and stored in the memory 150.

Consider first to fourth cases on the detection of the foreign object 3 with reference to FIG. 14A to FIG. 14D. In the first case, only the electronic device 2 is present on the power feeding stage 12. In the second case, the electronic device 2 and the foreign object 3 are present on the power feeding stage 12. In the third case, only the foreign object 3 is present on the power feeding stage 12. In the fourth case, neither the electronic device 2 nor the foreign object 3 is present on the power feeding stage 12.

Since as described previously, during the period in which the pFOD processing is performed, in the electronic device 2, the $f_O$ change/short circuit operation is performed, in the first case, the load for the power transmission-side coil $T_L$ is sufficiently reduced (that is, the state as if the electronic device 2 were not present on the power feeding stage 12 is entered), and thus the current amplitude detection value $V_{pFOD}$ is sufficiently increased, with the result that the foreign object absence determination is made. On the other hand, in the second case, although the resonant frequency of the resonant circuit RR is changed to the frequency $f_M$ or the power reception-side coil $R_L$ is short-circuited, since the foreign object 3 continues to be present as the load for the power transmission-side coil $T_L$ (since the resonant frequency of the resonant circuit JJ in the foreign object 3 remains the reference frequency), the current amplitude detection value $V_{pFOD}$ is sufficiently decreased, with the result that the foreign object presence determination is made.

In the third and fourth cases, since the electronic device 2 which responds to the NFC communication is not present on the power feeding stage 12, the power transmission operation is not necessary in the first place, and thus the pFOD processing itself is not performed. The power feeding device 1 can determine, by the NFC communication, whether or not the electronic device 2 which can handle the power transfer is present on the power feeding stage 12. The state where the foreign object 3 is present on the power feeding stage 12 is not limited to a state where the foreign object 3 is in direct contact with the power feeding stage 12. For example, as shown in FIG. 15, a state where the electronic device 2 is present so as to be in direct contact with the top of the power feeding stage 12 and where the foreign object 3 is present on the electronic device 2 also belongs to the state where the foreign object 3 is present on the power feeding stage 12 as long as the foreign object presence determination is made.

[Exchange of Signals Until Power Transfer: FIG. 16]

The exchange of signals between the devices 1 and 2 until the power transfer is performed will be described with reference to FIG. 16. In the following description, unless otherwise described, it is assumed that the electronic device 2 is present on the power feeding stage 12 in the reference arrangement state (FIG. 1B).

First, the power feeding device 1 serves as the transmission side and the electronic device 2 serves as the reception side, and the power feeding device 1 (the IC 100) transmits, by the NFC communication, an inquiry signal 510 to a device on the power feeding stage 2 (hereinafter also referred to as a power feeding target device). The power feeding target device includes the electronic device 2, and can include the foreign object 3. The inquiry signal 510 includes, for example, a signal for inquiring the unique identification information of the power feeding target device, a signal for inquiring whether the power feeding target device is in a state where the power feeding target device can perform the NFC communication and a signal for inquiring whether the power feeding target device can receive power or the power feeding target device requires the transmission of power.

The electronic device 2 (the IC 200) which receives the inquiry signal 510 transmits, by the NFC communication, to the power feeding device 1, a response signal 520 for responding to the details of the inquiry in the inquiry signal 510. The power feeding device 1 (the IC 100) which receives the response signal 520 analyzes the response signal 520, and when the power feeding target device can perform the NFC communication and can receive power or requires the transmission of power, the power feeding device 1 transmits a test requirement signal 530 to the power feeding target device by the NFC communication. The electronic device 2 (the IC 200) serving as the power feeding target device which receives the test requirement signal 530 transmits a response signal 540 for the test requirement signal 530 to the power feeding device 1 by the NFC communication, and then immediately performs the $f_O$ change/short circuit operation (the resonant frequency change operation or the coil short circuit operation). The test requirement signal 530 is, for example, a signal for requiring the performance of the $f_O$ change/short circuit operation or providing an instruction to perform it, and the control circuit 250 of the electronic device 2 makes the resonant state change circuit 240 perform the $f_O$ change/short circuit operation by being triggered by the reception of the test requirement signal 530. Before the reception of the test requirement signal 530, the $f_O$ change/short circuit operation is not performed. As long as the test requirement signal 530 triggers the performance of the $f_O$ change/short circuit operation, any signal may be used as the test requirement signal 530, and the test requirement signal 530 may be included in the inquiry signal 510.

The power feeding device 1 (the IC 100) which receives the response signal 540 performs the pFOD processing described previously. During the period in which the pFOD processing is performed, the electronic device 2 (the IC 200) continues to perform the $f_O$ change/short circuit operation. Specifically, the electronic device 2 (the IC 200) uses the internal timer so as to maintain the performance of the $f_O$ change/short circuit operation only for a time corresponding to the length of a period in which the pFOD processing is performed, and then stops the $f_O$ change/short circuit operation.

When in the pFOD processing, it is determined that the foreign object is not present on the power feeding stage 12, the power feeding device 1 (the IC 100) transmits an authentication signal 550 to the power feeding target device by the NFC communication. The authentication signal 550 includes, for example, a signal for notifying the power feeding target device of the information that the power transmission is performed from now. The electronic device 2 (the IC 200) which receives the authentication signal 550 transmits a response signal 560 corresponding to the authentication signal 550 to the power feeding device 1 by the NFC communication. The response signal 560 includes, for example, a signal for providing a notification that the details indicated by the authentication signal 550 are recognized or a signal for allowing the details indicated by the authentication signal 550. The power feeding device 1 (the IC 100) which receives the response signal 560 connects the power transmission circuit 130 to the resonant circuit TT so as to perform the power transmission operation, with the result that power transfer 570 is realized.

Figure 17:
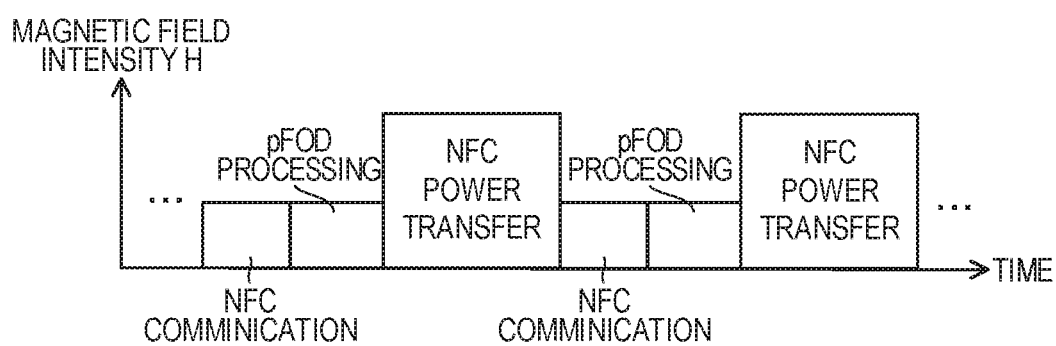
FIG. 17 is a diagram showing how NFC communication, pFOD processing and the power transfer are sequentially and repeatedly performed in the first embodiment of the present invention.

Although in the first case of FIG. 14A, the power transfer 570 is performed by the procedure described above, in the second case of FIG. 14B, the processing proceeds up to the transmission and reception of the response signal 540 but in the pFOD processing, it is determined that the foreign object is present on the power feeding stage 12, with the result that the power transfer 570 is not performed. One round of the power transfer 570 may be performed only for a predetermined time. A series of processing steps from the transmission of the inquiry signal 510 to the power transfer 570 may be repeatedly performed. In actuality, as shown in FIG. 17, the NFC communication, the pFOD processing and the power transfer (NFC power transfer) can be performed sequentially and repeatedly. In other words, in the non-contact power feeding system, the operation for performing the NFC communication, the operation for performing the pFOD processing and the operation for performing the power transfer (NFC power transfer) can be sequentially and repeatedly performed in a time division manner.

[Operational Flowchart of Power Feeding Device and Electronic Device]

Figure 18:
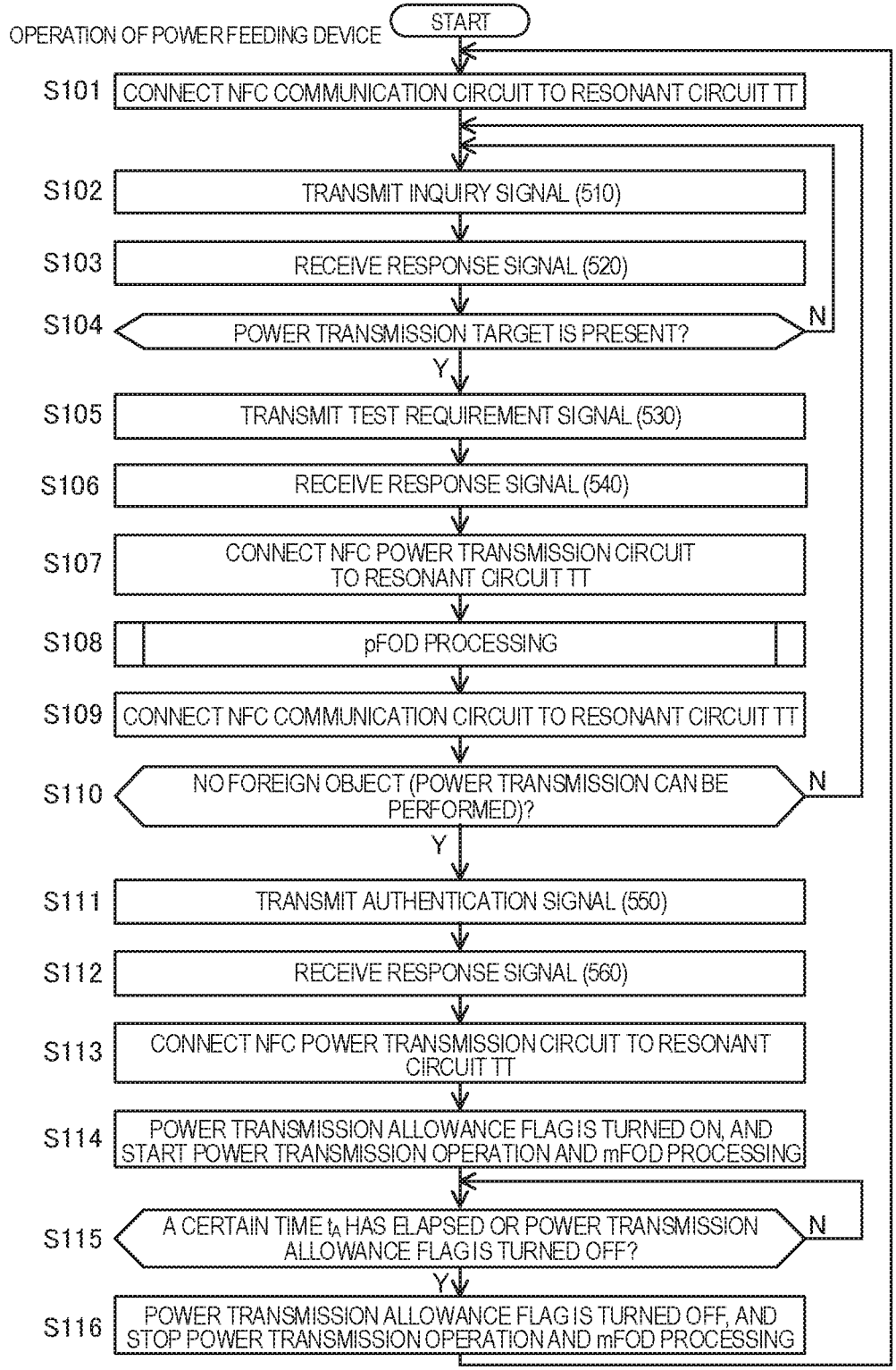
FIG. 18 is an operational flowchart of the power feeding device in the first embodiment of the present invention.

The flow of the operation of the power feeding device 1 will then be described. FIG. 18 is an operational flowchart of the power feeding device 1. The operations of the communication circuit 120 and the power transmission circuit 130 are performed under control of the control circuit 160.

When the power feeding device 1 is started up, in step S101, the control circuit 160 first connects the communication circuit 120 to the resonant circuit TT through the control of the switching circuit 110. In step S102 subsequent thereto, the control circuit 160 transmits the inquiry signal 510 to the power feeding target device by the NFC communication using the communication circuit 120 and the resonant circuit TT, and is thereafter, in step S103, on standby for the reception of the response signal 520. When the response signal 520 is received in the communication circuit 120, the control circuit 160 analyzes the response signal 520, and when the power feeding target device can perform the NFC communication and can receive power or requires the transmission of power, the control circuit 160 determines that the power transmission target is present (Y in step S104), and the process proceeds to step S105, otherwise (N in step S104), the process returns to step S102.

In step S105, the control circuit 160 transmits the test requirement signal 530 to the power feeding target device by the NFC communication using the communication circuit 120 and the resonant circuit TT, and is thereafter, in step S106, on standby for the reception of the response signal 540. When the response signal 540 is received in the communication circuit 120, in step S107, the control circuit 160 connects the power transmission circuit 130 to the resonant circuit TT through the control of the switching circuit 110, and then performs, in step S108 subsequent thereto, the pFOD processing described previously.

After the pFOD processing, in step S109, the control circuit 160 connects the communication circuit 120 to the resonant circuit TT through the control of the switching circuit 110, and the process proceeds to step S110. When in the pFOD processing of step S108, the foreign object presence determination is made, the process returns from step S110 to step S102 whereas when the foreign object absence determination is made, the process proceeds from step S110 to step S111.

In step S111, the control circuit 160 transmits the authentication signal 550 to the power feeding target device by the NFC communication using the communication circuit 120 and the resonant circuit TT, and is thereafter, in step S112, on standby for the reception of the response signal 560. When the response signal 560 is received in the communication circuit 120, in step S113, the control circuit 160 connects the power transmission circuit 130 to the resonant circuit TT through the control of the switching circuit 110, and then the process proceeds to step S114.

The control circuit 160 sets, in step S114, a power transmission allowance flag on, and starts the power transmission operation and mFOD processing, and thereafter the process proceeds to step S115. Although details will be described later, whether or not the foreign object is present in the power transfer is detected by the mFOD processing, and when the foreign object is detected, the power transmission allowance flag is turned off. The control circuit 160 measures the time which has elapsed since the start of the power transmission operation, and in step S115, compares the elapsed time with a predetermined time $t_A$ (for example, 10 minutes) and checks the state of the power transmission allowance flag. When the elapsed time reaches the predetermined time $t_A$ or when the power transmission allowance flag is set off by the mFOD processing, the process proceeds to step S116. In step S116, the control circuit 160 switches the power transmission allowance flag from on to off or keeps the power transmission allowance flag off, and stops the power transmission operation and the mFOD processing, and thereafter the process returns to step S101.

Figure 19:
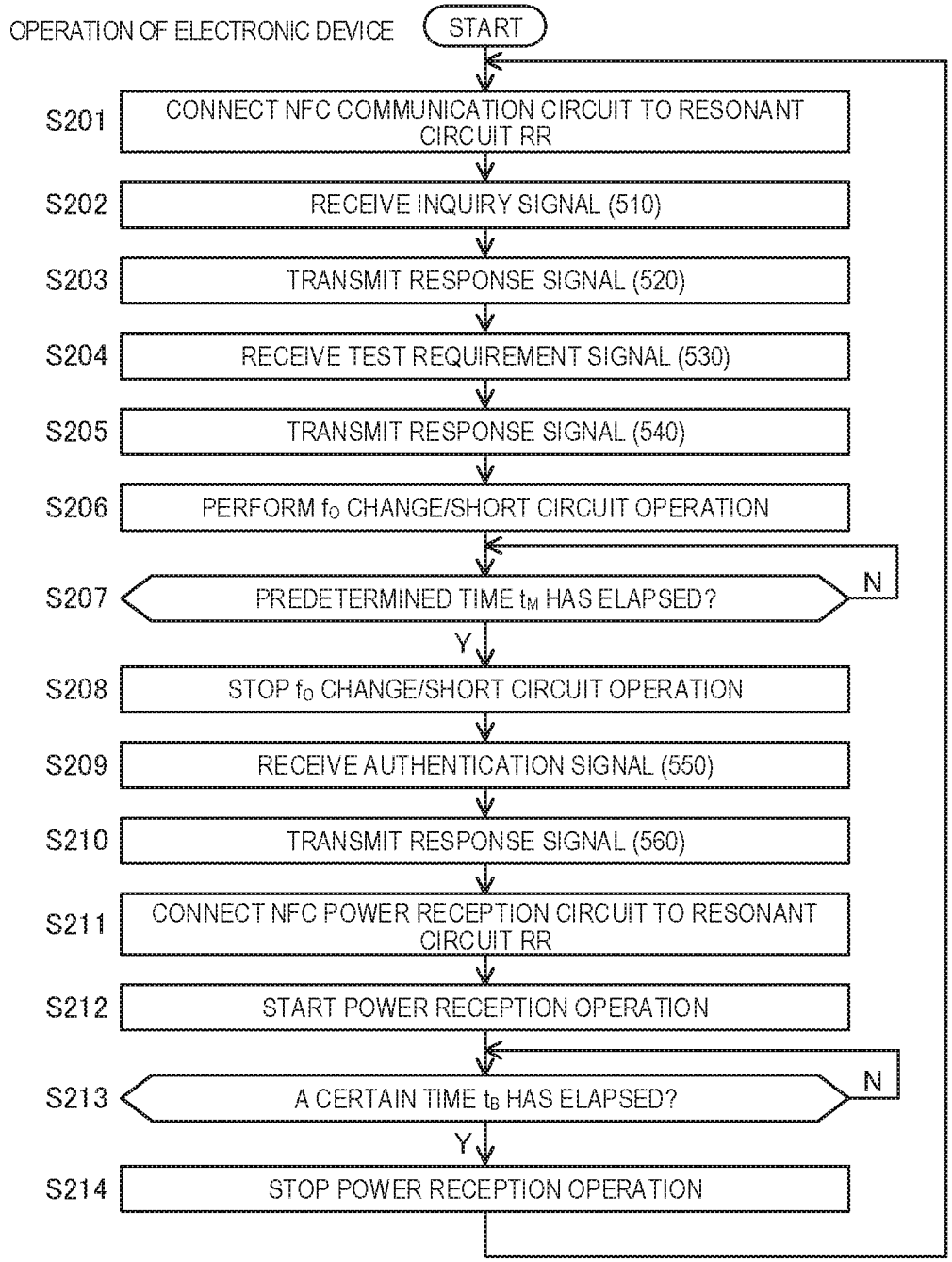
FIG. 19 is an operational flowchart of the electronic device which is operated according to the operation of FIG. 18.

The flow of the operation of the electronic device 2 will then be described. FIG. 19 is an operational flowchart of the electronic device 2, and the processing starting from step S201 is performed as the operation of the power feeding device 1 shown in FIG. 18 is performed. The operations of the communication circuit 220 and the power reception circuit 230 are performed under control of the control circuit 250.

When the electronic device 2 is started up, in step S201, the control circuit 250 first connects the communication circuit 220 to the resonant circuit RR through the control of the switching circuit 210. When the electronic device 2 is started up, the $f_O$ change/short circuit operation is not performed. In step S202 subsequent thereto, the control circuit 250 uses the communication circuit 220 so as to be on standby for the reception of the inquiry signal 510. When the inquiry signal 510 is received in the communication circuit 220, in step S203, the control circuit 250 analyzes the inquiry signal 510 so as to generate the response signal 520, and transmits the response signal 520 to the power feeding device 1 by the NFC communication using the communication circuit 220. Here, when the control circuit 250 checks the state of the battery 21, then the battery 21 is not fully charged and an abnormality is not recognized in the battery 21, the control circuit 250 includes, in the response signal 520, a signal which can receive power or requires the transmission of power. On the other hand, when the battery 21 is fully charged or an abnormality is recognized in the battery 21, the control circuit 250 includes, in the response signal 520, a signal indicating that it is impossible to receive power.

Then, when in step S204 subsequent thereto, the test requirement signal 530 is received in the communication circuit 220, the process proceeds to step S205. In step S205, the control circuit 250 transmits the response signal 540 to the power feeding device 1 by the NFC communication using the communication circuit 220, and in step S206 subsequent thereto, uses the resonant state change circuit 240 so as to perform the $f_O$ change/short circuit operation. In other words, the resonant frequency $f_O$ is changed from the reference frequency to the frequency $f_M$ or the power reception-side coil $R_L$ is short-circuited. The control circuit 250 measures the time which has elapsed since the start of the performance of the $f_O$ change/short circuit operation (step S207), and stops the $f_O$ change/short circuit operation when the elapsed time reaches a predetermined time $t_M$ (step S208). In other words, the resonant frequency $f_O$ is returned to the reference frequency or the short-circuiting of the power reception-side coil $R_L$ is cancelled. Thereafter, the process proceeds to step S209. The time $t_M$ is previously set such that during the period in which the pFOD processing is performed in the power feeding device 1 (that is, during the period in which the test magnetic field is generated), the performance of the $f_O$ change/short circuit operation is maintained, and that immediately after the period is completed, the $f_O$ change/short circuit operation is stopped. In the test requirement signal 530, the time $t_M$ may be specified.

In step S209, the control circuit 250 uses the communication circuit 220 so as to be on standby for the reception of the authentication signal 550. When the authentication signal 550 is received in the communication circuit 220, in step S210, the control circuit 250 transmits the response signal 560 for the authentication signal 550 to the power feeding device 1 by the NFC communication using the communication circuit 220. When the foreign object is present on the power feeding stage 12, since the authentication signal 550 is not transmitted from the power feeding device 1 (see step S110 in FIG. 18), the process is preferably returned to step S201 in a case where the authentication signal 550 is not received for a certain period of time in step S209.

After the transmission of the response signal 560, in step S211, the control circuit 250 connects the power reception circuit 230 to the resonant circuit RR through the control of the switching circuit 210, and in step S212 subsequent thereto, starts the power reception operation using the power reception circuit 230. The control circuit 250 measures the time which has elapsed since the start of the power reception operation, and compares the elapsed time with a predetermined time is (step S213). Then, when the elapsed time reaches the time is (Y in step S213), in step S214, the control circuit 250 stops the power reception operation, and the process returns to step S201.

The time $t_B$ is previously determined or is specified in the authentication signal 550 such that the period during which the power reception operation is performed substantially coincides with the period during which the power transmission operation is performed in the power feeding device 1. A configuration may be adopted in which after the start of the power reception operation, the control circuit 250 monitors a charging current for the battery 21, and in which when the charging current value becomes equal to or less than a predetermined value, the control circuit 250 determines that the power transmission operation is completed so as to stop the power reception operation and transfer to step S201.

[mFOD Processing]

After the start of the power transmission operation, the foreign object may be placed on the power feeding stage 12. The mFOD processing functions as the foreign object detection processing in the power transfer, and whether or not the foreign object is present in the power transfer is continuously monitored by the mFOD processing.

Figure 20:
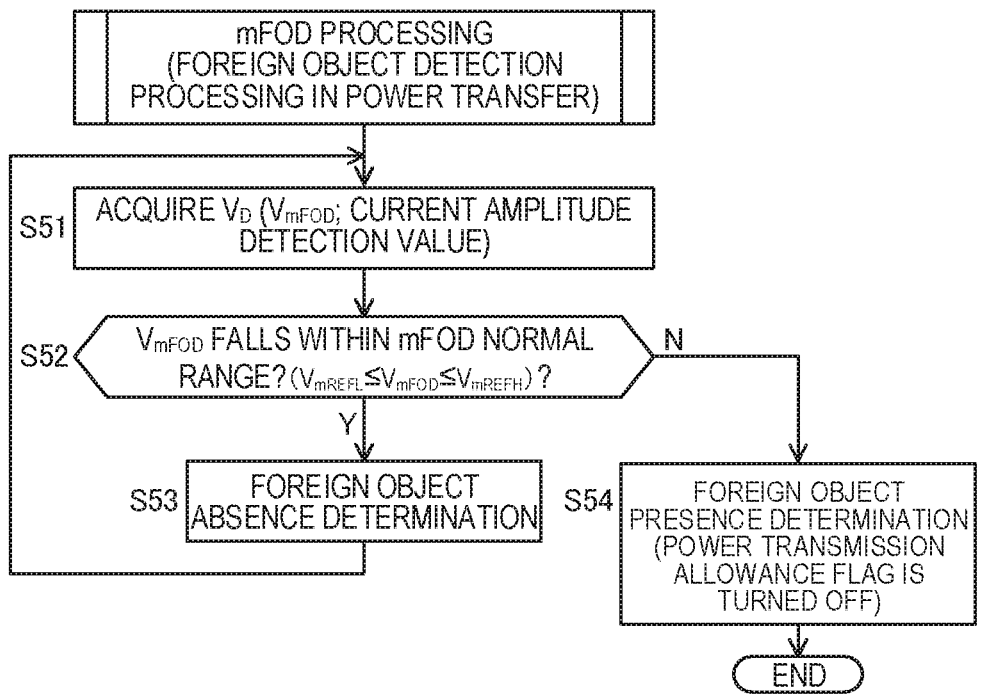
FIG. 20 is an operational flowchart of mFOD processing which is performed in the power feeding device.

FIG. 20 is an operational flowchart of the mFOD processing. During the period in which the power transmission operation is performed, the control circuit 160 repeatedly performs the mFOD processing in FIG. 20. In the mFOD processing, the control circuit 160 first acquires, in step S51, the latest voltage value $V_D$ as a current amplitude detection value $V_{mFOD}$. The current amplitude detection value $V_{mFOD}$ has a value corresponding to the amplitude of the current flowing through the power transmission-side coil $T_L$ when the power transmission magnetic field is generated in the power transmission-side coil $T_L$. In step S52 subsequent thereto, the control circuit 160 determines whether or not the current amplitude detection value $V_{mFOD}$ falls within a predetermined mFOD normal range. When the current amplitude detection value $V_{mFOD}$ falls within the mFOD normal range, the foreign object absence determination is made (step S53), the process returns to step S51 and the processing in steps S51 and S52 is repeated whereas when the current amplitude detection value $V_{mFOD}$ falls outside the mFOD normal range, in step S54, the foreign object presence determination is made such that the power transmission allowance flag is set off. The power transmission allowance flag is controlled by the control circuit 160 so as to be set on or off. When the power transmission allowance flag is on, the control circuit 160 allows the performance of the power transmission operation whereas when the power transmission allowance flag is off, the control circuit 160 prohibits the performance of the power transmission operation or stops the power transmission operation.

The mFOD normal range is a range which is equal to or more than a predetermined lower limit value $V_{mREFL}$ but equal to or less than a predetermined upper limit value $V_{mREFH}$ ($0<V_{mREFL}<V_{mREFH}$). Hence, when a determination inequality "$V_{mREFL} \leq V_{mFOD} \leq V_{mREFH}$" is satisfied, the foreign object absence determination is made whereas when the determination inequality is not satisfied, the foreign object presence determination is made.

Figure 21A:
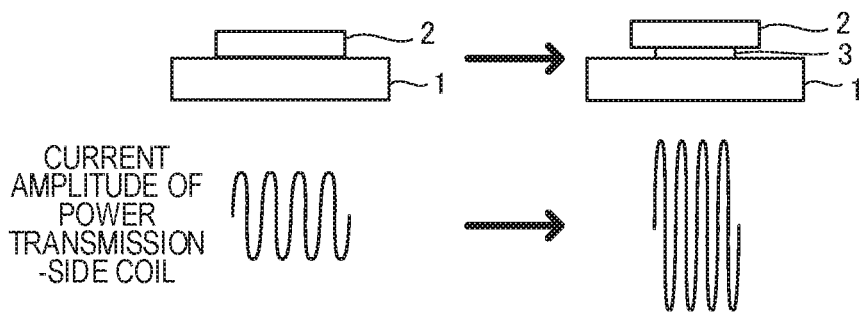
FIG. 21A and FIG. 21B are diagrams for illustrating a change in the amplitude of a current flowing through a power transmission-side coil when the foreign object is inserted in the power transfer.

Consider, with reference to FIG. 21A, for example, a case where when the power transmission operation is performed, the foreign object 3 which is formed as a non-contact IC card is inserted between the power feeding stage 12 of the power feeding device 1 and the electronic device 2. In this case, the power reception-side coil $R_L$ of the electronic device 2 is magnetically coupled to the coil $J_L$ of the foreign object 3, and thus the resonant frequency of the resonant circuit RR in the electronic device 2 is displaced from the reference frequency (13.56 MHz) together with the resonant frequency of the resonant circuit JJ in the foreign object 3. Then, the power received in the power reception-side coil $R_L$ is lowered, and thus the load of the power transmission seen from the power transmission-side coil $T_L$ is reduced, with the result that the amplitude of the current flowing through the power transmission-side coil $T_L$ is increased (in this case, the upper limit value $V_{mREFH}$ is preferably determined such that "$V_{mREFH}<V_{mFOD}$").

Figure 21B:
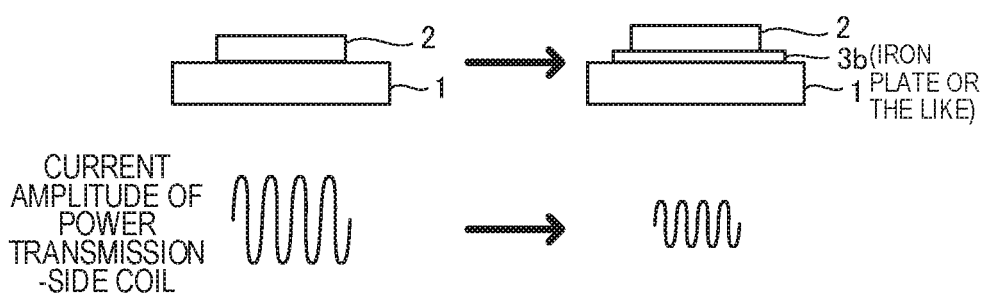

For example, with reference to FIG. 21B, when the power transmission operation is performed, if a foreign object 3b serving as an iron plate or a ferrite sheet is inserted between the power feeding stage 12 of the power feeding device 1 and the electronic device 2, a current flows within the foreign object 3b through electrical and magnetic action, with the result that the amplitude of the current flowing through the power transmission-side coil $T_L$ is decreased (in this case, the lower limit value $V_{mREFL}$ is preferably determined such that "$V_{mFOD}<V_{mREFL}$").

As described above, a change in the current amplitude detection value $V_{mFOD}$ is produced by whether or not the foreign object including the foreign objects 3 and 3b is present. Through experiments or the like with the assumption of the types of foreign objects and the states of arrangement thereof which can be considered, the lower limit value $V_{mREFL}$ and the upper limit value $V_{mREFH}$ which are previously appropriately determined are preferably stored in the memory 150. To what degree the current amplitude detection value $V_{mFOD}$ is changed by the presence of the foreign object in the power transfer may be estimated by theoretical calculation, and based on the result of the estimation, the lower limit value $V_{mREFL}$ and the upper limit value $V_{mREFH}$ may be determined and stored in the memory 150 without need for the experiments. Here, for example, with reference to the center value of the mFOD normal range, an object which changes the current amplitude detection value $V_{mFOD}$ by a predetermined rate of change or more may be defined as the foreign object.

The amplification factor of the amplifier 143 shown in FIG. 7 is variable. The amplitude of the current flowing through the power transmission-side coil $T_L$ when the power transmission operation and the mFOD processing are performed is significantly larger than that when the pFOD processing is performed. Hence, when the mFOD processing is performed, the control circuit 160 sets the amplification factor of the amplifier 143 smaller than the amplification factor when the pFOD processing is performed, and thus the pFOD processing and the mFOD processing are set substantially the same as each other in the input signal range of the A/D converter 144.

For example, between the envelope detector 142 and the A/D converter 144 (more specifically, between the envelope detector 142 and the amplifier 143 or between the amplifier 143 and the A/D converter 144), a high-frequency reduction circuit (unillustrated) may be inserted. In this case, amplitude information which is obtained by performing high-frequency reduction processing (in other words, averaging processing or low-pass filtering) on a voltage drop signal for the sense resistor 141 can be obtained as the voltage value $V_D$ from the A/D converter 144. In the high-frequency reduction processing here, the signal components of relatively low frequencies in the voltage drop signal for the sense resistor 141 are passed whereas the signal components of relatively high frequencies are reduced (attenuated). By the high-frequency reduction processing, the performance of control on the prohibition of the power transmission caused such as by noises or light vibrations in the electronic device 2 on the power feeding stage 12 is reduced.

For example, instead of the provision of the high-frequency reduction circuit between the envelope detector 142 and the A/D converter 144, high-frequency reduction processing by computation may be performed on the voltage value $V_D$ of the output signal of the A/D converter 144, and the voltage value $V_D$ after the high-frequency reduction processing may be used as the current amplitude detection value $V_{mFOD}$ (the same may be true for the current amplitude detection value $V_{pFOD}$ in the pFOD processing). The high-frequency reduction processing by computation is performed in the control circuit 160, and in the high-frequency reduction processing by computation, the signal components of relatively low frequencies in the output signal of the A/D converter 144 are passed whereas the signal components of relatively high frequencies are reduced (attenuated).

The role of the mFOD processing is not limited to the determination as to whether or not the foreign object is present. In other words, the mFOD processing plays a role in turning off the power transmission allowance flag under any conditions that are unsuitable for the continuation of the power transmission operation, such as a condition in which the current amplitude detection value $V_{mFOD}$ falls outside the mFOD normal range. For example, when after the start of the power transmission operation, the electronic device 2 is removed from the top of the power feeding stage 12, the load of the power transmission seen from the power transmission-side coil $T_L$ is reduced such that the current amplitude detection value $V_{mFOD}$ exceeds the upper limit value $V_{mREFH}$ and thus the power transmission allowance flag is turned off (step S54 in FIG. 20).

As described above, when the transmission of power is performed by the power transmission operation, the control circuit 160 monitors whether or not the current amplitude detection value $V_{mFOD}$ falls outside the mFOD normal range so as to control whether or not the continuation of the power transmission is allowed. In this way, under conditions, such as when the foreign object is placed on the power feeding stage 12 after the start of the power transmission operation, which are unsuitable for the continuation of the power transmission operation, the power transmission operation is stopped through the mFOD processing, and thus it is possible to prevent the destruction of the foreign object and the like caused by the continuation of the power transmission operation.

Second Embodiment

A second embodiment of the present invention will be described. The second embodiment and a third embodiment which will be described later are embodiments based on the first embodiment, and for items which are not particularly described in the second and third embodiments, the description of the first embodiment is also applied to the second and third embodiments unless otherwise a contradiction arises.

Figure 22:
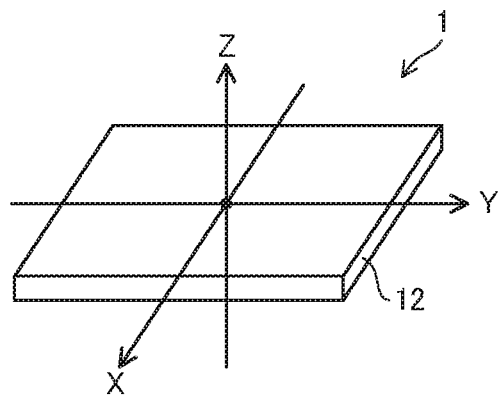
FIG. 22 is a diagram showing a relationship between an X axis, a Y axis, a Z axis and a power feeding stage in a second embodiment of the present invention.

Before the technology of the second embodiment will be described with reference to FIG. 22, an X axis, a Y axis and a Z axis which are orthogonal to each other will first be defined. A plane parallel to the X axis and the Y axis, a plane parallel to the Y axis and the Z axis and a plane parallel to the Z axis and the X axis may be referred to as an XY plane, a YZ plane and a ZX plane, respectively. The X axis and the Y axis are parallel to the placement surface of the power feeding stage 12, and thus the Z axis is orthogonal to the placement surface of the power feeding stage 12. The placement surface of the power feeding stage 12 is a surface on which the electronic device 2 needs to be placed, and the electronic device 2 and the foreign object can be placed on the placement surface. In the description of the second embodiment and in the drawings referenced therein, unless otherwise described, it is assumed that the electronic device 2 is placed on the placement surface of the power feeding stage 12 in the reference arrangement state. In the reference arrangement state, the power feeding device 1 and the electronic device 2 are in a predetermined positional relationship for performing the transmission and reception of power.

Figure 23:
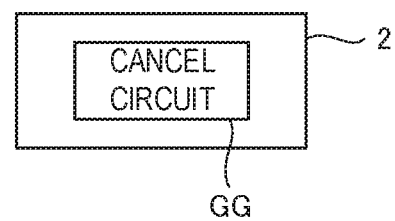
FIG. 23 is a diagram showing how a cancel circuit is provided within an electronic device in the second embodiment of the present invention.

Although details will be described later, in the electronic device 2, a metal plate formed of aluminum or the like or a magnetic material plate (magnetic material sheet) formed of ferrite is often provided, and they may adversely affect the power transfer, the detection of the foreign object and the like. In an electronic device 2 according to the second embodiment, as shown in FIG. 23, a cancel circuit (auxiliary resonant circuit) GG for reducing such influences is provided.

Figure 24A:
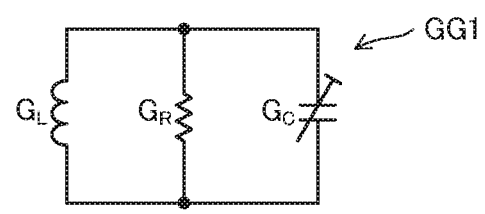
FIG. 24A and FIG. 24B are diagrams showing a first example and a second example of the cancel circuit in the second embodiment of the present invention.
Figure 24B:
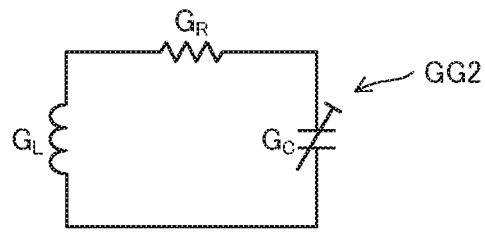

In FIG. 24A and FIG. 24B, cancel circuits GG1 and GG2 which are the first and second examples of the cancel circuit GG are shown. The cancel circuit GG1 is a parallel resonant circuit that is formed by connecting, in parallel, a coil $G_L$ which is a cancellation coil and a capacitor $G_C$ which is a cancellation capacitor, and the cancel circuit GG2 is a series resonant circuit that is formed by connecting, in series, the coil $G_L$ and the capacitor $G_C$. In each of the cancel circuits GG1 and GG2, as a cancellation resistor, a resistor $G_R$ is also provided. In the cancel circuit GG1, the resistor $G_R$ is connected in parallel to the parallel circuit of the coil $G_L$ and the capacitor $G_C$. In the cancel circuit GG2, the resistor $G_R$ is inserted and connected in series with the series circuit of the coil $G_L$ and the capacitor $G_C$. The cancellation coil $G_L$ is an independent coil which is separated from the power reception-side coil $R_L$.

The cancel circuit GG may be either the cancel circuit GG1 or the cancel circuit GG2. However, in the following description, unless otherwise described, the cancel circuit GG is assumed to be the cancel circuit GG1 serving as a parallel resonant circuit, and the resonant circuits TT and RR are assumed to be also parallel resonant circuits.

The cancellation capacitor $G_C$ is a capacitor which can change its capacitance, and is, for example, a trimmer capacitor which can change the capacitance by a manual adjustment or a varicap (variable capacitor) whose capacitance is varied depending on a voltage applied to itself. However, a capacitor whose capacitance cannot be changed can also be used as the cancellation capacitor $G_C$. The resistor $G_R$ may be a fixed resistor whose resistance is fixed. However, a variable resistor whose resistance value can be changed may be used as the resistor $G_R$.

The cancel circuit GG is insulated from any circuit within the electronic device 2 including the power reception-side resonant circuit RR. However, when the cancellation capacitor $G_C$ is formed as a varicap, a circuit within the electronic device 2 which feeds a voltage signal to the varicap is connected to the cancellation capacitor $G_C$. In any case, it can be said that the cancel circuit GG is insulated from at least the power reception-side resonant circuit RR in terms of alternating current (in terms of high frequency).

The resonant frequency of the cancel circuit GG is basically set higher or lower than the reference frequency (hence, the resonant frequencies of the resonant circuits TT and RR) by use of the cancellation capacitor $G_C$, and the actions thereof will be described later.

Figure 25A:
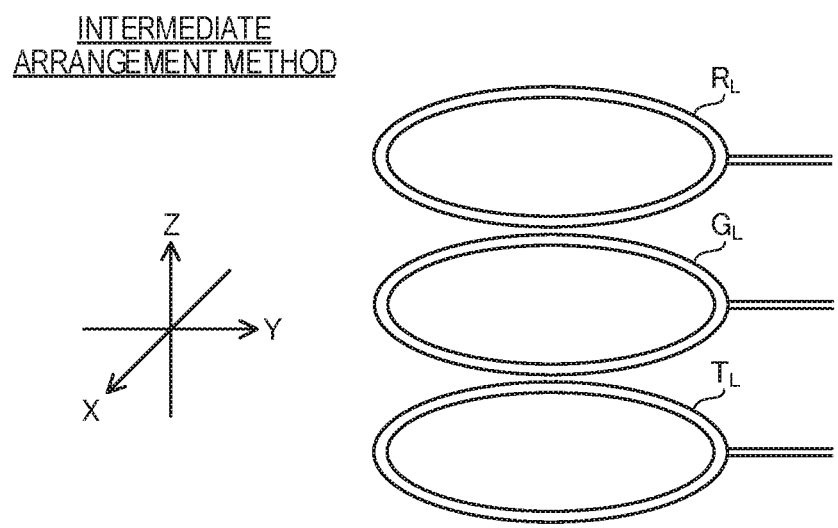
FIG. 25A and FIG. 25B are respectively a schematic perspective view and a schematic cross-sectional view of a power transmission-side coil, a power reception-side coil and a cancellation coil in a reference arrangement state in the second embodiment of the present invention (intermediate arrangement method)
Figure 25B:
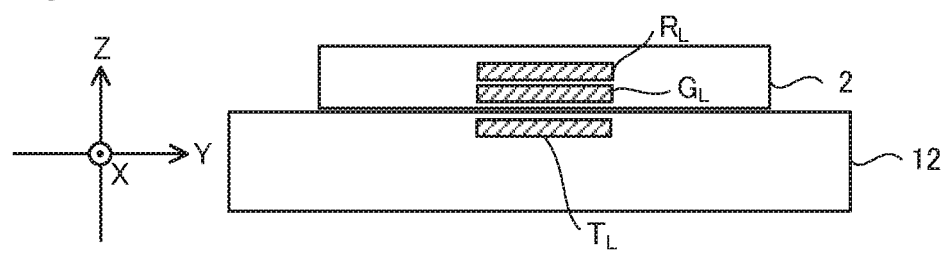

FIG. 25A and FIG. 25B are a first example of a schematic perspective view and a schematic cross-sectional view of the power transmission-side coil $T_L$, the power reception-side coil $R_L$ and the cancellation coil $G_L$ in the power feeding device 1 and the electronic device 2 in the reference arrangement state. In a method of arranging the coil $G_L$ shown in FIG. 25A and FIG. 25B (hereinafter referred to as an intermediate arrangement method), in the reference arrangement state, the cancellation coil $G_L$ is arranged between the power transmission-side coil $T_L$ and the power reception-side coil $R_L$ (in other words, the coils $R_L$, $G_L$ and $T_L$ are sequentially aligned along the direction of the Z axis).

Figure 26A:
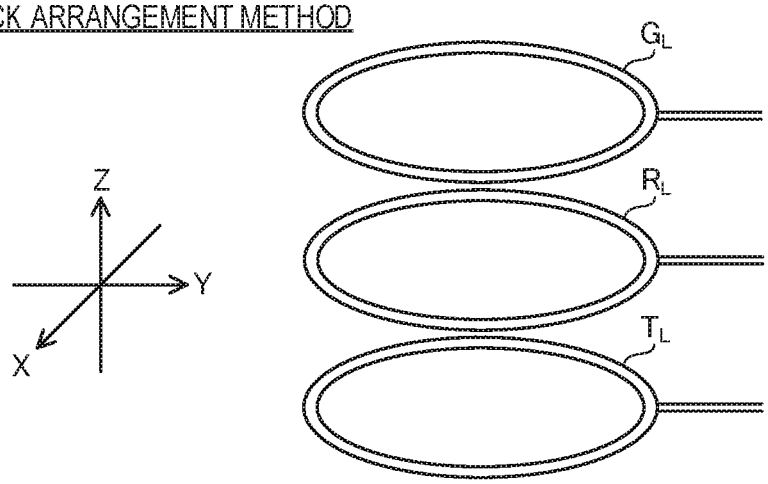
FIG. 26A and FIG. 26B are respectively a schematic perspective view and a schematic cross-sectional view of the power transmission-side coil, the power reception-side coil and the cancellation coil in the reference arrangement state in the second embodiment of the present invention (back arrangement method)
Figure 26B:
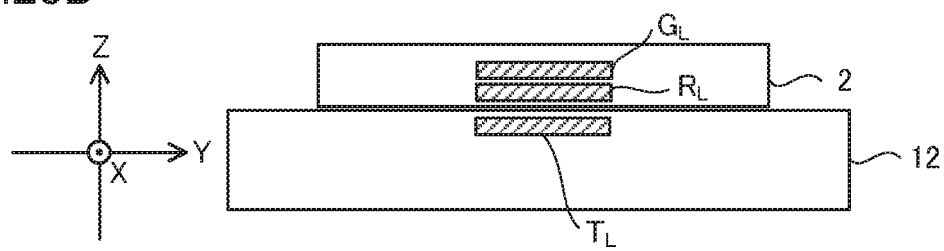

FIG. 26A and FIG. 26B are a second example of the schematic perspective view and the schematic cross-sectional view of the power transmission-side coil $T_L$, the power reception-side coil $R_L$ and the cancellation coil $G_L$ in the power feeding device 1 and the electronic device 2 in the reference arrangement state. In a method of arranging the coil $G_L$ shown in FIG. 26A and FIG. 26B (hereinafter referred to as a back arrangement method), the cancellation coil $G_L$ is arranged on the back of the power reception-side coil $R_L$. In other words, in a case where the back arrangement method is adopted, when seen from the power reception-side coil $R_L$ in the reference arrangement state, the cancellation coil $G_L$ is arranged in a position on the side opposite to the arrangement position of the power transmission-side coil $T_L$ (hence, the coils $G_L$, $R_L$ and $T_L$ are sequentially aligned along the direction of the Z axis).

In any of the intermediate arrangement direction and the back arrangement method, the cancellation coil $G_L$ is arranged in such a position that when a magnetic field is generated in the power transmission-side coil $T_L$ or the power reception-side coil $R_L$, the generated magnetic field interlinks the cancellation coil $G_L$ so as to pass a significant current through the cancellation coil $G_L$.

Figure 27A:
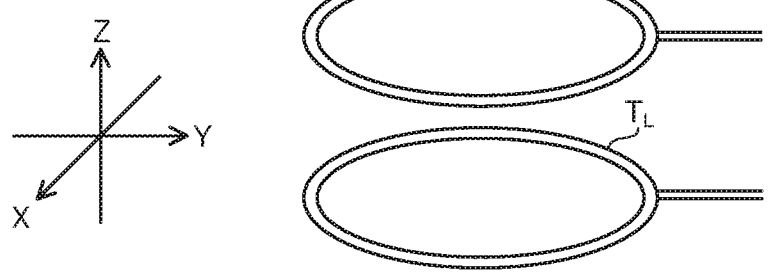
FIG. 27A and FIG. 27B are respectively a schematic perspective view and a schematic cross-sectional view of the power transmission-side coil and the coil of the foreign object in the second embodiment of the present invention.
Figure 27B:
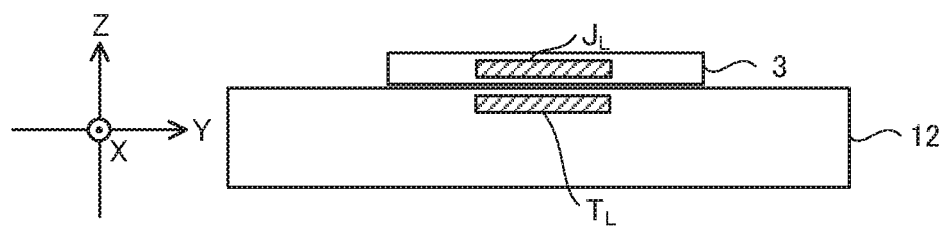

FIG. 27A and FIG. 27B are a schematic perspective view and a schematic cross-sectional view of the coils $T_L$ and $J_L$ in the power feeding device 1 and the foreign object 3 in a state where the foreign object 3 a typical example of which is a non-contact IC card is placed on the placement surface of the power feeding stage 12.

In FIG. 25A, FIG. 26A and FIG. 27A, for simplification of illustration and prevention of complication, the windings of the coils $T_L$, $R_L$, $G_L$ and $J_L$ are represented by double circles (the same is true in FIG. 28C and the like which will be described later). In the drawings including the illustration of the coils, line segments which are extended laterally from the double circles representing the coils indicate the drawn wires of the coils. The cross sections in the cross-sectional views of FIG. 25B, FIG. 26B and FIG. 27B are parallel to the YZ plane. Each of the coils $T_L$, $R_L$, $G_L$ and $J_L$ forms a loop antenna. In the reference arrangement state, the loop planes of the loop antennas serving as the coils $T_L$, $R_L$ and $G_L$ (that is, the planes where the windings of the coils $T_L$, $R_L$ and $G_L$ are arranged) are parallel to the XY plane, and hence, the center axes of the coils $T_L$, $R_L$ and $G_L$ are parallel to the Z axis. The coil $T_L$ is formed by winding the winding wires (such as copper wires) around its center axis (the same is true for the coils $R_L$, $G_L$ and $J_L$). In a state where the foreign object 3 is placed on the placement surface of the power feeding stage 12, the loop plane of the loop antenna serving as the coil $J_L$ (that is, the plane where the winding of the coil $J_L$ is arranged) is normally parallel to the XY plane as with the coil $T_L$, and hence the center axis of the coil $J_L$ is parallel to the Z axis.

In order for a coupling coefficient between the coils $T_L$ and $R_L$ to be increased, the coils $T_L$ and $R_L$ on the XY plane have the same shape as each other (however, they can have shapes different from each other). In the present specification, the shape of the coil indicates a conception which includes the size of the coil. It may be considered that on an arbitrary coil, the size of the coil refers to an area occupied by the outer circumference of the coil in a direction orthogonal to the center axis of the coil. When the coil forms a loop antenna, the area of a part surrounded by the winding of the coil in the loop plane of the loop antenna (that is, the plane where the winging of the coil is arranged) corresponds to the size of the coil.

On the other hand, although not particularly shown in FIG. 25A and FIG. 26A, on the XY plane, the shape of the coil $G_L$ may be made to differ from the shapes of the coils $T_L$ and $R_L$ such that coupling between the coils $T_L$ and $G_L$ and coupling between the coils $R_L$ and $G_L$ are weaker than coupling between the coils $T_L$ and $R_L$. The significance thereof will be obvious from a description which will be given later.

Although in FIG. 25A and FIG. 27A and the like, the outer circumferential shapes of the coils $T_L$, $R_L$, $G_L$ and $J_L$ (that is, the outline shapes) are set to circles, the outer circumferential shapes of the coils $T_L$, $R_L$, $G_L$ and $J_L$, are not limited to circles, and they may be oval or polygon (such as rectangular) or a straight line and a curve may be mixed in the outer circumferential shape of the coil.

In examples EX2_1A, EX2_1B, EX2_2A, EX2_2B, EX2_3A, EX2_3B and EX2_4 of the second embodiment, the actions and the like of the cancel circuit GG will be described below. Unless otherwise a contradiction arises, among a plurality of examples described below, an item which is described in an arbitrary example can be applied to another arbitrary example (in other words, two or more arbitrary examples among a plurality of examples can be combined).

Example EX2_1A

The example EX2_1A will be described. In order to clearly describe the actions of the cancel circuit GG in the example EX2_1B which will be described later, in the example EX2_1A, for convenience, it is assumed that the cancel circuit GG is not provided in the electronic device 2.

In the example EX2_1A, it is assumed that a metal portion (hereinafter referred to as a power reception-side metal portion $MT_2$: unillustrated) is provided in the electronic device 2. The power reception-side metal portion $MT_2$ may form the entire enclosure of the electronic device 2 or part thereof. Specifically, for example, the power reception-side metal portion $MT_2$ may be a box-shaped metal case serving as the enclosure of the electronic device 2. For another example, the enclosure of the electronic device 2 may be formed of a resin material, and the power reception-side metal portion $MT_2$ may be fixed within the enclosure of the electronic device 2. The power reception-side metal portion $MT_2$ is mainly provided, for example, so as to enhance the structural strength and the texture of the electronic device 2.

The metal of the power reception-side metal portion $MT_2$ is assumed to be aluminum. The metal of the power reception-side metal portion $MT_2$ may be an alloy of aluminum and another metal, that is, an aluminum alloy (for example, a duralumin serving as an alloy of aluminum and copper). However, as long as the same influence as the case where the power reception-side metal portion $MT_2$ is formed of aluminum or an aluminum alloy is exerted on the coils $R_L$ and $T_L$, the metal of the power reception-side metal portion $MT_2$ may be a metal other than aluminum and aluminum alloys.

Figure 28A:
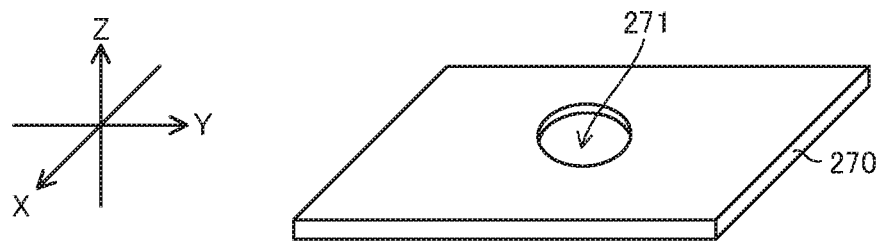
FIG. 28A, FIG. 28B and FIG. 28C are respectively a perspective view of a metal plate, a transparent view of some components of a power feeding device and the electronic device and a plan view of the metal plate and the power reception-side coil in the second embodiment of the present invention.

Although the power reception-side metal portion $MT_2$ may have any shape, the power reception-side metal portion $MT_2$ is assumed to include a metal plate 270 which has an opening portion 271 as shown in FIG. 28A. In the reference arrangement state, the metal plate 270 is parallel to the XY plane. The opening portion 271 is a hole which is provided in the metal plate 270 so as to penetrate the metal plate 270 in the direction of the Z axis, and thus no metal is present in the opening portion 271. On the XY plane, the opening portion 271 forms a closed region, and no contact is present between the opening portion 271 and the outer periphery of the metal plate 270. Hence, in the XY plane, around the opening portion 271, an electrical path (current loop) made of aluminum is formed. The opening portion 271 can be sealed with a material other than metal such as a resin material. The resin material is, for example, polycarbonate or polypropylene.

On the XY plane, the outline shape of the metal plate 270 is rectangular. However, on the XY plane, the outline shape of the metal plate 270 is not limited to this shape, and the outline shape may include a curve or a straight line and a curve may be mixed in the outline shape of the metal plate 270. Although here, the shape of the opening portion 271 on the XY plane can be considered to be a circle (three-dimensionally considered to be a cylindrical shape), on the XY plane, the shape of the opening portion 271 is not limited to a circle, and the shape of the opening portion 271 may be oval or polygonal (such as rectangular) or a straight line and a curve may be mixed in the shape of the opening portion 271.

Figure 29:
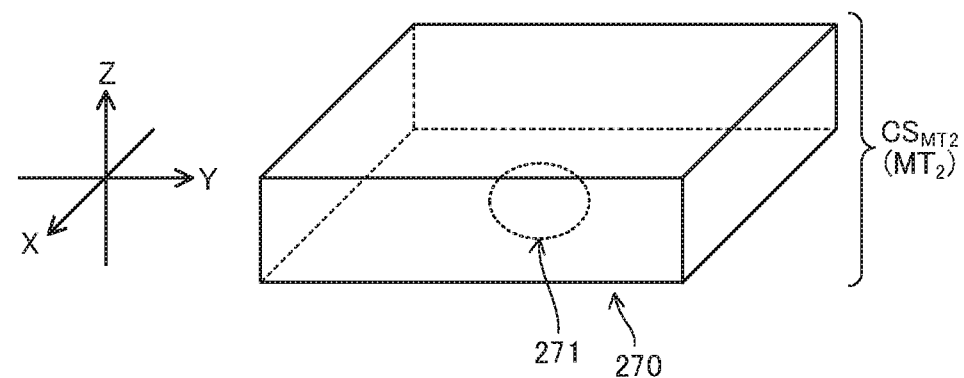
FIG. 29 is a perspective view of a metal case which can be provided in the electronic device in the second embodiment of the present invention.

The power reception-side metal portion $MT_2$ may include another metal portion in addition to the metal plate 270. Specifically, for example, as shown in FIG. 29, when the power reception-side metal portion $MT_2$ is a box-shaped metal case $CS_{MT2}$ serving as the enclosure of the electronic device 2, the metal plate 270 forms one surface (bottom surface) of the metal case $CS_{MT2}$.

Figure 28B:
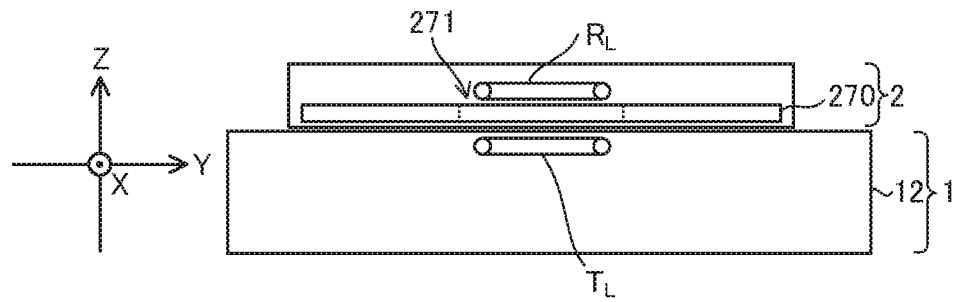
Figure 28C:
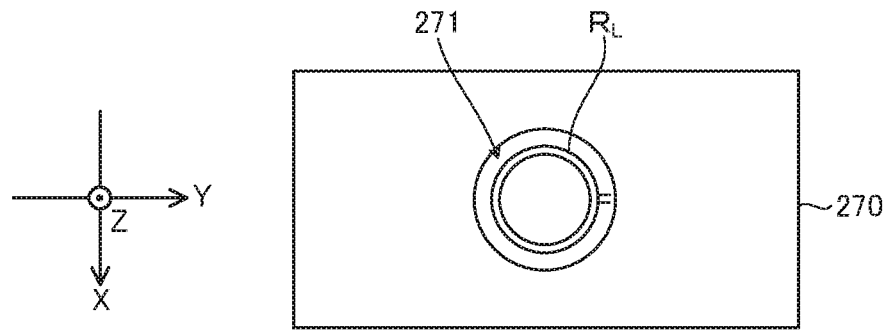

However, in the following description and the drawings (including FIG. 28A to FIG. 28C) referenced in the following description, for simplification of description and illustration, on the power reception-side metal portion $MT_2$, attention is focused on only the metal plate 270. FIG. 28A is a perspective view of the metal plate 270 in the reference arrangement state, and FIG. 28B is a transparent view of some components of the power feeding device 1 and the electronic device 2 in the reference arrangement state. FIG. 28C is a plan view of the metal plate 270 and the power reception-side coil $R_L$ in the reference arrangement state when seen in the direction of the Z axis. The opening portion 271 is provided in an opposite position of the arrangement position of the power reception-side coil $R_L$ (position opposite the arrangement position of the power reception-side coil $R_L$), and in the reference arrangement state, the opening portion 271 is located between the coils $T_L$ and $R_L$, and the coils $T_L$ and $R_L$ are opposite each other through the opening portion 271.

Figure 30:
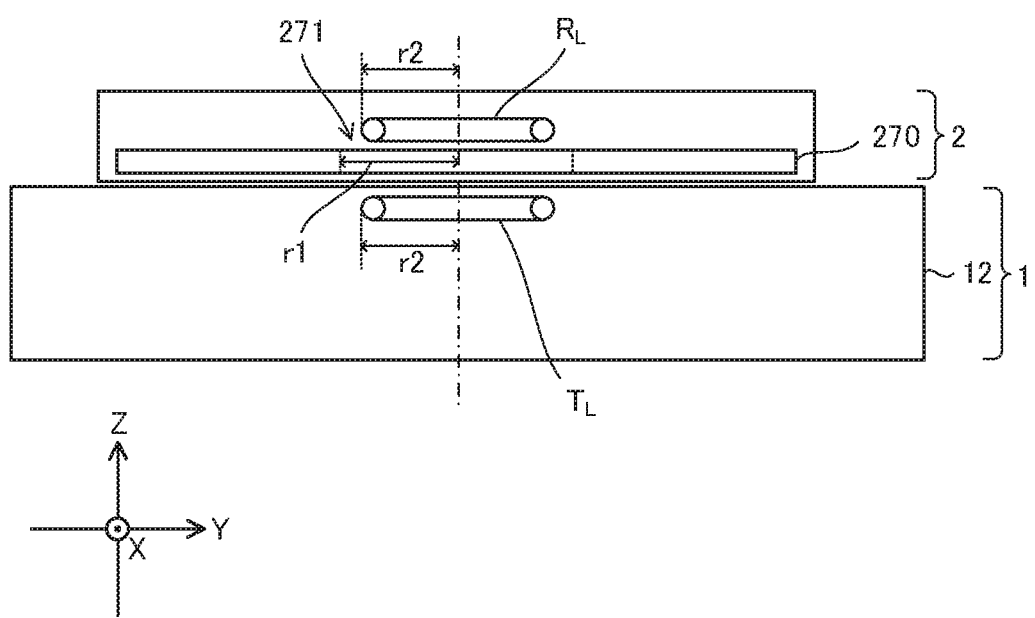
FIG. 30 is a diagram for illustrating a relationship of magnitudes of an opening portion of the metal plate, the power transmission-side coil and the power reception-side coil in the second embodiment of the present invention.

In the XY plane, the size of the opening portion 271 is larger than the sizes of the coils $T_L$ and $R_L$, and when the coil $R_L$, the opening portion 271 and the coil $T_L$ are seen along the direction of the Z axis, the outer circumferences of the coils $R_L$ and $T_L$ which are overlaid on each other are included within the opening portion 271. When it is considered that the shape of the opening portion 271 and the outer circumferential shapes of the coils $T_L$ and $R_L$ are all circles, the centers of the circles are located on one straight line parallel to the Z axis, and as shown in FIG. 30, the radius r1 of the circle serving as the shape of the opening portion 271 is larger than the radius r2 of the circle serving as the outer circumferential shapes of the coils $T_L$ and $R_L$. Hence, it is possible to satisfactorily realize the power transfer using the coils $T_L$ and $R_L$ though a slight loss is caused. For example, when the radius r1 is set 5 mm (millimeters) larger than the radius r2, a ratio of loss with respect to a case where the metal plate 270 is not present is about 10 to 20%.

The influence of the metal plate 270 formed of aluminum will be described.

With reference to FIG. 31A, in the reference arrangement state, the power transmission-side coil $T_L$ is magnetically coupled to the metal plate 270 which includes the opening portion 271. When an alternating current $I_1$ flows through the power transmission-side coil $T_L$, based on a magnetic field generated in the power transmission-side coil $T_L$ in this way, by electromagnetic induction, an alternating current $I_{31}$ in a direction opposite to the alternating current $I_1$ (that is, the alternating current $I_{31}$ whose phase is displaced 180 degrees) flows through an electrical path around the opening portion 271 within the metal plate 270. When a coupling coefficient between the power transmission-side coil $T_L$ and the metal plate 270 is assumed to be $K_{13}$, the alternating current $I_{31}$ is represented by "$I_{31}=K_{13} \times I_1$".

On the other hand, with reference to FIG. 31B, within the electronic device 2, the power reception-side coil $R_L$ is also magnetically coupled to the metal plate 270 which includes the opening portion 271. When an alternating current $I_2$ flows through the power reception-side coil $R_L$, based on a magnetic field generated in the power reception-side coil $R_L$ in this way, by electromagnetic induction, an alternating current $I_{32}$ in a direction opposite to the alternating current $I_2$ (that is, the alternating current $I_{32}$ whose phase is displaced 180 degrees) flows through the electrical path around the opening portion 271 within the metal plate 270. When a coupling coefficient between the power reception-side coil $R_L$ and the metal plate 270 is assumed to be $K_{23}$, the alternating current $I_{32}$ is represented by "$I_{32}=K_{23} \times I_2$".

FIG. 31C shows the currents $I_1$, $I_2$, $I_{31}$ and $I_{32}$ on a complex plane. The alternating current $I_2$ is a resonant current which flows through the power reception-side coil $R_L$ based on the alternating current $I_1$, and is represented by "$I_2=jQK_{12} \times I_1$". Here, $K_{12}$ is a coupling coefficient between the coils $T_L$ and $R_L$ in the reference arrangement state, Q is Q in the power reception-side coil $R_L$ and j is an imaginary number. The current $I_2$ lags in phase with respect to the current $I_1$ by 90 degrees.

When the resonant frequency of the resonant circuit TT is considered, the presence of the metal plate 270 where the alternating current $I_{31}$ is generated acts so as to equivalently reduce the inductance of the power transmission-side coil $T_L$ (that is, so as to reduce the inductance component of the resonant circuit TT) and to consequently increase the resonant frequency of the resonant circuit TT.

When the resonant frequency of the resonant circuit RR is considered, the presence of the metal plate 270 where the alternating current $I_{32}$ is generated acts so as to equivalently reduce the inductance of the power reception-side coil $R_L$ (that is, so as to reduce the inductance component of the resonant circuit RR) and to consequently increase the resonant frequency of the resonant circuit RR.

Hence, when the power feeding device 1 and the electronic device 2 are designed regardless of the presence of the metal plate 270, the resonant frequencies of the resonant circuits TT and RR are displaced from the reference frequency by the presence of the metal plate 270 so as to be increased. This displacement can exert influences such as a decrease in the efficiency of the power transfer utilizing magnetic field resonance.

When an alternating magnetic field is generated in the power transmission-side coil $T_L$, a voltage based on a current which flows through the metal plate 270 by the magnetic field generated in the power transmission-side coil $T_L$ is generated in the power transmission-side coil $T_L$, and the voltage acts so as to increase the amplitude of the current flowing through the power transmission-side coil $T_L$. Consequently, even when the foreign object 3 is not present on the power feeding stage 12, in the pFOD processing or the mFOD processing, the presence of the foreign object may be erroneously recognized. In other words, the metal plate 270 may be erroneously recognized as the foreign object (since the metal plate 270 is a constituent component of the electronic device 2, it is naturally necessary to prevent the metal plate 270 from being erroneously recognized as the foreign object). Although it can be considered that in order for such an erroneous recognition to be avoided, the upper limit value in the pFOD normal range or the mFOD normal range is set higher, such a setting leads to the degradation of the detection performance of the foreign object to be actually detected. For example, when attention is focused on the detection of the foreign object 3 such as a non-contact IC card, in the pFOD processing, it is observed that the current amplitude of the power transmission-side coil $T_L$ is lowered by the presence of the foreign object 3. However, when the current amplitude of the power transmission-side coil $T_L$ is increased by being affected by the metal plate 270, such an increase functions as noise in the observation of the lowering of the current amplitude caused by the presence of the foreign object 3, with the result that the detection of the foreign object 3 is not easily performed.

Example EX2_1B

The example EX2_1B will be described. The example EX2_1B is an example in which the cancel circuit GG is provided in the electronic device 2 with reference to the example EX2_1A.

As described previously, here, the resonant circuits TT, RR and GG are assumed to be parallel resonant circuits. When the resonant circuits TT, RR and GG are series resonant circuits, the "lead" and the "lag" of a phase which will be described below are reversed.

When the resonant frequency of the resonant circuit TT is higher than the reference frequency due to the presence of the metal plate 270, the reactance of the resonant circuit TT is inductive, and thus a current (which corresponds to i in FIG. 32) flowing through the entire resonant circuit TT lags in phase with respect to a voltage (which corresponds to e in FIG. 32) at the reference frequency applied to the resonant circuit TT. When the resonant frequency of the resonant circuit RR is higher than the reference frequency due to the presence of the metal plate 270, the same phenomenon occurs in the resonant circuit RR. If it is possible to cancel out the phase lag of the currents in the resonant circuits TT and RR caused by the metal plate 270, the resonant frequencies of the resonant circuits TT and RR which are increased by the metal plate 270 from the reference frequency coincide with or approach the reference frequency.

In order to realize this cancellation, it is preferable to exert, on the resonant circuits TT and RR, an influence opposite to the influence which is exerted by the metal plate 270 on the resonant circuits TT and RR, and it is preferable to provide, as a circuit for exerting the opposite influence, the cancel circuit GG which has a resonant frequency lower than the reference frequency (when the resonant circuits TT, RR and GG are series resonant circuits, the cancel circuit GG preferably has a resonant frequency higher than the reference frequency). The cancel circuit GG described above has the action of advancing the phases of the currents flowing through the entire resonant circuits TT and RR through the magnetic coupling of the cancellation coil $G_L$ to the power transmission-side coil $T_L$ and the power reception-side coil $R_L$ (see FIG. 32).

The actions of the metal plate 270 and the cancel circuit GG in the example EX2_1B are listed in FIG. 33.

The magnetic field generated in the power transmission-side coil $T_L$ by the flow of the alternating current $I_1$ in the power transmission-side coil $T_L$ acts so as to pass the current $I_{31}$ (see FIG. 31A and FIG. 31C) through the metal plate 270, and the presence of the metal plate 270 where the current $I_{31}$ is generated acts so as to equivalently reduce the inductance of the power transmission-side coil $T_L$ and to consequently increase the resonant frequency of the resonant circuit TT.

On the other hand, the magnetic field generated in the power transmission-side coil $T_L$ by the flow of the alternating current $I_1$ in the power transmission-side coil $T_L$ acts so as to pass a current $I_{G1}$ through the cancellation coil $G_L$, and the presence of the cancel circuit GG where the current $I_{G1}$ is generated acts so as to equivalently increase the inductance of the power transmission-side coil $T_L$ and to consequently reduce the resonant frequency of the resonant circuit TT.

In other words, the alternating magnetic field generated in the power transmission-side coil $T_L$ based on the alternating current $I_1$ interlinks the cancellation coil $G_L$, and thus the current $I_{G1}$ flowing through the cancellation coil $G_L$ has a phase depending on the resonant frequency of the cancel circuit GG, with the result that the phase thereof acts so as to cancel out the displacement of the resonant frequency of the resonant circuit TT from the reference frequency caused by the metal plate 270.

The magnetic field generated in the power reception-side coil $R_L$ by the flow of the alternating current $I_2$ in the power reception-side coil $R_L$ acts so as to pass the current $I_{32}$ (see FIG. 31B and FIG. 31C) through the metal plate 270, and the presence of the metal plate 270 where the current $I_{32}$ is generated acts so as to equivalently reduce the inductance of the power reception-side coil $R_L$ and to consequently increase the resonant frequency of the resonant circuit RR.

On the other hand, the magnetic field generated in the power reception-side coil $R_L$ by the flow of the alternating current $I_2$ in the power reception-side coil $R_L$ acts so as to pass a current $I_{G2}$ through the cancellation coil $G_L$, and the presence of the cancel circuit GG where the current $I_{G2}$ is generated acts so as to equivalently increase the inductance of the power reception-side coil $R_L$ and to consequently reduce the resonant frequency of the resonant circuit RR.

In other words, the alternating magnetic field generated in the power reception-side coil $R_L$ based on the alternating current $I_2$ interlinks the cancellation coil $G_L$, and thus the current $I_{G2}$ flowing through the cancellation coil $G_L$ has a phase depending on the resonant frequency of the cancel circuit GG, with the result that the phase thereof acts so as to cancel out the displacement of the resonant frequency of the resonant circuit RR from the reference frequency caused by the metal plate 270.

When the alternating magnetic field is generated in the power transmission-side coil $T_L$, the magnetic field generated in the power transmission-side coil $T_L$ causes a voltage based on the current $I_{G1}$ flowing through the cancellation coil $G_L$ to be generated in the power transmission-side coil $T_L$, and the generated voltage acts so as to reduce the amplitude of the current flowing through the power transmission-side coil $T_L$ as is understood from the fact that the influences exerted on the resonant circuit TT are opposite between the currents $I_{31}$ and $I_{G1}$.

Since as described above, the cancel circuit GG provides the action opposite to the metal plate 270 to the resonant circuits TT and RR, it is possible to cancel out (reduce), with the cancel circuit GG, the influences on the resonant circuits TT and RR exerted by the presence of the metal plate 270. Although the cancellation ideally means that a target to be cancelled out is completely cancelled out, the cancellation can be partial cancellation. Hence, the cancellation also means that the target to be cancelled out is reduced (the same is true in the other examples which will be described later).

As the capacitance value of the cancellation capacitor $G_C$ is varied, a relationship between the phases of the currents $I_{G1}$ and $I_{G2}$ and the phases of the currents $I_1$, $I_2$, $I_{31}$ and $I_{32}$ is varied, and thus the degree of the cancellation is varied by the variation of the relationship. Hence, the capacitance value of the cancellation capacitor $G_C$ is preferably adjusted such that the degree of the cancellation is optimized (maximized).

As the resistance value of the cancellation resistor $G_R$ is varied, the magnitudes of the currents $I_{G1}$ and $I_{G2}$ are varied through a variation in the Q value of the resonant circuit serving as the cancel circuit GG, and thus the degree of the cancellation is also varied by the variation of the magnitudes of the currents $I_{G1}$ and $I_{G2}$. Hence, the resistance value of the cancellation resistor $G_R$ is preferably determined such that the degree of the cancellation is optimized, and when the cancellation resistor $G_R$ is formed as a variable resistor, the resistance value of the cancellation resistor $G_R$ is preferably adjusted such that the degree of the cancellation is optimized.

In the configuration of the example EX2_1B, the variation in the resonant frequency of the resonant circuit RR caused by the presence of the metal plate 270 is cancelled out by the cancel circuit GG, and the variation in the resonant frequency of the resonant circuit TT caused by the presence of the metal plate 270 in the reference arrangement state is cancelled out by the cancel circuit GG, with the result that the influences exerted by the displacement of the resonant frequencies are removed. Since the increase in the amplitude of the current flowing through the power transmission-side coil $T_L$ caused by the presence of the metal plate 270 is cancelled out by the action of the cancel circuit GG, the influence based on the increase in the amplitude of the current is also removed. Hence, in the non-contact power feeding system of the example EX2_1B, only the cancel circuit GG is provided for the presence of the metal plate 270, and thus it is possible to perform the same operation in the first embodiment.

Preferably, in actuality, as shown in FIG. 34, the intermediate arrangement method described previously (see FIG. 25A and FIG. 25B) is adopted, and thus the cancellation coil $G_L$ is arranged between the power reception-side coil $R_L$ and the opening portion 271.

In the example EX2_1B, the back arrangement method described previously (see FIG. 26A and FIG. 26B) is adopted, and thus the cancellation coil $G_L$ can also be arranged in the position on the side opposite to the arrangement positions of the opening portion 271 and the power transmission-side coil $T_L$ when seen from the power reception-side coil $R_L$. However, in this case, the influence of the cancel circuit GG on the power transmission-side resonant circuit TT is significantly weak for the influence of the metal plate 270 on the power transmission-side resonant circuit TT, and thus the cancellation effect on the power transmission-side resonant circuit TT is weak. Hence, instead of the back arrangement method, the intermediate arrangement method as shown in FIG. 34 is preferably adopted.

Example EX2_2A

The example EX2_2A will be described. In order to clearly describe the actions of the cancel circuit GG in the example EX2_2B which will be described later, in the example EX2_2A, for convenience, it is assumed that the cancel circuit GG is not provided in the electronic device 2.

In the example EX2_2A, a magnetic material portion $MG_2$ is assumed to be provided in the electronic device 2. The magnetic material portion $MG_2$ is formed of an arbitrary magnetic material which indicates high permeability, and is formed of, for example, ferrite. The magnetic material portion $MG_2$ is provided in such a position as to affect the resonant frequency of the resonant circuit RR in the reference arrangement state (that is, when the power feeding device 1 and the electronic device 2 are in a predetermined positional relationship for the transmission and reception of power) or in such a position as to affect the resonant frequencies of both the resonant circuits TT and RR in the reference arrangement state.

It is first assumed that as shown in FIG. 35, between the power transmission-side coil $T_L$ and the power reception-side coil $R_L$, a magnetic material plate 281 (which corresponds to the dotted region of FIG. 35) is provided as the magnetic material portion $MG_2$, and influences exerted by the presence of the magnetic material portion $MG_2$ will be described. The magnetic material plate 281 affects the resonant frequencies of both the resonant circuits TT and RR.

In FIG. 36A and FIG. 36B, a relationship of currents flowing through the power transmission-side coil $T_L$, the power reception-side coil $R_L$ and the magnetic material portion $MG_2$ will be described.

In the reference arrangement state, the power transmission-side coil $T_L$ is magnetically coupled to the magnetic material portion $MG_2$ (the magnetic material plate 281), and when the alternating current $I_1$ flows through the power transmission-side coil $T_L$, this causes an alternating current $I_{41}$ in the same direction as the alternating current $I_1$ (that is, having the same phase as the alternating current $I_1$) to flow through the magnetic material portion $MG_2$ based on a magnetic field generated in the power transmission-side coil $T_L$ as shown in FIG. 36A.

The current $I_{41}$ is a current in a direction opposite to the current $I_{31}$ (see FIG. 31A) which flows through the metal plate 270 and which is assumed in the examples EX2_1 A and EX2_1B. Hence, the magnetic material portion $MG_2$ provides, to the power transmission-side resonant circuit TT, the action opposite to the metal plate 270. Specifically, the presence of the magnetic material portion $MG_2$ where the current $I_{41}$ is generated acts, in an opposite manner to the metal plate 270 having the opening portion 271, so as to equivalently increase the inductance of the power transmission-side coil $T_L$ (that is, so as to increase the inductance component of the resonant circuit TT), to consequently reduce the resonant frequency of the resonant circuit TT and to also reduce the amplitude of the current flowing through the power transmission-side coil $T_L$.

Within the electronic device 2, the power reception-side coil $R_L$ is magnetically coupled to the magnetic material portion $MG_2$ (the magnetic material plate 281), and when the alternating current $I_1$ flows through the power reception-side coil $R_L$, this causes an alternating current $I_{42}$ in the same direction as the alternating current $I_2$ (that is, having the same phase as the alternating current $I_2$) to flow through the magnetic material portion $MG_2$ based on a magnetic field generated in the power reception-side coil $R_L$ as shown in FIG. 36B.

The current $I_{42}$ is a current in a direction opposite to the current $I_{32}$ (see FIG. 31B) which flows through the metal plate 270 and which is assumed in the examples EX2_1 A and EX2_1B. Hence, the magnetic material portion $MG_2$ provides, to the power reception-side resonant circuit RR, the action opposite to the metal plate 270. Specifically, the presence of the magnetic material portion $MG_2$ where the current $I_{42}$ is generated acts, in the opposite manner to the metal plate 270 having the opening portion 271, so as to equivalently increase the inductance of the power reception-side coil $R_L$ (that is, so as to increase the inductance component of the resonant circuit RR), to consequently reduce the resonant frequency of the resonant circuit RR and to also reduce the amplitude of the current flowing through the power reception-side coil $R_L$.

Hence, when the power feeding device 1 and the electronic device 2 are designed regardless of the presence of the magnetic material portion $MG_2$, the resonant frequencies of the resonant circuits TT and RR are displaced from the reference frequency by the presence of the magnetic material portion $MG_2$ so as to be reduced. This displacement can exert influences such as a decrease in the efficiency of the power transfer utilizing magnetic field resonance.

The decrease in the amplitude of the current flowing through the power transmission-side coil $T_L$ caused by the presence of the magnetic material portion $MG_2$ leads to the deterioration of the accuracy of detection of the foreign object which relies on the amplitude of the current flowing through the power transmission-side coil $T_L$.

Example EX2_2B

The example EX2_2B will be described. The example EX2_2B is an example in which the cancel circuit GG is provided in the electronic device 2 with reference to the example EX2_2A.

As described previously, here, the resonant circuits TT, RR and GG are assumed to be parallel resonant circuits. When the resonant circuits TT, RR and GG are series resonant circuits, the "lead" and the "lag" of a phase which will be described below are reversed.

When the resonant frequency of the resonant circuit TT is lower than the reference frequency due to the presence of the magnetic material portion $MG_2$, the reactance of the resonant circuit TT is capacitive, and thus a current (which corresponds to i in FIG. 37) flowing through the entire resonant circuit TT leads in phase with respect to a voltage (which corresponds to e in FIG. 37) at the reference frequency applied to the resonant circuit TT. When the resonant frequency of the resonant circuit RR is lower than the reference frequency due to the presence of the magnetic material portion $MG_2$, the same phenomenon occurs in the resonant circuit RR. If it is possible to cancel out the phase lead of the currents in the resonant circuits TT and RR caused by the magnetic material portion $MG_2$, the resonant frequencies of the resonant circuits TT and RR which are reduced by the magnetic material portion $MG_2$ from the reference frequency coincide with or approach the reference frequency.

In order to realize this cancellation, it is preferable to exert, on the resonant circuits TT and RR, an influence opposite to the influence which is exerted by the magnetic material portion $MG_2$ on the resonant circuits TT and RR, and it is preferable to provide, as a circuit for exerting the opposite influence, the cancel circuit GG which has a resonant frequency higher than the reference frequency (when the resonant circuits TT, RR and GG are series resonant circuits, the cancel circuit GG preferably has a resonant frequency lower than the reference frequency). The cancel circuit GG described above has the action of delaying the phases of the currents flowing through the entire resonant circuits TT and RR through the magnetic coupling of the cancellation coil $G_L$ to the power transmission-side coil $T_L$ and the power reception-side coil $R_L$ (see FIG. 37).

Figure 38:
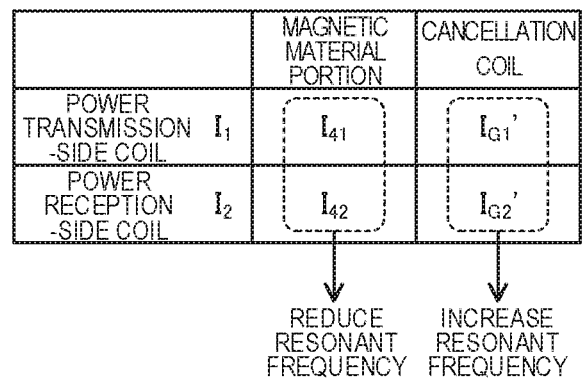
FIG. 38 is a diagram showing a relationship and actions of a plurality of currents in the example (EX2_2B) of the second embodiment of the present invention.

The actions of the magnetic material portion $MG_2$ and the cancel circuit GG in the example EX2_2B are listed in FIG. 38.

The magnetic field generated in the power transmission-side coil $T_L$ by the flow of the alternating current $I_1$ in the power transmission-side coil $T_L$ acts so as to pass the current $I_{41}$ (see FIG. 36A) through the magnetic material portion $MG_2$, and the presence of the magnetic material portion $MG_2$ where the current $I_{41}$ is generated acts so as to equivalently increase the inductance of the power transmission-side coil $T_L$ and to consequently reduce the resonant frequency of the resonant circuit TT.

On the other hand, the magnetic field generated in the power transmission-side coil $T_L$ by the flow of the alternating current $I_1$ in the power transmission-side coil $T_L$ acts so as to pass a current $I_{G1}'$ through the cancellation coil $G_L$, and the presence of the cancel circuit GG where the current $I_{G1}'$ is generated acts so as to equivalently reduce the inductance of the power transmission-side coil $T_L$ and to consequently increase the resonant frequency of the resonant circuit TT.

In other words, the alternating magnetic field generated in the power transmission-side coil $T_L$ based on the alternating current $I_1$ interlinks the cancellation coil $G_L$, and thus the current $I_{G1}'$ flowing through the cancellation coil $G_L$ has a phase depending on the resonant frequency of the cancel circuit GG, with the result that the phase thereof acts so as to cancel out the displacement of the resonant frequency of the resonant circuit TT from the reference frequency caused by the magnetic material portion $MG_2$.

The magnetic field generated in the power reception-side coil $R_L$ by the flow of the alternating current $I_2$ in the power reception-side coil $R_L$ acts so as to pass the current $I_{42}$ (see FIG. 36B) through the magnetic material portion $MG_2$, and the presence of the magnetic material portion $MG_2$ where the current $I_{42}$ is generated acts so as to equivalently increase the inductance of the power reception-side coil $R_L$ and to consequently reduce the resonant frequency of the resonant circuit RR.

On the other hand, the magnetic field generated in the power reception-side coil $R_L$ by the flow of the alternating current $I_2$ in the power reception-side coil $R_L$ acts so as to pass a current $I_{G2}'$ through the cancellation coil $G_L$, and the presence of the cancel circuit GG where the current $I_{G2}'$ is generated acts so as to equivalently reduce the inductance of the power reception-side coil $R_L$ and to consequently increase the resonant frequency of the resonant circuit RR.

In other words, the alternating magnetic field generated in the power reception-side coil $R_L$ based on the alternating current $I_2$ interlinks the cancellation coil $G_L$, and thus the current $I_{G2}'$ flowing through the cancellation coil $G_L$ has a phase depending on the resonant frequency of the cancel circuit GG, with the result that the phase thereof acts so as to cancel out the displacement of the resonant frequency of the resonant circuit RR from the reference frequency caused by the magnetic material portion $MG_2$.

When the alternating magnetic field is generated in the power transmission-side coil $T_L$, the magnetic field generated in the power transmission-side coil $T_L$ causes a voltage based on the current $I_{G1}'$ flowing through the cancellation coil $G_L$ to be generated in the power transmission-side coil $T_L$, and the generated voltage acts so as to increase the amplitude of the current flowing through the power transmission-side coil $T_L$ as is understood from the fact that the influences exerted on the resonant circuit TT are opposite between the currents $I_{41}$ and $I_{G1}'$.

Since as described above, the cancel circuit GG provides the action opposite to the magnetic material portion $MG_2$ to the resonant circuits TT and RR, it is possible to cancel out (reduce), with the cancel circuit GG, the influences on the resonant circuits TT and RR exerted by the presence of the magnetic material portion $MG_2$.

As the capacitance value of the cancellation capacitor $G_C$ is varied, a relationship between the phases of the currents $I_{G1}'$ and $I_{G2}'$ and the phases of the currents $I_1$, $I_2$, $I_{41}$ and $I_{42}$ is varied, and thus the degree of the cancellation is varied by the variation of the relationship. Hence, the capacitance value of the cancellation capacitor $G_C$ is preferably adjusted such that the degree of the cancellation is optimized (maximized).

As the resistance value of the cancellation resistor $G_R$ is varied, the magnitudes of the currents $I_{G1}'$ and $I_{G2}'$ are varied through a variation in the Q value of the resonant circuit serving as the cancel circuit GG, and thus the degree of the cancellation is also varied by the variation of the magnitudes of the currents $I_{G1}'$ and $I_{G2}'$. Hence, the resistance value of the cancellation resistor $G_R$ is preferably determined such that the degree of the cancellation is optimized, and when the cancellation resistor $G_R$ is formed as a variable resistor, the resistance value of the cancellation resistor $G_R$ is preferably adjusted such that the degree of the cancellation is optimized.

In the configuration of the example EX2_2B, the variation in the resonant frequency of the resonant circuit RR caused by the presence of the magnetic material portion $MG_2$ is cancelled out by the cancel circuit GG, and the variation in the resonant frequency of the resonant circuit TT caused by the presence of the magnetic material portion $MG_2$ in the reference arrangement state is cancelled out by the cancel circuit GG, with the result that the influences exerted by the displacement of the resonant frequencies are removed. Since a decrease in the amplitude of the current flowing through the power transmission-side coil $T_L$ caused by the presence of the magnetic material portion $MG_2$ is cancelled out by the action of the cancel circuit GG, the influence based on the decrease in the amplitude of the current is also removed. Hence, in the non-contact power feeding system of the example EX2_2B, only the cancel circuit GG is provided for the presence of the magnetic material portion $MG_2$, and thus it is possible to perform the same operation in the first embodiment.

Preferably, when as with the magnetic material plate 281 shown in FIG. 35, the magnetic material portion $MG_2$ is present between the power transmission-side coil $T_L$ and the power reception-side coil $R_L$, the intermediate arrangement method described previously (see FIG. 25A and FIG. 25) is adopted, and thus the cancellation coil $G_L$ is arranged between the power reception-side coil $R_L$ and the magnetic material portion $MG_2$ (the magnetic material plate 281) or the magnetic material portion $MG_2$ (the magnetic material plate 281) is arranged between the power reception-side coil $R_L$ and the cancellation coil $G_L$.

Figure 39:
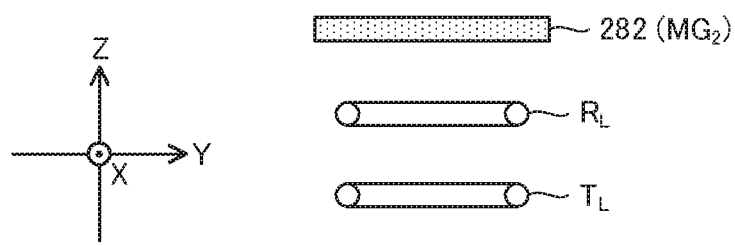
FIG. 39 is a positional relationship diagram of a power transmission-side coil, a power reception-side coil and a magnetic material plate in the example (EX2_2B) of the second embodiment of the present invention.

However, when a magnetic material plate 282 serving as the magnetic material portion $MG_2$ is present in a position as shown in FIG. 39, either the intermediate arrangement method (see FIG. 25A and FIG. 25B) or the back arrangement method (see FIG. 26A and FIG. 26) may be adopted.

Figure 40:
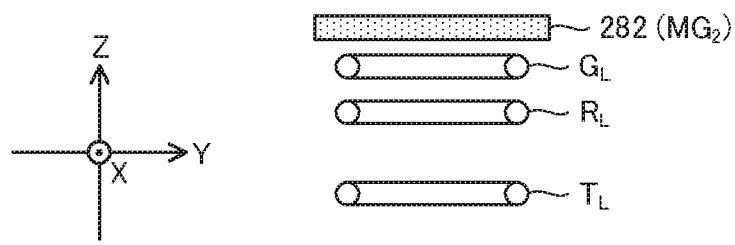
FIG. 40 is a positional relationship diagram of the power transmission-side coil, the power reception-side coil, a cancellation coil and the magnetic material plate in the example (EX2_2B) of the second embodiment of the present invention.

FIG. 40 shows a positional relationship between the coils $T_L$, $R_L$ and $G_L$ and the magnetic material plate 282 in the reference arrangement state when the magnetic material plate 282 is provided as the magnetic material portion $MG_2$ and the back arrangement method is adopted. In the reference arrangement state, the magnetic material plate 282 is provided in a position on the side opposite to the arrangement position of the power transmission-side coil $T_L$ when seen from the power reception-side coil $R_L$, and the cancellation coil $G_L$ is arranged between the power reception-side coil $R_L$ and the magnetic material plate 282. In other words, in the reference arrangement state, the magnetic material plate 282, the cancellation coil $G_L$, the power reception-side coil $R_L$ and the power transmission-side coil $T_L$ are aligned in this order along the direction of the Z axis.

When the arrangement relationship as shown in FIG. 40 is adopted, a distance between the power transmission-side coil $T_L$ and the magnetic material plate 282 is relatively long. Hence, in the reference arrangement state, the magnetic material portion $MG_2$ serving as the magnetic material plate 282 may affect only the resonant frequency of the resonant circuit RR in the resonant circuits TT and RR or may fail to have the action of reducing the amplitude of the current flowing through the power transmission-side coil $T_L$. In other words, a variation in the resonant frequency of the power transmission-side resonant circuit TT and a decrease in the amplitude of the current flowing through the power transmission-side coil $T_L$ caused by the presence of the magnetic material portion $MG_2$ may be small enough to be ignored. In this case, it can also be said that the cancel circuit GG is mainly provided in order to cancel out the influence exerted by the magnetic material portion $MG_2$ on the power reception-side resonant circuit RR.

Figure 41:
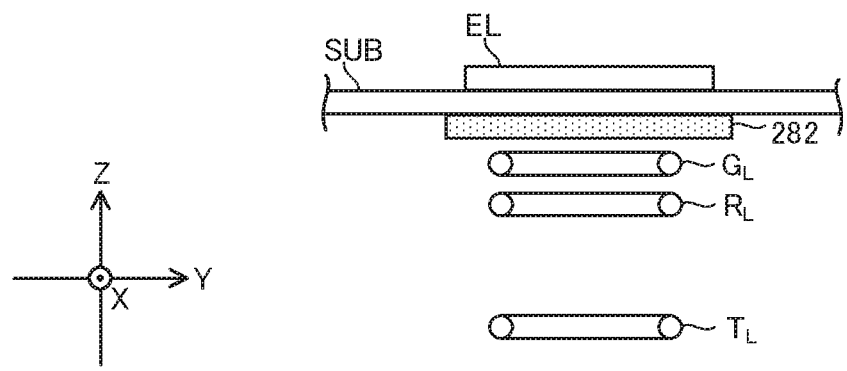
FIG. 41 is a positional relationship diagram of the power transmission-side coil, the power reception-side coil, the cancellation coil, the magnetic material plate and an electronic device in the example (EX2_2B) of the second embodiment of the present invention.

FIG. 41 shows an example of the utilization of the magnetic material plate 282. As shown in FIG. 41, in the electronic device 2, a substrate SUB is provided on which an electronic circuit EL including an integrated circuit such as a power reception-side IC 200 is mounted. In the configuration example of FIG. 41, the magnetic material plate 282 is inserted between the electronic circuit EL and the power reception-side coil $R_L$, and the electronic circuit EL, the magnetic material plate 282, the cancellation coil $G_L$, the power reception-side coil $R_L$ and the power transmission-side coil $T_L$ are aligned in this order along the direction of the Z axis. Here, preferably, for example, the electronic circuit EL is mounted on the component surface of the substrate SUB, and the magnetic material plate (magnetic material sheet) 282 is adhered to the surface on the side opposite to the component surface of the substrate SUB. In this way, the magnetic field which is not necessary for the operation of the electronic circuit EL and which is generated in the coil $R_L$ or $T_L$ is absorbed in the magnetic material plate 282, and thus an erroneous operation and the like of the electronic circuit EL are reduced. As described above, in order to interrupt a magnetic field to the electronic circuit EL, the magnetic material plate 282 is often provided within the electronic device 2. The cancel circuit GG helps the magnetic material plate 282 cancel out undesirable influences which can be exerted on the power transfer, the detection of the foreign object and the like.

With consideration given to the fact that the magnetic material portion $MG_2$ and the metal plate 270 exert, on the resonant circuits TT and RR, the influences opposite to each other, it is also useful to adopt a method of fitting the magnetic material portion $MG_2$ (the magnetic material plate 281 in FIG. 35) into the opening portion 271 of the metal plate 270. In this way, it is possible to cancel out the influences of the magnetic material portion $MG_2$ and the metal plate 270 without use of the cancel circuit GG. However, the degree of an effect exerted by this method depends on the shapes and the arrangement positions of the magnetic material portion $MG_2$ and the metal plate 270, and it is often not easy to change the shapes and the like thereof due to the constraint of the structure even if the effect is not optimal. By contrast, in the cancel circuit GG, it is easy to make an adjustment such as by utilization of a trimmer capacitor.

Example EX2_3A

The example EX2_3A will be described. In order to clearly describe the actions of the cancel circuit GG in the example EX2_3B which will be described later, in the example EX2_3A, for convenience, it is assumed that the cancel circuit GG is not provided in the electronic device 2.

The $f_O$ change/short circuit operation (the resonant frequency change operation or the coil short circuit operation) utilizing the resonant state change circuit 240 is performed, and thus, ideally, the resonant circuit RR does not function as a load for the power transmission-side coil $T_L$ at all, and the same conditions as when the resonant circuit RR is not present are achieved. However, the resonant frequency of the resonant circuit RR after being changed by the resonant frequency change operation is not sufficiently different from the reference frequency or the changing of the resonant frequency of the resonant circuit RR or the short-circuiting of the power reception-side coil $R_L$ is performed through a circuit having nonlinearity, with the result that in actuality, even while the $f_O$ change/short circuit operation is being performed, based on the magnetic field generated in the power transmission-side coil $T_L$, a certain amount of current (hereinafter referred to as a power reception-side unnecessary current) may flow through the power reception-side coil $R_L$. Hence, a voltage based on the power reception-side unnecessary current flowing through the power reception-side coil $R_L$ is generated in the power transmission-side coil $T_L$, and thus the voltage produces a variation in the amplitude of the current flowing through the power transmission-side coil $T_L$. This variation leads to the deterioration of the accuracy of detection of the foreign object in the pFOD processing which relies on the amplitude of the current flowing through the power transmission-side coil $T_L$.

Figure 42:
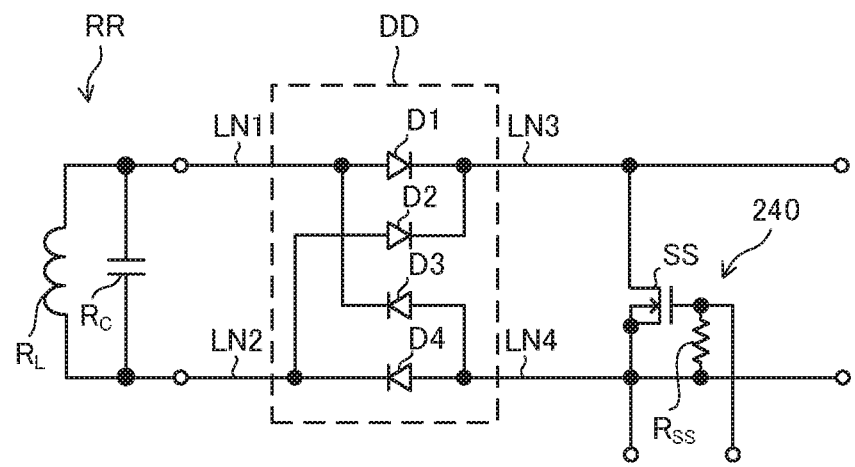
FIG. 42 is a diagram showing a power reception-side resonant circuit and a peripheral circuit thereof in an example (EX2_3A) of the second embodiment of the present invention.

FIG. 42 shows an example of the resonant state change circuit 240 which is formed so as to be able to realize the coil short circuit operation. In FIG. 42, the resonant circuit RR is assumed to be a parallel resonant circuit, and the resonant state change circuit 240 includes a transistor SS and a resistor Rss. The transistor SS is formed as an N-channel MOSFET. A rectifier circuit DD is a full-wave rectifier circuit which is formed with diodes (rectifier elements) D1 to D4. In the electronic device 2, a circuit which is formed with the rectifier circuit DD, the transistor SS and the resistor Rss can be provided between the resonant circuit RR and the communication circuit 220 or between the resonant circuit RR and the power reception circuit 230. The switching circuit 210 (see FIG. 5) which needs to be interposed between the resonant circuit RR and the rectifier circuit DD is omitted in FIG. 42.

In the circuit of FIG. 42, one end of the power reception-side coil $R_L$ and one end of the power reception-side capacitor $R_C$ are connected in common to a line LN1 whereas the other end of the power reception-side coil $R_L$ and the other end of the power reception-side capacitor $R_C$ are connected in common to a line LN2. The line LN1 is connected in common to the anode of the diode D1 and the cathode of the diode D3, and the line LN2 is connected in common to the anode of the diode D2 and the cathode of the diode D4. The cathodes of the diodes D1 and D2 are connected in common to a line LN3, and the anodes of the diodes D3 and D4 are connected in common to a line LN4. In the transistor SS, the drain is connected to the line LN3, the source is connected to the line LN4 and the gate is connected to the line LN4 through the resistor Rss.

The control circuit 250 of the electronic device 2 controls the gate voltage of the transistor SS so as to turn on or off the transistor SS. When the transistor SS is off, an alternating current flows through the power reception-side coil $R_L$ based on a magnetic field generated in the power transmission-side coil $T_L$, and power based on the alternating current is propagated through the rectification of the rectifier circuit DD between the lines LN3 and LN4. By the power propagated between the lines LN3 and LN4, the power reception operation and the like can be performed.

On the other hand, when the transistor SS is on, the power reception-side coil $R_L$ is short-circuited through the rectifier circuit DD (more specifically, through a combination of the diodes D1 and D4 or a combination of the diodes D2 and D3), and thus no voltage is generated between the lines LN3 and LN4 (for simplification of description, the voltage between the drain and the source of the transistor SS is assumed to be zero). Although as described above, the transistor SS of FIG. 42 corresponds to the switch 243 of FIG. 10, in the circuit of FIG. 42, between the resonant circuit RR and the transistor SS, the circuit (DD) which is formed with the semiconductor elements (D1 to D4) having nonlinearity is interposed.

Hence, in a region where the voltage between the lines LN1 and LN2 is low, the diodes D1 to D4 are in a non-conducting state, and thus even when the transistor SS is on, the power reception-side coil $R_L$ is prevented from being short-circuited, with the result that the power reception-side unnecessary current flows through the power reception-side coil $R_L$.

Example EX2_3B

The example EX2_3B will be described. The example EX2_3B is an example in which the cancel circuit GG is provided in the electronic device 2 with reference to the example EX2_3A.

Figure 43:
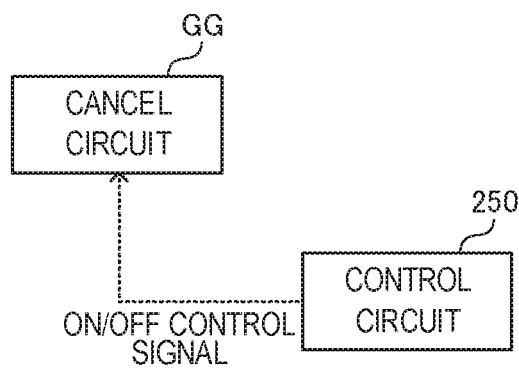
FIG. 43 is a diagram showing how on/off control is performed on the function of a cancel circuit by a control circuit in an example (EX2_3B) of the second embodiment of the present invention.

The cancel circuit GG in the example EX2_3B is a circuit which corresponds to that the $f_O$ change/short circuit operation is not ideal. On the other hand, the $f_O$ change/short circuit operation is performed in the pFOD processing, and is not performed in the power transfer and the like. Hence, in the example EX2_3B, as shown in FIG. 43, the control circuit 250 feeds, to the cancel circuit GG, an on-control signal or an off-control signal according to whether or not the $f_O$ change/short circuit operation is performed.

When the on-control signal is fed to the cancel circuit GG, in the cancel circuit GG, a parallel resonant circuit or a series resonant circuit is formed by the parallel connection or the series connection of the coil $G_L$, the capacitor $G_C$ and the resistor $G_R$, and thus when the alternating magnetic field interlinks the coil $G_L$, a resonant operation is performed in the cancel circuit GG (a current flows through the coil $G_L$).

When the off-control signal is fed to the cancel circuit GG, in the cancel circuit GG, the connection between the coil $G_L$, the capacitor $G_C$ and the resistor $G_R$ is interrupted or the coil $G_L$ is short-circuited such that the parallel resonant circuit or the series resonant circuit is prevented from being formed, with the result that even when the alternating magnetic field interlinks the coil $G_L$, the resonant operation is not performed in the cancel circuit GG (no current flows through the coil $G_L$).

Preferably, for example, in the cancel circuit GG, a switch is inserted in series on wiring connecting the coil $G_L$ and the capacitor $G_C$, and when the on-control signal is received, the switch is turned on whereas when the off-control signal is received, the switch is turned off, with the result that the connection between the coil $G_L$, the capacitor $G_C$ and the resistor $G_R$ is interrupted. Preferably, for another example, in the cancel circuit GG, a switch is connected in parallel to the coil $G_L$, and when the on-control signal is received, the switch is turned off whereas when the off-control signal is received, the switch is turned on, with the result that the coil $G_L$ is short-circuited.

The control circuit 250 outputs the on-control signal to the cancel circuit GG only during a period in which the resonant state change circuit 240 is made to perform the $f_O$ change/short circuit operation, and during a period other than the period described above (including a period in which the NFC communication and the NFC power transfer are performed), the control circuit 250 outputs the off-control signal to the cancel circuit GG, with the result that the resonant operation of the cancel circuit GG is stopped.

In the example EX2_3B, conditions in which the on-control signal is fed to the cancel circuit GG will be considered below.

Figure 44:
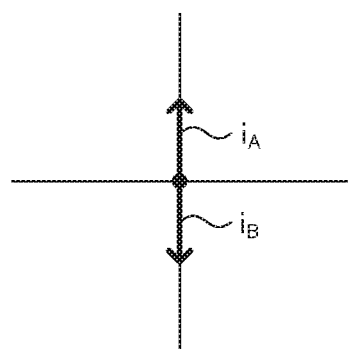
FIG. 44 is a relationship diagram of two current vectors in the example (EX2_3B) of the second embodiment of the present invention.

FIG. 44 is referenced. A symbol "$i_A$" represents a power reception-side unnecessary current which flows through the power reception-side coil $R_L$ based on the magnetic field generated in the power transmission-side coil $T_L$ while the $f_O$ change/short circuit operation is being performed. A symbol "is" represents a current which flows through the cancellation coil $G_L$ based on the magnetic field generated in the power transmission-side coil $T_L$ while the $f_O$ change/short circuit operation is being performed. In FIG. 44, the currents $i_A$ and is are shown as current vectors on a complex plane. When the currents $i_A$ and is are opposite in direction to each other (that is, the currents $i_A$ and is differ in phase from each other by 180 degrees), the currents $i_A$ and is provide, to the resonant circuit TT, actions opposite to each other, and thus the influence of the power reception-side unnecessary current $i_A$ on the amplitude of the current flowing through the power transmission-side coil $T_L$ is cancelled out (reduced). Furthermore, when the magnitudes of the currents $i_A$ and is are equal to each other, the influence of the power reception-side unnecessary current $i_A$ on the amplitude of the current flowing through the power transmission-side coil $T_L$ is completely cancelled out by the current is.

Hence, the cancel circuit GG is formed such that the currents $i_A$ and is are opposite in direction to each other (that is, that the current is has a phase which differs from the power reception-side unnecessary current $i_A$ by 180 degrees), and is preferably formed such that the currents $i_A$ and is are opposite in direction to each other and are equal in magnitude to each other. The resonant frequency of the cancel circuit GG described above is naturally displaced from the reference frequency.

As the capacitance value of the cancellation capacitor $G_C$ is varied, a relationship between the phases of the currents $i_A$ and $i_B$ is varied, and thus the degree of the cancellation is varied by the variation of the phase relationship. Hence, the capacitance value of the cancellation capacitor $G_C$ is preferably adjusted such that the degree of the cancellation is optimized (maximized).

As the resistance value of the cancellation resistor $G_R$ is varied, the magnitude of the current $I_B$ is varied through a variation in the Q value of the resonant circuit serving as the cancel circuit GG, and thus the degree of the cancellation is also varied by the variation of the magnitude of the current $I_B$. Hence, the resistance value of the cancellation resistor $G_R$ is preferably determined such that the degree of the cancellation is optimized, and when the cancellation resistor $G_R$ is formed as a variable resistor, the resistance value of the cancellation resistor $G_R$ is preferably adjusted such that the degree of the cancellation is optimized.

In the configuration of the example EX2_3B, the influence which is exerted by the power reception-side unnecessary current on the amplitude of the current flowing through the power transmission-side coil $T_L$ can be removed, and thus it is possible to keep high the accuracy of detection of the foreign object in the pFOD processing.

Example EX2_4

Figure 45:
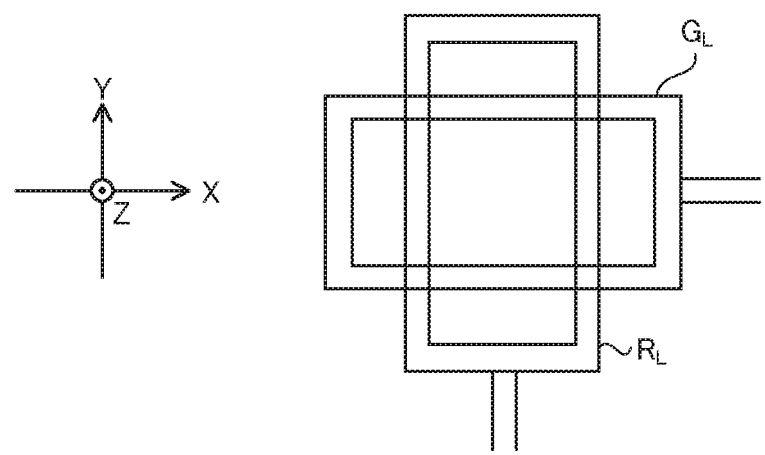
FIG. 45 is a diagram showing a method of arranging a power reception-side coil and a cancellation coil in an example (EX2_4) of the second embodiment of the present invention.

The example EX2_4 will be described. FIG. 45 shows an arrangement positional relationship between the power reception-side coil $R_L$ and the cancellation coil $G_L$ on the XY plane. In FIG. 45, the outer peripheral shapes of the coils $R_L$ and $G_L$ are assumed to be rectangular, and for simplification of illustration and prevention of complication, the windings of the coils $R_L$ and $G_L$ are represented by double rectangles. Line segments which are extended laterally from the double rectangles indicate the drawn wires of the coils.

The cancellation coil $G_L$ is provided, for example, in order to cancel out the influence of the metal plate 270, and thus it is hardly necessary to increase the degree of magnetic coupling to the power reception-side coil $R_L$. When the coupling to the metal plate 270 is considered, no matter how the cancellation coil $G_L$ is rotated around the Z axis, the degree of the coupling is not changed at all or is little changed (the same is true for the magnetic material plate 281 or 282).

Hence, preferably, as shown in FIG. 45, on the XY plane, for example, when the outer peripheral shapes of the coils $R_L$ and $G_L$ are rectangular, the long axes of the outer peripheral shapes of the coils $R_L$ and $G_L$ are directed in directions different from each other (for example, are directed so as to be orthogonal to each other) in order to reduce the coupling between the coils $R_L$ and $G_L$. When the outer peripheral shape of the power reception-side coil $R_L$ is set to be rectangular, the outer peripheral shape of the power transmission-side coil $T_L$ is also set to be the same rectangular, and in the reference arrangement state, the long axes of the outer peripheral shapes of the coils $R_L$ and $G_L$ are directed in the same directions as each other in order to enhance the coupling between the coils $T_L$ and $R_L$.

For a similar purpose, on the XY plane, the shape of the coil $G_L$ may be made to differ from the shapes of the coils $T_L$ and $R_L$.

Third Embodiment

A third embodiment of the present invention will be described. In the third embodiment, a method of adjusting and determining the capacitance value of the cancellation capacitor $G_C$ will be described. The method described in the third embodiment can be applied to the non-contact power feeding system of the second embodiment.

Although attention is not given in the first and second embodiments, the control circuit 160 in the power feeding device 1 sets, to its operation mode, any one of a plurality of modes including a normal mode and a test mode, and performs operations in the operation mode which is set, and likewise, the control circuit 250 in the electronic device 2 sets, to its operation mode, any one of a plurality of modes including the normal mode and the test mode, and performs operations in the operation mode which is set. The modes in the control circuit 160 and the modes in the control circuit 250 may coincide with or differ from each other. Although the modes in the control circuits 160 and 250 can include modes other than the normal mode and the test mode, in the following description, attention is focused on only the normal mode and the test mode.

All the operations of the power feeding device 1 and the electronic device 2 described in the first and second embodiments are operations which are performed when the operation modes of the control circuits 160 and 250 are set to the normal mode (however, the initial setting processing is omitted).

At the time of the startup of the power feeding device 1 or with arbitrary timing after the startup of the power feeding device 1, the control circuit 160 of the power feeding device 1 sets its operation mode to the test mode only when receiving an input of a predetermined test mode setting instruction, otherwise the control circuit 160 sets its operation mode to the normal mode. Likewise, at the time of the startup of the electronic device 2 or with arbitrary timing after the startup of the electronic device 2, the control circuit 250 of the electronic device 2 sets its operation mode to the test mode only when receiving an input of the predetermined test mode setting instruction, otherwise the control circuit 250 sets its operation mode to the normal mode.

Figure 46:
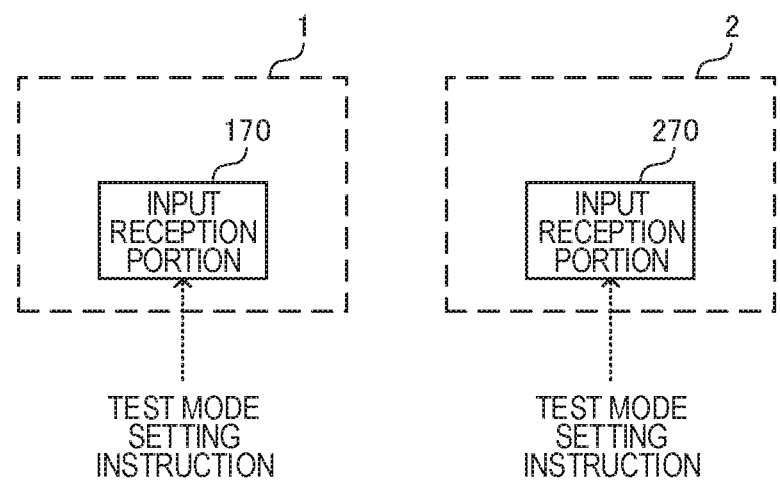
FIG. 46 is a diagram showing how an input reception portion is provided in each of a power feeding device and an electronic device in a third embodiment of the present invention.

With reference to FIG. 46, the power feeding device 1 includes an input reception portion 170 for receiving the inputs of various instructions including the test mode setting instruction, and the electronic device 2 includes an input reception portion 270 for receiving the inputs of various instructions including the test mode setting instruction.

For example, the input reception portion 170 may be formed with push button switches, a touch panel or the like for receiving an input of the test mode setting instruction from an operator. For another example, the input reception portion 170 may be formed with a communication port which can receive a signal transmitted from an external device. In this case, the reception of a predetermined test mode transfer requirement signal in the communication port of the input reception portion 170 from the external device corresponds to the input of the test mode setting instruction to the power feeding device 1 and the input reception portion 170, and by the reception of the test mode transfer requirement signal, the operation mode of the control circuit 160 is set to the test mode. The external device is a device which is different from the power feeding device 1 and the electronic device 2, and may be, for example, a computer device 4 (see FIG. 47) which will be described later.

Likewise, for example, the input reception portion 270 may be formed with push button switches, a touch panel or the like for receiving an input of the test mode setting instruction from the operator. For another example, the input reception portion 270 may be formed with a communication port which can receive a signal transmitted from the external device. In this case, the reception of the predetermined test mode transfer requirement signal in the communication port of the input reception portion 270 from the external device corresponds to the input of the test mode setting instruction to the electronic device 2 and the input reception portion 270, and by the reception of the test mode transfer requirement signal, the operation mode of the control circuit 250 is set to the test mode.

In the control circuit 160 of the power feeding device 1, the operation mode is set to the test mode, thereafter the power supply of the power feeding device 1 is turned off, the power feeding device 1 is restarted and thus the operation mode is changed to the normal mode. The control circuit 160 may have a configuration in which after the control circuit 160 sets its operation mode to the test mode, when a predetermined condition holds true (for example, when the input reception portion 170 receives an input of a normal mode transfer instruction different from the test mode setting instruction), the control circuit 160 can transfer its operation mode to the normal mode.

In the control circuit 250 of the electronic device 2, the operation mode is set to the test mode, thereafter the power supply of the electronic device 2 is turned off, the electronic device 2 is restarted and thus the operation mode is changed to the normal mode. The control circuit 250 may have a configuration in which after the control circuit 250 sets its operation mode to the test mode, when a predetermined condition holds true (for example, when the input reception portion 270 receives an input of the normal mode transfer instruction different from the test mode setting instruction), the control circuit 250 can transfer its operation mode to the normal mode.

Figure 47:
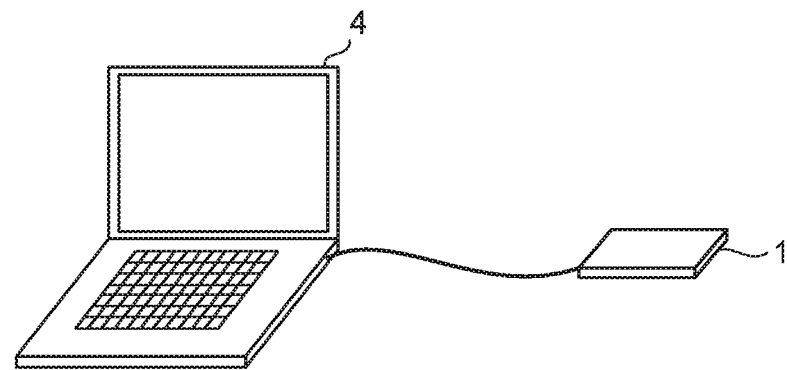
FIG. 47 is an external view of a computer device and the power feeding device connected to each other in the third embodiment of the present invention.
Figure 48:
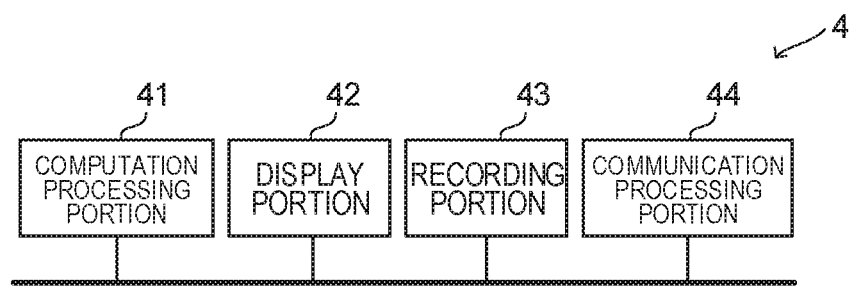
FIG. 48 is a schematic internal block diagram of the computer device in the third embodiment of the present invention.

FIG. 47 shows the appearance of the computer device 4 which is an example of the external device together with the appearance of the power feeding device 1. FIG. 48 is a schematic internal block diagram of the computer device 4. The computer device 4 includes individual portions which are represented by symbols 41 to 44.

The computation processing portion 41 is formed with a CPU (Central Processing Unit), a ROM (Read Only Memory), a RAM (Random Access Memory) and the like, performs various types of computation processing and comprehensively controls the individual portions within the computer device 4. The display portion 42 is formed with a liquid crystal display panel or the like, and displays arbitrary information as images under the control of the computation processing portion 41. The recording portion 43 is formed with a magnetic disk, a semiconductor memory and the like, and records arbitrary information.

The communication processing portion 44 performs wireless or wired communication with a device different from the computer device 4. Here, it is assumed that between the power feeding device 1 and the computer device 4, wired communication in conformity with a predetermined wired communication standard (for example, the standard of a USB (Universal Serial Bus)) can be performed, and that a communication port provided in the power feeding device 1 and a communication port provided in the computer device 4 are connected with a predetermined communication cable so as to be able to perform bidirectional communication on arbitrary information between the power feeding device 1 and the computer device 4. However, when the function of performing wireless communication with the computer device 4 is provided in the power feeding device 1, the communication between the power feeding device 1 and the computer device 4 may be wireless communication.

In one form of the test mode, the control circuit 160 can generate the test magnetic field in the power transmission-side coil $T_L$ through the control of the switching circuit 110 and the power transmission circuit 130, and the control circuit 250 uses the resonant state change circuit 240 so as to be able to perform $f_O$ change/short circuit operation.

Figure 49A:
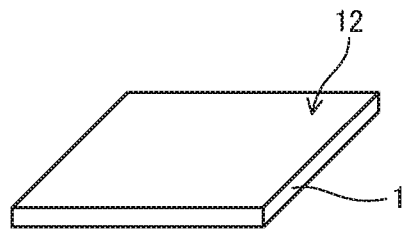
FIG. 49A and FIG. 49B are illustrative diagrams of first and second test forms utilized in the third embodiment of the present invention.
Figure 49B:
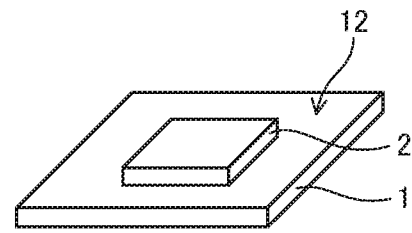

Here, a first test form and a second test form in FIG. 49A and FIG. 49B are assumed.

In the first test form, the control circuit 160 is set to the test mode, the test magnetic field is generated in the power transmission-side coil $T_L$ and the initial setting environment described previously is adjusted (that is, the electronic device 2 and the foreign object are not placed on the power feeding stage 12).

In the second test form, the control circuit 160 is set to the test mode and the test magnetic field is generated in the power transmission-side coil $T_L$ whereas the control circuit 250 is set to the test mode, the $f_O$ change/short circuit operation is performed and the electronic device 2 is placed on the power feeding stage 12 in the reference arrangement state.

Figure 50:
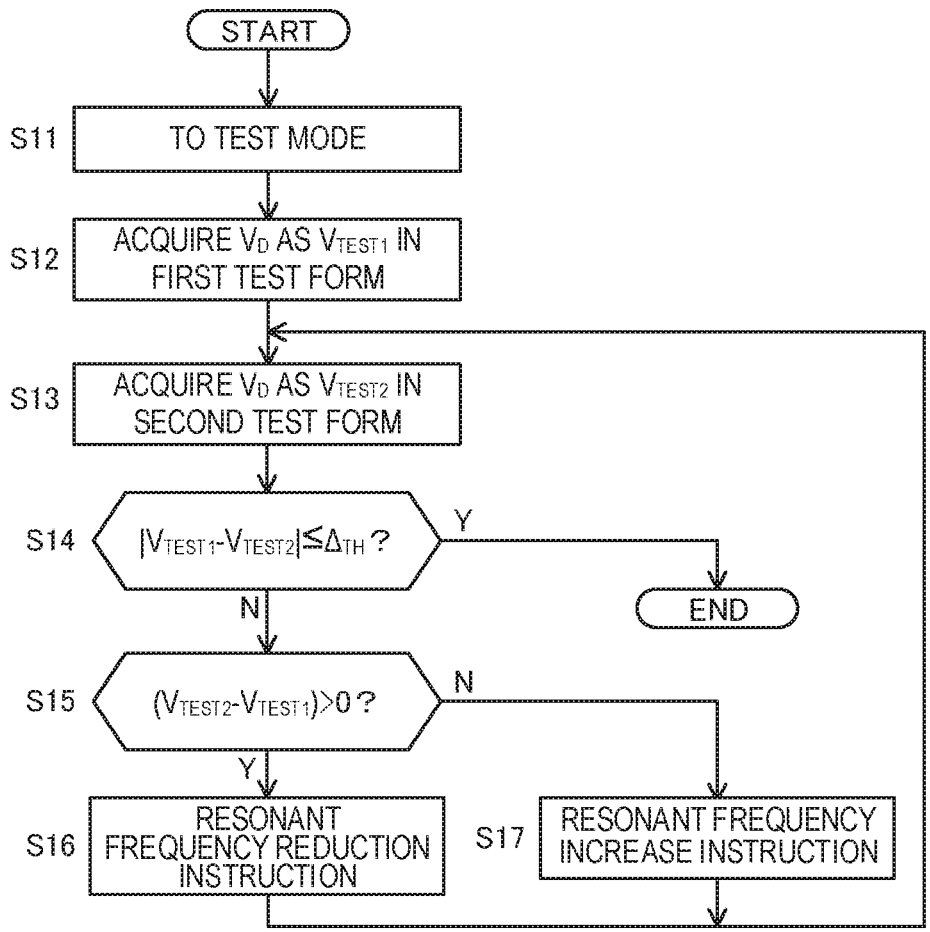
FIG. 50 is a flowchart of processing for adjusting the capacitance value of a cancellation capacitor in the third embodiment of the present invention.

FIG. 50 is a flowchart of processing for adjusting the capacitance value of the cancellation capacitor $G_C$ by utilization of the test mode. It is assumed that when the processing is performed, the power feeding device 1 and the computer device 4 are connected so as to be able to communicate with each other.

First, in step S11, the test mode setting instruction is provided to the power feeding device 1 and the electronic device 2, and thus the operation modes of the control circuits 160 and 250 are set to the test mode. When the cancellation capacitor $G_C$ is formed as a trimmer capacitor, a state where an adjuster can manually adjust the capacitance value of the cancellation capacitor $G_C$ is adjusted.

In step S12 subsequent thereto, the first test form is adjusted, and the control circuit 160 acquires the voltage value $V_D$ in the first test form. The voltage value $V_D$ acquired in the first test form is referred to as a detection value and is represented by $V_{TEST1}$. Furthermore, in step S13, the second test form is adjusted, and the control circuit 160 acquires the voltage value $V_D$ in the second test form. The voltage value $V_D$ acquired in the second test form is referred to as a detection value and is represented by $V_{TEST2}$. The detection values $V_{TEST1}$ and $V_{TEST2}$ may be fed to the computer device 4.

In the control circuit 160 of the power feeding device 1 or the computation processing portion 41 of the computer device 4, a test processing portion (unillustrated) is provided. In step S14 subsequent to step S13, the test processing portion compares an absolute value $|V_{TEST1}-V_{TEST2}|$ with a predetermined positive threshold value $\Delta_{TH}$. When "$|V_{TEST1}-V_{TEST2}| \leq \Delta_{TH}$" holds true, it is determined that the capacitance value of the cancellation capacitor $G_C$ is appropriate, and thus the adjustment of the capacitance value is completed whereas when "$|V_{TEST1}-V_{TEST2}| \leq \Delta_{TH}$" does not hold true, the process proceeds to step S15. Preferably, when "$|V_{TEST1}-V_{TEST2}| \leq \Delta_{TH}$" holds true, the test processing portion displays, on the display portion 42, information indicating that the adjustment may be completed.

In step S15, the test processing portion determines whether or not "$(V_{TEST2}-V_{TEST1})>0$" holds true, and when "$(V_{TEST2}-V_{TEST1})>0$" holds true, in step S16, the test processing portion outputs a resonant frequency reduction instruction, and then the process returns to step S13 whereas when "$(V_{TEST2}-V_{TEST1})>0$" does not hold true, in step S17, the test processing portion outputs a resonant frequency increase instruction, and then the process returns to step S13.

When the cancellation capacitor $G_C$ is formed as a trimmer capacitor, and the capacitance value of the cancellation capacitor $G_C$ is manually adjusted, the resonant frequency reduction instruction and the resonant frequency increase instruction are instructions which are provided to the adjuster. In this case, the resonant frequency reduction instruction prompts the adjuster to manually operate the trimmer capacitor such that the resonant frequency of the cancel circuit GG is reduced, and for example, an image indicating the instruction is displayed on the display portion 42. By contrast, the resonant frequency increase instruction prompts the adjuster to manually operate the trimmer capacitor such that the resonant frequency of the cancel circuit GG is increased, and for example, an image indicating the instruction is displayed on the display portion 42.

When the cancellation capacitor $G_C$ is formed as a varicap, and the capacitance value of the cancellation capacitor $G_C$ is adjusted without depending on a manual operation, the resonant frequency reduction instruction and the resonant frequency increase instruction are provided to the electronic device 2 by the NFC communication. However, in this case, each time the processing in steps S13 to S15 is performed, the power feeding device 1 and the electronic device 2 are brought into a state where they can perform the NFC communication, and a signal indicating the resonant frequency reduction instruction or the resonant frequency increase instruction is transmitted by the NFC communication from the power feeding device 1 to the electronic device 2. The control circuit 250 has the function of varying a voltage applied to the varicap, and when the control circuit 250 receives the signal indicating the resonant frequency reduction instruction, the control circuit 250 varies, only by a predetermined amount, the voltage applied to the varicap such that the resonant frequency of the cancel circuit GG is reduced whereas when the control circuit 250 receives the signal indicating the resonant frequency increase instruction, the control circuit 250 varies, only by a predetermined amount, the voltage applied to the varicap such that the resonant frequency of the cancel circuit GG is increased.

When the resonant frequency of the cancel circuit GG is reduced according to the resonant frequency reduction instruction, $V_{TEST2}$ is expected to be reduced. When the resonant frequency of the cancel circuit GG is increased according to the resonant frequency increase instruction, $V_{TEST2}$ is expected to be increased.

For example, when the metal plate 270 is provided in the electronic device 2, though the amplitude of the current flowing through the power transmission-side coil $T_L$ is increased by the action of the metal plate 270 (consequently, "$(V_{TEST2}-V_{TEST1})>0$" easily holds true), if the cancel circuit GG is made to have a resonant frequency lower than the reference frequency, the amplitude of the current flowing through the power transmission-side coil $T_L$ is reduced by the action of the cancel circuit GG, with the result that the actions of the metal plate 270 and the cancel circuit GG on the amplitude of the current cancel out each other. Hence, when "$(V_{TEST2}-V_{TEST1})>0$", the resonant frequency reduction instruction is output. When the magnetic material portion $MG_2$ is provided in the electronic device 2, the opposite situation occurs. Moreover, $|V_{TEST2}-V_{TEST1}|$ is brought close to zero, and thus an influence exerted by a non-ideal $f_O$ change/short circuit operation is also absorbed.

Since a state where the adjustment of the capacitance value of the cancellation capacitor $G_C$ in the processing of FIG. 50 is performed is equivalent to a state where in the pFOD processing, the electronic device 2 is not present on the power feeding stage 12, it is possible to accurately determine whether or not the foreign object is present. That the detection value $V_{TEST1}$ acquired when the electronic device 2 is not placed on the power feeding stage 12 is equal to the detection value $V_{TEST2}$ acquired when the electronic device 2 is placed on the power feeding stage 12 while the $f_O$ change/short circuit operation is being performed means that the action of varying the resonant frequency from the reference frequency by the metal plate 270 or the like is appropriately cancelled out in the cancel circuit GG.

Consideration on the Present Invention

The present invention embodied in the embodiments described above will be considered.

A power reception device $W_1$ according to one aspect of the present invention which can receive, from a power transmission device that includes a power transmission-side resonant circuit (TT) including a power transmission-side coil ($T_L$) for transmitting power, the power by a magnetic field resonance method, includes: a power reception-side resonant circuit (RR) which includes a power reception-side coil ($R_L$) for receiving the power; and an auxiliary resonant circuit (GG) which includes an auxiliary coil ($G_L$) different from the power reception-side coil, where in a position in which a current flows through the auxiliary coil based on a magnetic field generated in the power transmission-side coil or the power reception-side coil, the auxiliary coil is arranged.

For example, although in the power reception device, a member (such as a metal plate) which affects the properties and the operation of the power reception-side resonant circuit may be arranged, the auxiliary resonant circuit described above is provided, and thus it is possible to cancel out the influences, with the result that it is possible to perform a proper power reception operation and the like.

Here, a description will be given of a relationship between the power reception-side coil and the auxiliary coil with attention focused on the power reception-side coil $R_L$ used as an example of the power reception-side coil and the cancellation coil $G_L$ used as an example of the auxiliary coil in the embodiments. As long as in the embodiments described above, the power reception-side coil $R_L$ and the cancellation coil $G_L$ are provided separately, the former can form the power reception-side resonant circuit RR and the latter can form the cancel circuit GG, a specific method of configuring the coils $R_L$ and $G_L$ is arbitrary.

Figure 51:
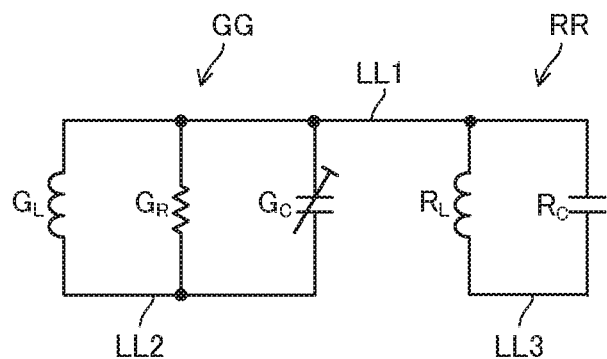
FIG. 51 is a diagram showing an example of a relationship between the power reception-side resonant circuit and the cancel circuit.

For example, when the circuits RR and GG are shown in a circuit diagram, the circuits RR and GG may have a relationship as shown in FIG. 51. In the circuit of FIG. 51, the circuits RR and GG each are formed as parallel resonant circuits, and a line (wiring) to which one ends of the coil $G_L$, the capacitor $G_C$ and the resistor $G_R$ are connected in common and a line (wiring) to which one ends of the coil $R_L$ and the capacitor $R_C$ are connected in common are a common line LL1 whereas a line LL2 to which the other ends of the coil $G_L$, the capacitor $G_C$ and the resistor $G_R$ are connected in common and a line LL3 to which the other ends of the coil $R_L$ and the capacitor $R_C$ are connected in common are separate lines, with the result that a current loop (closed circuit) through the lines LL1 to LL3 is not formed. The cancellation coil $G_L$ and the power reception-side coil $R_L$ in the circuit configuration of FIG. 51 are naturally coils different from each other, and they can be said to be coils which are provided separately and which are separated from each other.

Figure 52:
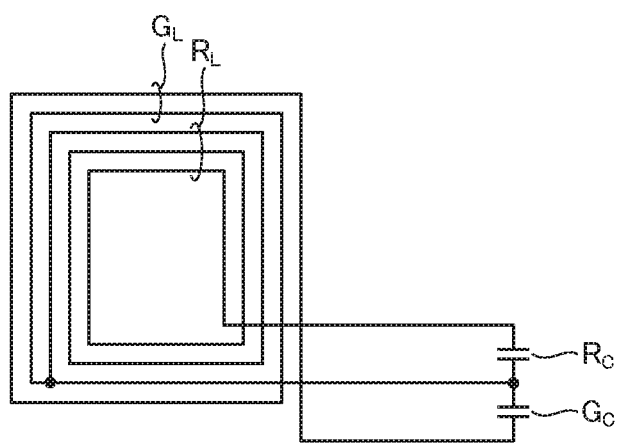
FIG. 52 is a diagram showing a specific example of a relationship between a winding of the power reception-side coil and a winging of the cancellation coil.

Although as shown in FIG. 52, most of the winding forming the cancellation coil $G_L$ and the most of the winding forming the power reception-side coil $R_L$ are separate windings, part of the former winding and part of the latter winding can be formed in common (the part formed in common can be a wiring part which cannot be referred to as part of the winding). Even in the winding configuration described above, it can be said that the cancellation coil $G_L$ and the power reception-side coil $R_L$ are coils different from each other. In FIG. 52, the cancellation resistor $G_R$ is omitted.

Figure 53:
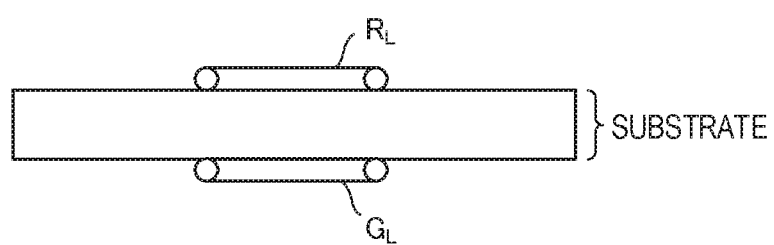
FIG. 53 is a diagram showing an example of an arrangement relationship of the power reception-side coil and the cancellation coil when they are formed as a pattern coil.

For another example, as shown in FIG. 53, a configuration can be adopted in which the power reception-side coil $R_L$ is provided as a first pattern coil on a first surface of a substrate (printed substrate) installed in the electronic device 2 whereas the cancellation coil $G_L$ is provided as a second pattern coil different from the first pattern coil on a second surface on the side opposite to the first surface of the substrate.

A non-contact power feeding system $W_2$ according to one aspect of the present invention includes: the power reception device $W_1$; and the power transmission device which includes the power transmission-side resonant circuit including the power transmission-side coil for transmitting the power, where the non-contact power feeding system can transmit and receive the power by the magnetic field resonance method.

Specifically, for example, preferably, in the non-contact power feeding system $W_2$, the power transmission device includes: a power transmission circuit which can supply an alternating current voltage to the power transmission-side resonant circuit; a detection circuit which detects the amplitude of a current flowing through the power transmission-side coil; and a control circuit which performs power transmission control on the power by controlling the power transmission circuit based on the amplitude detection value of the detection circuit.

For example, preferably, the power reception device includes a change/short circuit which changes the resonant frequency of the power reception-side resonant circuit from a resonant frequency at the time of the power reception or short-circuits the power reception-side coil before the reception of the power from the power transmission device, the power transmission-side control portion includes: a first processing portion which controls the power transmission circuit such that in a state where in the power reception device, the resonant frequency of the power reception-side resonant circuit is changed or the power reception-side coil is short-circuited according to a signal by communication from the power transmission device, before the power transmission, a predetermined test magnetic field is generated in the power transmission-side coil; a second processing portion which determines, based on the amplitude detection value by the detection circuit when the test magnetic field is generated, whether or not the power transmission can be performed; and a third processing portion which realizes the power transmission by controlling the power transmission circuit such that after it is determined that the power transmission can be performed, a magnetic field for the power transmission larger than the test magnetic field is generated in the power transmission-side coil, and in the state, a current which cancels out an influence exerted by the power reception-side resonant circuit on the amplitude of the current flowing through the power transmission-side coil flows through the auxiliary resonant circuit.

Even when the change/short circuit is operated due to, for example, the nonlinearity of a circuit for changing the resonant frequency of the power reception-side resonant circuit or short-circuiting the power reception-side coil, based on the magnetic field generated in the power transmission-side coil, a certain amount of current may flow through the power reception-side resonant circuit, and the current may generate a magnetic field so as to produce a variation in the amplitude of the current flowing through the power transmission-side coil. This variation is not desirable for the determination as to whether or not the power transmission can be performed which is performed based on the amplitude of the current flowing through the power transmission-side coil. In the configuration described above, such a variation is cancelled out by the function of the auxiliary resonant circuit, and thus the determination as to whether or not the power transmission can be performed is made proper.

The power feeding device 1 itself in the embodiments described above may function as the power transmission device according to the present invention or part of the power feeding device 1 in the embodiments described above may function as the power transmission device according to the present invention. Likewise, the electronic device 2 itself in the embodiments described above may function as the power reception device according to the present invention or part of the electronic device 2 in the embodiments described above may function as the power reception device according to the present invention.

VARIATIONS AND THE LIKE

The embodiments of the present invention can be variously changed as necessary within the technical idea indicated in the scope of claims. The embodiments described above are simply examples of the embodiment of the present invention, and the significance of the terms in the present invention and the configuration requirements is not limited to the description of the above embodiments. The specific values indicated in the above description are simply illustrative, and can naturally be changed to various values. As explanatory notes which can be applied to the embodiments described above, explanatory notes 1 to 3 will be described below. The details described in the explanatory notes can be arbitrarily combined unless otherwise a contradiction arises.

[Explanatory Note 1]
Although in the embodiments described above, the frequencies and the resonant frequencies of various types of signals are set to 13.56 MHz serving as the reference frequency, 13.56 MHz is a target value for the setting, and in the actual device, the frequencies include errors.

[Explanatory Note 2]
Although the present invention embodied in conformance with the standard of the NFC is described in the embodiments, and thus in the description, the reference frequency is 13.56 MHz, the reference frequency may be any frequency other than 13.56 MHz. In relation to what has been described above, the communication and the power transfer between the power feeding device and the electronic device to which the present invention is applied may be communication and power transfer in conformance with a standard other than the NFC.

Even in a case where the reference frequency of the non-contact power feeding system according to the present invention is set to a frequency other than 13.56 MHz (for example, 6.78 MHz), and where the resonant frequency of the resonant circuit JJ in the foreign object 3 formed as a non-contact IC card is 13.56 MHz, when the foreign object 3 is placed on the power feeding stage 12, a corresponding change in the voltage value $V_D$ is produced in the pFOD processing or the mFOD processing. Hence, even in such a case, it is possible to detect the foreign object 3 by the method described above.

[Explanatory Note 3]
A target device which is the power reception device or the power transmission device according to the present invention can be formed by hardware such as an integrated circuit or a combination of hardware and software. An arbitrary specific function which is the entire function realized in the target device or part thereof may be described as a program, and this program may be stored in a flash memory that can be mounted on the target device. Then, the program may be executed on a program executing device (for example, a microcomputer which can be installed in the target device) so as to realize the specific function. The program can be stored and fixed in an arbitrary recording medium. The recording medium in which the program is stored and fixed may be installed in or connected to a device (such as a server device) which is different from the target device.

LIST OF REFERENCE SYMBOLS 1 power feeding device
2 electronic device
130 NFC power transmission circuit
140 load detection circuit
160 control circuit
270 metal plate
271 opening portion
281, 282 magnetic material plate
TT power transmission-side resonant circuit
$T_L$ power transmission-side coil
$T_C$ power transmission-side capacitor
RR power reception-side resonant circuit
$R_L$ power reception-side coil
$R_C$ power reception-side capacitor
GG cancel circuit
$G_L$ cancellation coil
$G_C$ cancellation capacitor

The invention claimed is:
1. A non-contact power feeding system comprising:
a power reception device which receives, from a power transmission device that includes a power transmis- sion-side resonant circuit including a power transmission-side coil for transmitting power, the power by a magnetic field resonance method, the power reception device comprising:
- a power reception-side resonant circuit which includes a power reception-side coil for receiving the power; and
- an auxiliary resonant circuit which includes an auxiliary coil different from the power reception-side coil, wherein
in a position in which a current flows through the auxiliary coil based on a magnetic field generated in the power transmission-side coil or the power reception-side coil, the auxiliary coil is arranged;
the power transmission device includes the power transmission-side resonant circuit including the power transmission-side coil for transmitting the power,
the non-contact power feeding system transmits and receives the power by the magnetic field resonance method,
the power transmission device includes:
- a power transmission circuit which supplies an alternating current voltage to the power transmission-side resonant circuit;
- a detection circuit which detects an amplitude of a current flowing through the power transmission-side coil; and
- a power transmission-side control portion which performs power transmission control on the power by controlling the power transmission circuit based on an amplitude detection value of the detection circuit, the power reception device includes a resonant state change circuit which changes the resonant frequency of the power reception-side resonant circuit from a resonant frequency at a time of the power reception or short-circuits the power reception-side coil before the reception of the power from the power transmission device,
the power transmission-side control portion includes:
- a first processing portion which controls the power transmission circuit such that in a state where in the power reception device, the resonant frequency of the power reception-side resonant circuit is changed or the power reception-side coil is short-circuited according to a signal by communication from the power transmission device, before the power transmission, a predetermined test magnetic field is generated in the power transmission-side coil;
- a second processing portion which determines, based on the amplitude detection value by the detection circuit when the predetermined test magnetic field is generated, whether or not the power transmission is performed; and
- a third processing portion which realizes the power transmission by controlling the power transmission circuit such that after it is determined that the power transmission is performed, a magnetic field for the power transmission larger than the predetermined test magnetic field is generated in the power transmission-side coil, and in the state, a current which cancels out an influence exerted by the power reception-side resonant circuit on the amplitude of the current flowing through the power transmission-side coil flows through the auxiliary resonant circuit.

2. The non-contact power feeding system according to claim 1,
wherein the power reception device further includes a power reception-side control portion which stops a resonant operation of the auxiliary resonant circuit caused as a result of the alternating magnetic field interlinking the auxiliary coil, and
the power reception-side control portion stops the resonant operation of the auxiliary resonant circuit when the power is transmitted and received.

3. The non-contact power feeding system according to claim 1,
wherein when the power transmission device and the power reception device are in a predetermined positional relationship for transmitting and receiving the power, the auxiliary coil is arranged between the power transmission-side coil and the power reception-side coil or is arranged in a position on a side opposite to an arrangement position of the power transmission-side coil when seen from the power reception-side coil.

4. The non-contact power feeding system according to claim 1, further comprising:
a metal plate which is provided in such a position as to affect a resonant frequency of the power reception-side resonant circuit,
wherein when an alternating magnetic field interlinks the auxiliary coil, a current which cancels out a variation in the resonant frequency of the power reception-side resonant circuit caused by the metal plate flows through the auxiliary resonant circuit.

5. The non-contact power feeding system according to claim 4,
wherein the metal plate is formed of aluminum or an aluminum alloy.

6. The non-contact power feeding system according to claim 1, further comprising:
a magnetic material portion which is provided in such a position as to affect a resonant frequency of the power reception-side resonant circuit,
wherein when an alternating magnetic field interlinks the auxiliary coil, a current which cancels out a variation in the resonant frequency of the power reception-side resonant circuit caused by the magnetic material portion flows through the auxiliary resonant circuit.

7. The non-contact power feeding system according to claim 6,
wherein the magnetic material portion is formed of ferrite.

8. The non-contact power feeding system according to claim 1,
wherein the auxiliary resonant circuit is a resonant circuit that is formed so as to include the auxiliary coil and an auxiliary capacitor whose capacitance is changed.

9. The non-contact power feeding system according to claim 8,
wherein the auxiliary resonant circuit further includes an auxiliary resistor, and
the auxiliary resistor is connected in parallel to a parallel circuit of the auxiliary coil and the auxiliary capacitor or the auxiliary resistor is inserted in series with a series circuit of the auxiliary coil and the auxiliary capacitor.

* * * * *